(12) United States Patent
Kawamata et al.

(10) Patent No.: US 8,180,569 B2
(45) Date of Patent: May 15, 2012

(54) CAR INFORMATION SYSTEM, MAP SERVER AND ON-BOARD SYSTEM

(75) Inventors: Yukihiro Kawamata, Hitachi (JP); Yukio Miyazaki, Tokyo (JP); Masaaki Tanizaki, Nishitokyo (JP)

(73) Assignees: Hitachi Ltd., Tokyo (JP); Clarion Co., Ltd., Tokyo (JP)

( * ) Notice: Subject to any disclaimer, the term of this patent is extended or adjusted under 35 U.S.C. 154(b) by 1036 days.

(21) Appl. No.: 11/951,656

(22) Filed: Dec. 6, 2007

(65) Prior Publication Data
US 2008/0147305 A1 Jun. 19, 2008

(30) Foreign Application Priority Data
Dec. 7, 2006 (JP) ................................ 2006-330183

(51) Int. Cl.
*G01C 21/00* (2006.01)
(52) U.S. Cl. ........ 701/450; 701/451; 701/452; 701/461; 701/516; 701/517; 701/518
(58) Field of Classification Search .................. None
See application file for complete search history.

(56) References Cited

U.S. PATENT DOCUMENTS

| | | | | |
|---|---|---|---|---|
| 5,315,295 A | * | 5/1994 | Fujii | 340/936 |
| 5,485,161 A | * | 1/1996 | Vaughn | 342/357.31 |
| 5,504,482 A | * | 4/1996 | Schreder | 340/995.13 |
| 5,570,087 A | * | 10/1996 | Lemelson | 340/870.05 |
| 5,712,632 A | * | 1/1998 | Nishimura et al. | 340/995.19 |
| 5,961,559 A | * | 10/1999 | Shimbara et al. | 701/23 |
| 6,154,658 A | * | 11/2000 | Caci | 455/466 |
| 6,202,024 B1 | * | 3/2001 | Yokoyama et al. | 701/207 |
| 6,253,153 B1 | * | 6/2001 | Kantani et al. | 701/209 |
| 6,353,785 B1 | * | 3/2002 | Shuman et al. | 701/48 |
| 6,415,226 B1 | * | 7/2002 | Kozak | 701/210 |
| 6,487,477 B1 | * | 11/2002 | Woestman et al. | 701/22 |
| 6,603,406 B2 | * | 8/2003 | Jambhekar et al. | 340/905 |
| 6,636,799 B2 | * | 10/2003 | D'Amico et al. | 701/200 |
| 6,792,349 B1 | * | 9/2004 | Chen et al. | 701/202 |
| 7,035,733 B1 | * | 4/2006 | Alwar et al. | 701/210 |
| 7,383,127 B2 | * | 6/2008 | Matsuo et al. | 701/211 |
| 7,428,460 B2 | * | 9/2008 | Atarashi et al. | 701/208 |

(Continued)

FOREIGN PATENT DOCUMENTS
EP 1 069 547 A1 1/2001
(Continued)

OTHER PUBLICATIONS
European Search Report dated Jul. 26, 2010 (five (5) pages).

*Primary Examiner* — Khoi Tran
*Assistant Examiner* — Bhavesh V Amin
(74) *Attorney, Agent, or Firm* — Crowell & Moring LLP

(57) ABSTRACT

The present invention discloses highly accurate driving control of a vehicle using map data. A car information system for controlling a driving control unit group is located in a vehicle. The car information system includes a map database for storing map data, a support area management table in which each kind of attribute data of the map data is associated with information for identifying a field-researched area, and a control unit for estimating an area through which the vehicle travels. The control unit uses a support area management table to judge whether attribute data included in the estimated area is associated with the support area.

18 Claims, 39 Drawing Sheets

U.S. PATENT DOCUMENTS

| | | |
|---|---|---|
| 7,739,037 B2 * | 6/2010 | Sumizawa et al. ............ 701/208 |
| 2002/0077745 A1 * | 6/2002 | Ohmura et al. ............... 701/208 |
| 2002/0128774 A1 * | 9/2002 | Takezaki et al. .............. 701/211 |
| 2003/0093220 A1 * | 5/2003 | Andersson et al. ........... 701/207 |
| 2003/0130794 A1 * | 7/2003 | Miller et al. .................. 701/301 |
| 2003/0227395 A1 * | 12/2003 | Zeineh .......................... 340/988 |
| 2004/0015945 A1 * | 1/2004 | Watanabe et al. ............. 717/168 |
| 2005/0114019 A1 * | 5/2005 | Umezu et al. ................. 701/210 |
| 2005/0149259 A1 * | 7/2005 | Cherveny et al. ............. 701/208 |
| 2007/0213929 A1 | 9/2007 | Tanizaki et al. |

FOREIGN PATENT DOCUMENTS

| | | |
|---|---|---|
| EP | 1 087 358 A2 | 3/2001 |
| JP | 7-192194 A | 7/1995 |
| JP | 2007-241003 A | 9/2007 |
| WO | WO 2006/011278 A1 | 2/2006 |

* cited by examiner

FIG.3
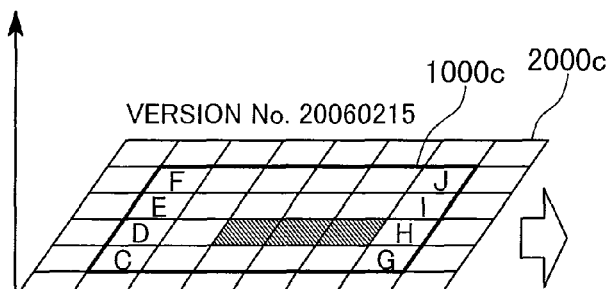
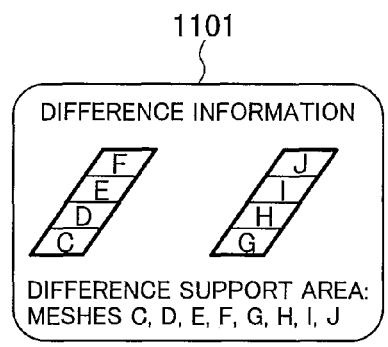
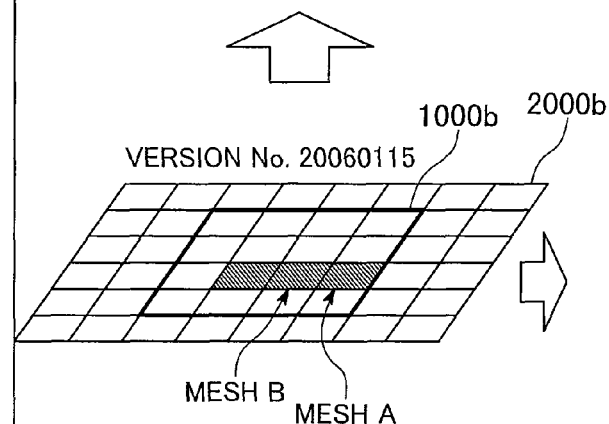
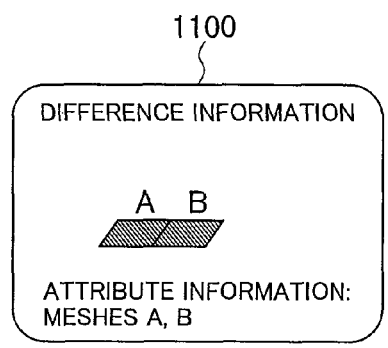
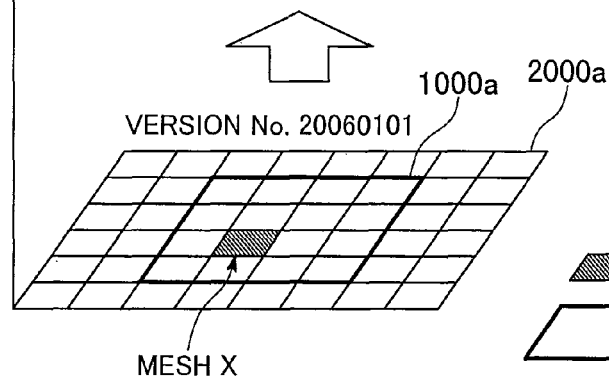

FIG.4

| DRIVING CONTROL \ ROAD SHAPE /ATTRIBUTE DATA | ROAD SHAPE | SPEED LIMIT | CURVATURE | GRADE | RAILROAD CROSSING | TEMPORARY STOP LINE | TOLLGATE | SCHOOL ZONE |
|---|---|---|---|---|---|---|---|---|
| AUTOMATIC SPEED CONTROL | ○ | ○ | | | | | | |
| SCHOOL ZONE CONTROL | ○ | | | | | | | ○ |
| RAILROAD CROSSING STOP CONTROL | ○ | | | | ○ | | | |
| TEMPORARY STOP LINE CONTROL | ○ | | | | | ○ | | |
| TOLLGATE SPEED CONTROL | ○ | | | | | | ○ | |
| ADAPTIVE FRONT-LIGHTING CONTROL | ○ | | ○ | ○ | | | | |
| LANE KEEP CONTROL | ○ | | ○ | | | | | |
| SHIFT CHANGE CONTROL | ○ | | ○ | ○ | | | | |
| HEV REGENERATIVE BRAKE CONTROL | ○ | | ○ | ○ | | | | |

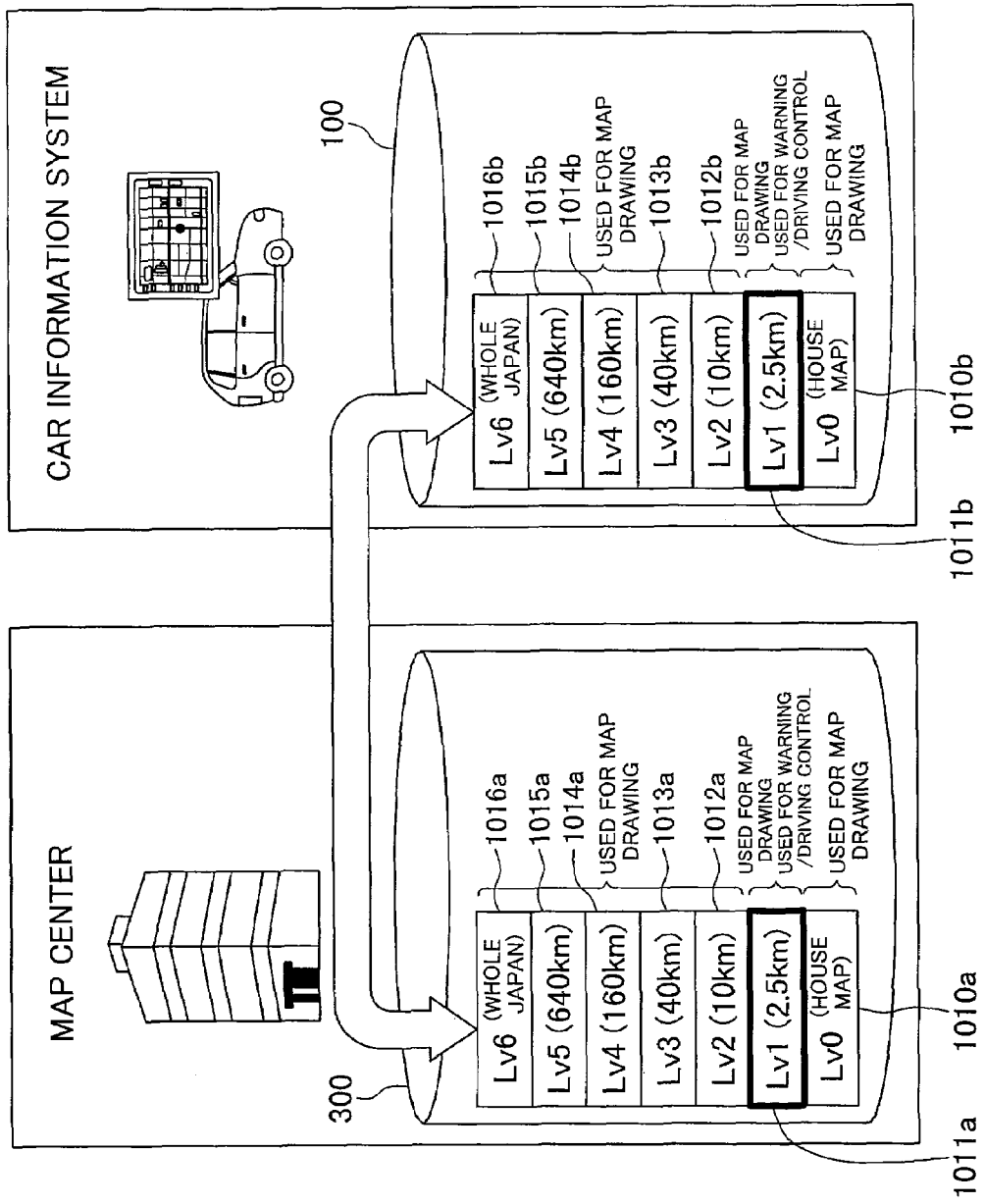

FIG.6

ATTRIBUTE-VALUE MANAGEMENT TABLE

| | | |
|---|---|---|
| SPEED LIMIT | : | – UNASSOCIATED – |
| CURVATURE | : | – UNASSOCIATED – |
| GRADE | : | – UNASSOCIATED – |
| RAILROAD CROSSING | : | – ASSOCIATED – |
| TEMPORARY STOP LINE | : | – ASSOCIATED – |
| SCHOOL ZONE | : | – UNASSOCIATED – |
| SIGN | : | – UNASSOCIATED – |
| VISIBILITY | : | – UNASSOCIATED – |
| SAG | : | – UNASSOCIATED – |

TERMINAL-SIDE ATTRIBUTE-VALUE-BASIS SUPPORT
AREA MANAGEMENT TABLE

TEMPORARY STOP:

AREA 1:
   MESH 10001
   MESH 10002
   MESH 10003
   MESH 10004
   MESH 10005
   MESH 10006
   MESH 10007
   MESH 10008

AREA 2:
   MESH 20005
   MESH 20006
   MESH 20007
   MESH 20008
   MESH 20009
   MESH 20010
   MESH 20011
   MESH 20012

PEDESTRIAN CROSSING:

AREA 1:
   MESH 10001
   MESH 10002
   MESH 10003
   MESH 10004
   MESH 10005
   MESH 10006
   MESH 10007
   MESH 10008

TERMINAL-SIDE ROAD SHAPE/ATTRIBUTE DATA
UPDATE DATE MANAGEMENT TABLE

~130

AREA 1:
    ROAD SHAPE : 20051115
    RAILROAD CROSSING : 20051115
    TEMPORARY STOP LINE : 20051025
    TOLLGATE : 20051205
    ⋮

AREA 2:
    ROAD SHAPE : 20051115
    RAILROAD CROSSING : 20051115
    TEMPORARY STOP LINE : 20051025
    TOLLGATE : 20051205
    ⋮

AREA 3:
    ROAD SHAPE : 20051115
    RAILROAD CROSSING : 20051130
    TEMPORARY STOP LINE : 20051225
    TOLLGATE : 20051215
    ⋮

FIG.10

SERVER-SIDE ROAD SHAPE/ATTRIBUTE DATA UPDATE
DATE MANAGEMENT TABLE — 320

| | | |
|---|---|---|
| AREA 1: | | |
| ROAD SHAPE | : | 20051210 |
| SPEED LIMIT | : | 20051210 |
| CURVATURE | : | 20051215 |
| GRADE | : | 20051215 |
| RAILROAD CROSSING | : | 20051015 |
| TEMPORARY STOP LINE | : | 20051015 |
| TOLLGATE | : | 20051205 |
| SCHOOL ZONE | : | 20051130 |
| SIGN | : | 20051120 |
| VISIBILITY | : | 20051220 |
| SAG | : | 20051215 |
| | | |
| AREA 2: | | |
| ROAD SHAPE | : | 20051210 |
| SPEED LIMIT | : | 20051120 |
| CURVATURE | : | 20051115 |
| GRADE | : | 20051120 |
| RAILROAD CROSSING | : | 20051215 |
| TEMPORARY STOP LINE | : | 20051025 |
| TOLLGATE | : | 20051205 |
| SCHOOL ZONE | : | 20051130 |
| SIGN | : | 20051210 |
| VISIBILITY | : | 20051110 |
| SAG | : | 20051125 |
| | | |
| AREA 3: | | |
| ROAD SHAPE | : | 20051210 |
| SPEED LIMIT | : | 20051030 |
| CURVATURE | : | 20051215 |
| GRADE | : | 20051220 |
| RAILROAD CROSSING | : | 20051130 |
| TEMPORARY STOP LINE | : | 20051225 |
| TOLLGATE | : | 20051215 |
| SCHOOL ZONE | : | 20051210 |
| SIGN | : | 20051220 |
| VISIBILITY | : | 20051210 |
| SAG | : | 20051130 |

UPDATE CHECK AREA
(AREA THAT IS IDENTIFIED BY MESHES, THE NUMBER OF WHICH IS 5 X 5, WITH A MESH IN WHICH A CURRENT POSITION OF THE VEHICLE IS LOCATED KEPT AT THE CENTER OF THE AREA)

NAVIGATED ROUTE
DRIVING MODE

FIG.20A

DRIVING CONTROL MODE

NECESSARY CONDITIONS: AN UPDATE COMPLETED MODE IS SET;
AND MAP DATA USED FOR THE DRIVING CONTROL IS
MAP DATA OF THE SUPPORT AREA.

FIG.20B

WARNING MODE

NECESSARY CONDITIONS: THE UPDATE COMPLETED MODE IS NOT SET;
AND THE LAST UPDATE CHECK OF MAP DATA HAS BEEN
PERFORMED AT LEAST TWO YEARS AGO OR LATER;
AND THE MAP DATA USED FOR THE DRIVING CONTROL IS
MAP DATA OF THE SUPPORT AREA.

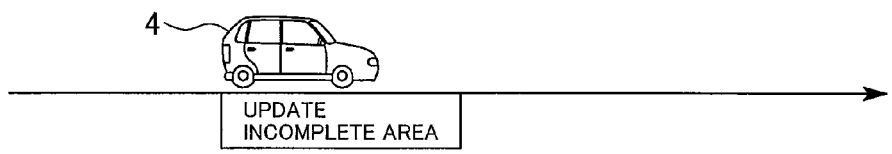

FIG.20C

UNCONTROLLED MODE

NECESSARY CONDITIONS 1: THE UPDATE COMPLETED MODE IS NOT SET;
AND THE LAST UPDATE CHECK OF MAP DATA HAS NOT BEEN
PERFORMED TWO YEARS AGO OR LATER.

NECESSARY CONDITIONS 2: THE MAP DATA USED FOR THE DRIVING
CONTROL IS NOT MAP DATA OF THE SUPPORT AREA.

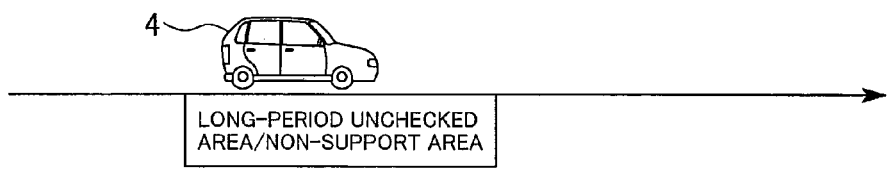

SCHOOL ZONE DRIVING CONTROL

WARNING MODE (A CASE WHERE MAP AROUND A CURRENT POSITION OF A VEHICLE IS NOT THE LATEST ONE)

SCHOOL ZONE DRIVING CONTROL

SCHOOL ZONE DRIVING CONTROL

DRIVING CONTROL MODE (A CASE WHERE MAP AROUND A CURRENT POSITION OF THE VEHICLE IS THE LATEST ONE)

RAILROAD CROSSING STOP CONTROL

WARNING MODE (A CASE WHERE MAP AROUND A CURRENT POSITION OF A VEHICLE IS NOT THE LATEST ONE)

RAILROAD CROSSING STOP CONTROL

DRIVING CONTROL MODE (A CASE WHERE MAP AROUND A CURRENT POSITION OF THE VEHICLE IS THE LATEST ONE)

FIG.26

VEHICLE-BASIS ATTRIBUTE-VALUE
MANAGEMENT TABLE
⌐ 330

VEHICLE ID: 5255 (VEHICLE A)
    SPEED LIMIT          : – UNASSOCIATED –
    CURVATURE          : – UNASSOCIATED –
    GRADE               : – UNASSOCIATED –
    RAILROAD CROSSING  : – ASSOCIATED –
    TEMPORARY STOP LINE : – ASSOCIATED –
    TOLLGATE           : – ASSOCIATED –
    SCHOOL ZONE        : – UNASSOCIATED –
    SIGN                : – UNASSOCIATED –
    VISIBILITY          : – UNASSOCIATED –
    SAG                 : – UNASSOCIATED –

VEHICLE ID: 5265 (VEHICLE B)
    SPEED LIMIT          : – ASSOCIATED –
    CURVATURE          : – ASSOCIATED –
    GRADE               : – ASSOCIATED –
    RAILROAD CROSSING  : – ASSOCIATED –
    TEMPORARY STOP LINE : – ASSOCIATED –
    TOLLGATE           : – ASSOCIATED –
    SCHOOL ZONE       : – ASSOCIATED –
    SIGN                : – ASSOCIATED –
    VISIBILITY          : – ASSOCIATED –
    SAG                 : – ASSOCIATED –

:

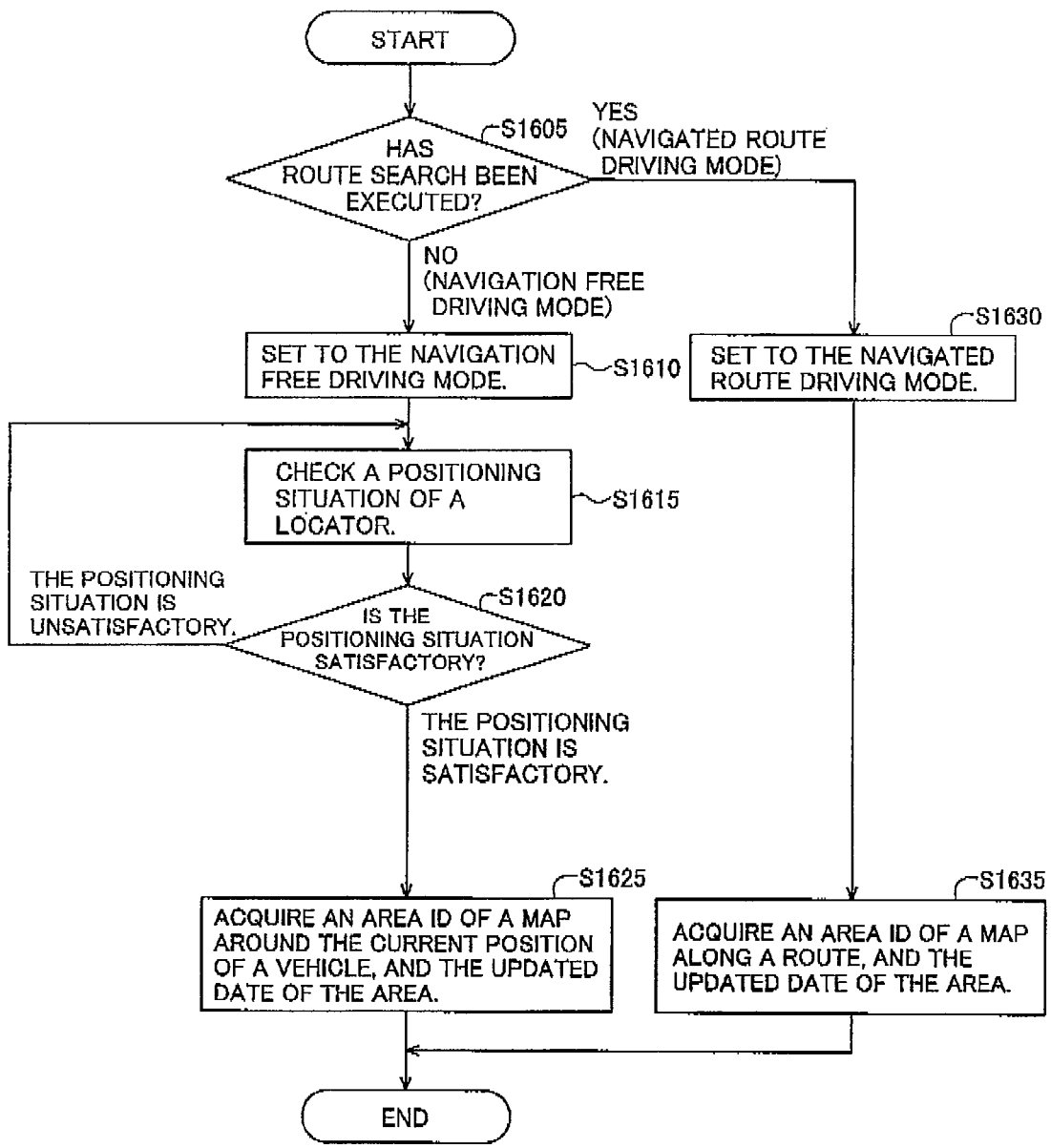

FIG.33

DRIVING-CONTROL-UNIT-BASIS UPDATE DATE
MANAGEMENT TABLE ⌐132

```
AREA 1:
    AUTOMATIC SPEED CONTROL          : 20051115
    SCHOOL ZONE CONTROL              : 20051230
    RAILROAD CROSSING STOP CONTROL   : 20051115
    TEMPORARY STOP LINE CONTROL      : 20051230
    TOLLGATE SPEED CONTROL           : 20051115
    ADAPTIVE FRONT-LIGHTING CONTROL  : 20051105
    LANE KEEP CONTROL                : 20051215
    SHIFT CHANGE CONTROL             : 20051115
    HEV REGENERATIVE BRAKE CONTROL   : 20051115

AREA 2:
    AUTOMATIC SPEED CONTROL          : 20051005
    SCHOOL ZONE CONTROL              : 20051110
    RAILROAD CROSSING STOP CONTROL   : 20051210
    TEMPORARY STOP LINE CONTROL      : 20051110
    TOLLGATE SPEED CONTROL           : 20051120
    ADAPTIVE FRONT-LIGHTING CONTROL  : 20051215
    LANE KEEP CONTROL                : 20051210
    SHIFT CHANGE CONTROL             : 20051120
    HEV REGENERATIVE BRAKE CONTROL   : 20051230

AREA 3:
    AUTOMATIC SPEED CONTROL          : 20051115
    SCHOOL ZONE CONTROL              : 20051115
    RAILROAD CROSSING STOP CONTROL   : 20051215
    TEMPORARY STOP LINE CONTROL      : 20051115
    TOLLGATE SPEED CONTROL           : 20051130
    ADAPTIVE FRONT-LIGHTING CONTROL  : 20051215
    LANE KEEP CONTROL                : 20051215
    SHIFT CHANGE CONTROL             : 20051115
    HEV REGENERATIVE BRAKE CONTROL   : 20051215
            ⋮
```

CAR INFORMATION SYSTEM, MAP SERVER AND ON-BOARD SYSTEM

BACKGROUND OF THE INVENTION

1. Field of the Invention

The present invention relates to techniques for performing the driving control of a vehicle by use of map data.

2. Description of the Related Art

On-board systems for performing the driving control of a vehicle by use of map data including attribute data of roads (information about the grade of each road, and the like) are conventionally known (for example, JP-A-7-192194). The on-board system disclosed in JP-A-7-192194 calculates a current position of a vehicle, and then estimates, from the calculated current position and map data, a road through which the vehicle is going to travel from now. The on-board system disclosed in JP-A-7-192194 uses estimated attribute data of the road to control the operation of elements such as an automatic transmission, an engine, and a suspension. Incidentally, there are various kinds of on-board systems that use map data. For example, there is an on-board system in which attribute data of each road includes data indicating a position of a temporary stop line on the road, and the attribute data is used to judge whether or not a vehicle has approached the temporary stop line, and then if it is judged that the vehicle has approached the temporary stop line, the speed of the vehicle is automatically reduced. In addition, there is also an on-board system in which, from information about a road shape included in map data, a judgment is made as to whether or not a vehicle has approached a railroad crossing, and if it is judged that the vehicle has approached the railroad crossing, the speed of the vehicle is automatically reduced.

SUMMARY OF THE INVENTION

Incidentally, in the case of an on-board system that uses map data, it is desirable that the map data used by the on-board system be updated to the latest one. It is because if map data on which a current state of each road is not reflected is used, it is not possible to perform the driving control with high accuracy. Incidentally, on-board systems generally use telecommunication networks to download map data so that the map data is updated to the latest version. In addition, taking communication traffics of networks into consideration, there is also a case where when map data is downloaded, only difference information between map data in a version actually kept in the on-board system and the latest map data is downloaded.

However, even if the conventional driving control of the vehicle described in JP-A-7-192194 is performed after the latest-version map data is downloaded, the following problems arise. To be more specific, when the version of map data is upgraded, it is often impossible to carry out field research of all areas of the map data (for example, in the case of map data covering a certain country (Japan, or the like), all areas of the country). In addition, map data whose version has been upgraded is not so configured that it is possible to discriminate field-researched areas from areas that have not been subjected to the field research.

Therefore, even if the latest-version map data is downloaded, it is not possible to identify field-researched areas from among all areas in the map data. Then, even in the case of the latest-version map data, if an area which is not field-researched is used, it is not possible to achieve the highly accurate driving control. For example, in actuality, even if a road is provided with for example a new sign, the new sign is not reflected on attribute data of the road without field-researching the new sign. Accordingly, it is not possible to perform the driving control corresponding to the sign in question.

In addition, also when only difference information is downloaded, the same problem arises. Because the difference information is information that contains only updated part of map data, it is not possible to know the reason why each area which is not included in the difference information exists. Here, the reason why each area which is not included in the difference information exists is i) because the each area has not been subjected to the field research; or ii) because a road or attribute information (for example, sign information) does not change although the each area has been field-researched. To be more specific, after the version of the map data is upgraded, if there is map data of an area that is not included in the difference information, it is not possible to discriminate a case where although for example a new sign is actually added to a road, the new sign is not reflected on the attribute information of the road and a case where the latest road conditions are reflected on the road as a result of the field research. Therefore, for example, even if in actuality a temporary stop line is newly provided, if it is not reflected on the attribute information of the road, it is not possible to execute the speed reduction control even when the vehicle approaches the temporary stop line.

The present invention was devised taking the above-described situations into consideration. An object of the present invention is to perform the highly accurate control in a system for performing the driving control of a vehicle using map data.

In order to solve the above-described problems, a first mode of the present invention is applied to a car information system for communicating with a driving control unit located in a vehicle, and for controlling the driving control unit to perform the driving control of the vehicle.

The car information system includes: a map database (DB) in which map data is registered, the map data including: a link constituting a road, a road shape of the link, and attribute data of the link; a support area management table in which each kind of attribute data of the map data is associated with information for identifying a field-researched area (support area); and control means for estimating a traveling area through which a vehicle travels, for using the support area management table to judge whether or not attribute data included in the estimated area is associated with the support area, and for, if it is judged that the attribute data is associated with the support area, controlling the driving control unit so that the driving control of the vehicle is performed by use of the map data, whereas if it is judged that the attribute data is not associated with the support area, not performing the driving control of the vehicle by use of the map data.

Moreover, in order to solve the above-described problems, a second mode of the present invention is applied to a map server for storing the latest-version map data, and for providing an on-board system for performing the driving control of a vehicle with information about the map data. Here, the map data includes a link constituting a road, a road shape of the link, and attribute data of the link.

The map server includes: a support area management table in which each kind of attribute data of the latest-version map data is associated with information for identifying a field-researched area (support area); an update-date management table for storing the update date of attribute data of a link, the update date of a road shape of the link, which are included in map data, and the update date of data of the support area management table; communication means for communicating with the on-board system; and update check means for accepting various kinds of requests from the on-board system through the communication means. From the on-board system, through the communication means, the update check means acquires: a check area of map data, whose update check is requested; the update date of attribute data of the link, and the update date of the road shape of the link, which are included in the check area of the map data stored in the on-board system; and the update date of the support area of the attribute data of the link included in the check area. By use of the information acquired from the on-board system, the update-date management table, and the support area management table, the update check means judges whether or not to update the attribute data and road shape of the check area of the map data, and the support area of the attribute data, which are stored in the on-board system. Then, the update check means transmits the result of the judgment to the on-board system, and if it is judged that they should be updated, the update check means transmits data required for the update.

Thus, according to the present invention, a concept of a support area used to identify a field-researched area is introduced to map data. Accordingly, only map data within a range of support areas is used for the driving control of the vehicle. As a result, according to the present invention, it becomes possible to perform the highly accurate control in a system for performing the driving control of a vehicle using map data.

BRIEF DESCRIPTION OF THE DRAWINGS

FIG. 3 is a diagram illustrating difference information that is transmitted by the map update server according to the first embodiment of the present invention;

FIG. 4 is a diagram illustrating a correspondence table in which the driving control of the vehicle is associated with map data used for the driving control according to the first embodiment of the present invention;

FIG. 5 is a diagram schematically illustrating a data structure of map data used in the first embodiment of the present invention;

FIG. 6 is a diagram schematically illustrating a data structure of an attribute-value management table according to the first embodiment of the present invention;

FIG. 8 is a diagram schematically illustrating a data structure of the terminal-side (car information system-side) attribute-value-basis support area management table 110 according to the first embodiment of the present invention;

FIG. 9 is a diagram schematically illustrating a terminal-side road shape/attribute data update date management table according to the first embodiment of the present invention;

FIG. 10 is a diagram schematically illustrating a data structure of the server-side road shape/attribute data update date management table 320 according to the first embodiment of the present invention;

FIGS. 20A through 20C are diagrams each illustrating the driving control/warning mode used for the driving control of the vehicle, and setting conditions, according to the first embodiment of the present invention;

FIG. 26 is a diagram schematically illustrating a data structure of the vehicle-basis attribute-value management table 330 according to the second embodiment of the present invention;

FIG. 27 is a flowchart illustrating steps of the driving judgment processing, and steps of the update check details setting processing, which are performed by the car information system according to the second embodiment of the present invention;

FIG. 33 is a diagram schematically illustrating a data structure of the driving-control-unit-basis update date management table 132 according to the third embodiment of the present invention;

DETAILED DESCRIPTION OF THE PREFERRED EMBODIMENTS

Embodiments of the present invention will be described with reference to drawings as below.

First Embodiment

First of all, a first embodiment of the present invention will be described.

First, a functional configuration of a vehicle control system to which the first embodiment is applied will be described with reference to FIG. 1.

Figure 1:
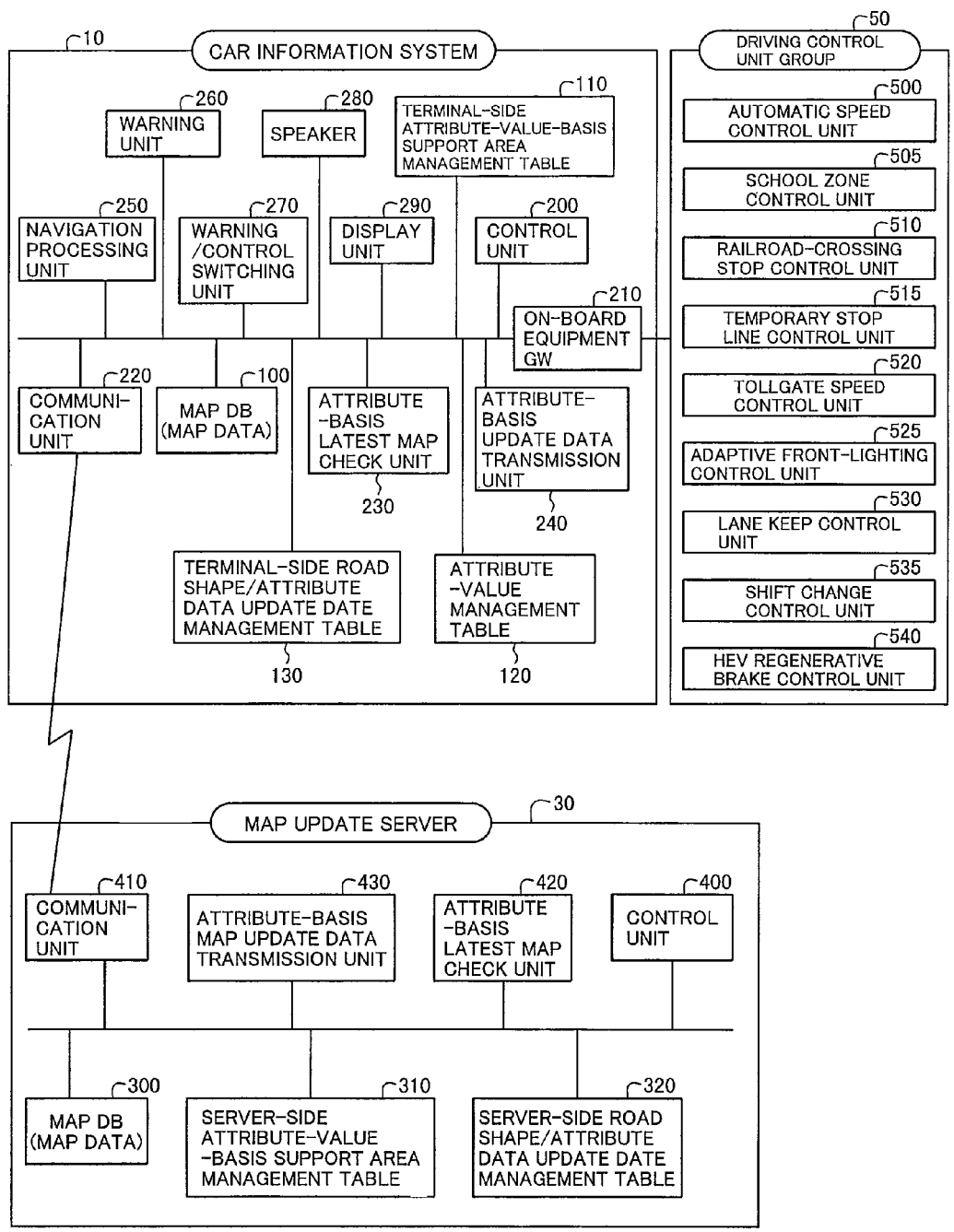
FIG. 1 is a functional block diagram illustrating a vehicle control system according to a first embodiment of the present invention.

FIG. 1 is a functional block diagram illustrating a vehicle control system according to the first embodiment of the present invention.

As illustrated in the figure; the vehicle control system includes: an on-board system that includes a car information system 10, and a driving control unit group 50; and a map update server 30 for providing map data, and information about the map data. A vehicle is equipped with the car information system 10 and the driving control unit group 50. The map update server 30 is located in a map center that provides services for delivering map data through networks (for example, portable telephone lines).

First of all, the vehicle control system according to the first embodiment will be schematically described.

The car information system 10 provides users (a driver and fellow passengers) with a function of a car navigation device, and controls the operation of the driving control unit group 50. The car information system 10 has a map DB 100 in which map data is registered, the map data including: road data showing links and nodes, which form roads (the road data includes data showing how each road is shaped); and attribute data that accompanies each road (attribute values including the speed limit, curvature, and grade of each road, and information indicating that the road includes a school zone). The map data is classified on a mesh area basis. The mesh areas are formed by sectioning a map into a plurality of areas. In addition, the car information system 10 includes a terminal-side attribute-value-basis support area management table 110 in which each piece of attribute data is associated with information indicating an area (support area) that has been actually subjected to field research. Moreover, the car information system 10 includes a terminal-side road shape/attribute data update date management table 130 in which the update date of a road shape of each road included in the map data, and the update date of attribute data of the each road, are registered.

The car information system 10 communicates with the map update server 30 to make a check whether or not road shapes, attribute data, and support areas, which are included in the map data stored in the car information system 10 in question, are kept in the latest version. As a result of the check, if it is judged that the map data stored in the car information system 10 is not kept in the latest version, the car information system 10 acquires, from the map update server 30, difference information between the map data stored in the car information system 10 and map data kept in the latest version. According to a request from a user, the car information system 10 updates the stored map data in question by use of the acquired difference information.

In addition, according to this embodiment, if it is judged that the map data stored in the car information system 10 is the latest-version map data, and if an area through which the vehicle is estimated to travel (for example, an area within a specified distance range from a current position of the vehicle), which is specified by the map data, is a support area, the car information system 10 cooperates with the driving control unit group 50 to perform the driving control of the vehicle by use of the map data. Incidentally, even if it is judged that the stored map data in question is the latest-version map data, if the area through which the vehicle is estimated to travel is not the support area, the car information system 10 does not perform the driving control of the vehicle by use of the map data.

Moreover, even if it is judged that the map data stored in the car information system 10 is not the latest-version map data, if the length of time elapsed after the update of the map data is only a specified period of time, and if specified requirements are satisfied, the car information system 10 warns the users by use of the map data (in this case, the car information system 10 does not perform the driving control by use of the map data). The case where the specified requirements are satisfied means that a specified area of the map data (for example, an area within the specified distance from a current position of the vehicle, or a mesh area to which a searched path belongs) is a support area.

Here, the support area will be described with reference to FIG. 2.

Figure 2:
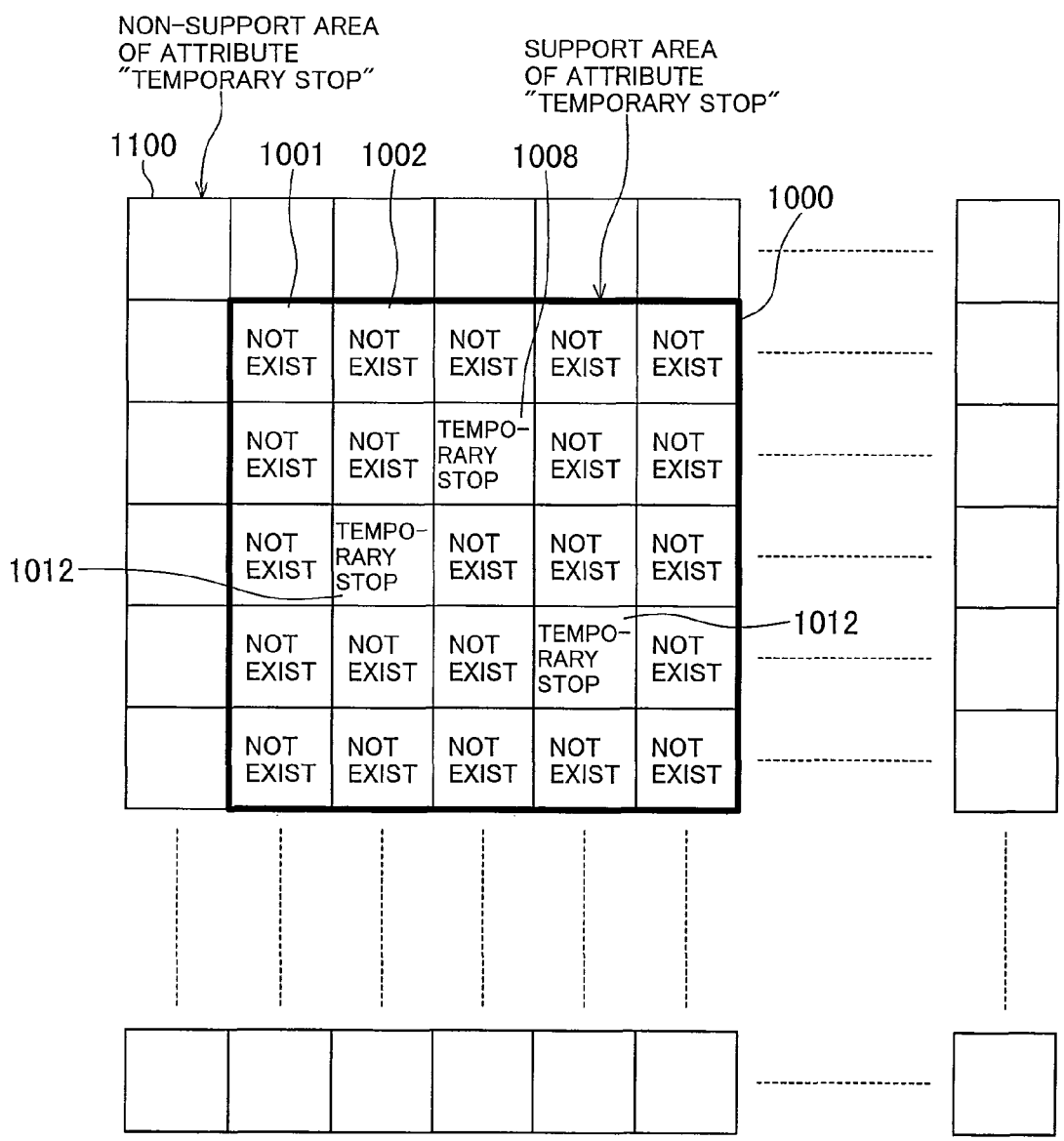
FIG. 2 is a diagram illustrating a support area used in the first embodiment of the present invention.

FIG. 2 is a diagram illustrating a support area used in the first embodiment of the present invention. Incidentally, FIG. 2 schematically illustrates extracted part of meshes that form map data. In addition, FIG. 2 illustrates an example in which whether or not temporary stop information exists is used as attribute data.

In the illustrated example, an inside area surrounded by thick lines represents a support area 1000, whereas an area outside the inside area surrounded by the thick lines represents a non-support area. The non-support area is not subjected to field research of whether or not temporary stop information exists. Therefore, the non-support area is an area for which whether or not temporary stop information exists is not registered. The support area 1000 is an area in which whether or not temporary stop information exists is field-researched on a mesh basis, and for which information about whether or not temporary stop information exists is registered on a mesh basis. For example, meshes 1001, 1002 are meshes in which as a result of the field research, it is judged that temporary stop information does not exist. In addition, meshes 1008, 1012 are meshes in which as a result of the field research, it is judged that temporary stop information exists.

Thus, in this embodiment, the concept of the support area is used to manage map data. The existing map data does not have this concept. This enables the discrimination between (a) a mesh having no attribute data because the mesh is included in a non-support area, and (b) a mesh which is judged by the field research that no attribute data exist. In this embodiment, map data corresponding to a mesh included in a support area is used for the driving control. On the other hand, map data corresponding to a mesh, which does not included in the support area, is not used for the driving control. To be more specific, in this embodiment, because only correct map data, which has been actually subjected to the field research, is used for the driving control, it becomes possible to achieve the vehicle driving control with high accuracy.

Returning to FIG. 1, the description will be continued. The map update server 30 stores: a map DB 300 in which the latest-version map data (master map data) is registered; a server-side attribute-value-basis support area management table 310 in which each piece of attribute data, which is included in the master map data registered in the map DB 300, is associated with each area (support area) that has been actually subjected to the field research; and a server-side road shape/attribute data update date management table 320 in which the update date of a road shape of each road included in the master map data, and the update date of attribute data of the each road, are registered.

In response to a request ("update-data check request" described below) received from the car information system 10, the map update server 30 checks whether or not map data stored in the car information system 10 is kept in the latest version. The map update server 30 transmits the result of the check to the car information system 10.

In addition, the map update server 30 receives a request ("update-data receive request" described below) from the car information system 10. Then, in response to the received update-data receive request, the map update server 30 transmits, to the car information system 10, difference information between the map data stored in the car information system 10 and the map data stored in the map update server 30.

Here, the difference information will be described with reference to FIG. 3. FIG. 3 is a diagram illustrating difference information that is transmitted by the map update server according to the first embodiment of the present invention.

FIG. 3 illustrates an example of three pieces of map data 2000a through 2000c whose versions differ from one another. The version of the map data 2000a is the oldest among the three pieces of illustrated map data 2000a through 2000c. The map data 2000b is updated from the map data 2000a. The map data 2000c is updated from the map data 2000b. In addition, inside areas, which are surrounded by thick lines in the pieces of map data 2000a through 2000c, are support areas 1000a through 1000c respectively. Here, whether or not temporary stop information exists is used as attribute data.

The map data 2000b is obtained by updating attribute data of meshes A, B included in the support area 1000a of the map data 2000a. To be more specific, as a result of the field research, it is judged that each of the meshes A, B is an area in which temporary stop information exists. Therefore, the map data 2000a is updated to the map data 2000b. In this case, difference information between the map data 2000a and the map data 2000b becomes attribute data that is added to the meshes A, B. Therefore, the map update server 30 transmits, to the car information system 10, information showing that attribute data indicating the existence of temporary stop information is added to the meshes A, B as difference information.

In addition, the map data 2000c is made by extending the support area b of the map data 2000b. To be more specific, as a result of the field research, meshes C, D, E, F, G, H, I, J are newly added to the support area. In this case, difference information between the map data 2000b and the map data 2000c becomes the meshes C, D, E, F, G, H, I, J that have been added to the support area. Therefore, the map update server 30 transmits, to the car information system 10, information showing that the meshes C, D, E, F, G, H, I, J have been added to the support area as difference information.

Next, a configuration of a vehicle control system according to the first embodiment will be specifically described with reference to FIG. 1.

The car information system 10 includes the map DB 100, the terminal-side attribute-value-basis support area management table 110, an attribute-value management table 120, the terminal-side road shape/attribute data update date management table 130, a control unit 200, an on-board equipment gateway (GW) 210, a communication unit 220, an attribute-basis latest map check unit 230, an attribute-basis update data transmission unit 240, a navigation processing unit 250, a warning unit 260, a warning/control switching unit 270, a speaker 280, and a display unit 290.

Here, the following are connected to the car information system 10: a GPS receiving unit (not illustrated) for receiving a signal (GPS signal) from a satellite by a GPS (Global Positioning System); input units (not illustrated) for accepting user's operation, such as an operation switch; and various kinds of sensors (not illustrated) such as a vehicle speed sensor and a gyro sensor. Incidentally, the GPS receiving unit receives a GPS signal, and then measures the distance between the vehicle and each of three or more GSP satellites, and a rate of change in each distance to measure a current position, a travelling direction, and a travelling azimuth, of the vehicle. After that, the GPS receiving unit outputs the measured data to the car information system 10.

Because the map DB 100, the terminal-side attribute-value-basis support area management table 110, and the terminal-side road shape/attribute data update date management table 130 have been described as above, the description thereof will be omitted. Incidentally, a data structure of the terminal-side attribute-value-basis support area management table 110, and that of the terminal-side road shape/attribute data update date management table 130, will be described later.

The attribute-value management table 120 is used to judge attribute data that is used for the driving control by the vehicle equipped with the on-board system. To be more specific, the attribute-value management table 120 associates each kind of attribute data with data indicating whether or not the driving control unit group 50 located in the vehicle uses the attribute data in question (refer to FIG. 6).

The control unit 200 controls the operation of the car information system 10 as a whole. The control unit 200 controls each function unit of the car information system 10 so that the map update server 30 is accessed to update map data registered in the map DB 100 to the latest version, and so that the driving control unit group 50 executes the driving control.

The on-board equipment GW 210 is a gateway for performing communications between the car information system 10 and the driving control unit group 50. Incidentally, this embodiment takes, as an example, a case where the driving control unit group 50 is connected to a controller area network (CAN) that is located in the vehicle. To be more specific, the on-board equipment GW 210 performs communications with each unit constituting the driving control unit group 50 that is connected to the CAN.

The communication unit 220 communicates with apparatuses outside the vehicle through networks (for example, portable telephone lines). For example, the communication unit 220 communicates with the map update server 30 located in the map center.

The attribute-basis latest map check unit 230 access the map update server 30 through the communication unit 220 to make an inquiry as to whether or not the map data registered in the map DB 100 is the latest one. Incidentally, the specific processing which the attribute-basis latest map check unit 230 performs will be described later.

If the map data registered in the map DB 100 is not the latest one (if there is update data corresponding to the map data registered in the map DB 100), the attribute-basis update data transmission unit 240 accesses the map update server 30 through the communication unit 220 to acquire difference information between the map data registered in the map DB 100 and the master map data stored in the map update server 30. Incidentally, the specific processing which the attribute-basis update data transmission unit 240 performs will be described later.

The navigation processing unit 250 provides a function of a car navigation device. The navigation processing unit 250 periodically calculates a current position of the vehicle by use of: positioning data received from the GPS receiving unit (not illustrated); signals detected by various kinds of sensors (not illustrated) such as a vehicle speed sensor and a gyro sensor: and the map data. Then, the navigation processing unit 250 generates a map image in which the periodically calculated current position is illustrated on a map, and displays the generated map image on the display unit 290. In addition, the navigation processing unit 250 searches for a recommended path to a destination specified by a user so that the recommended path is presented to the user.

Moreover, the navigation processing unit 250 according to this embodiment includes: a free driving mode in which a current position of the vehicle is displayed on a map without searching for a recommended path; and a navigated route driving mode in which a recommended path is searched for so that the vehicle is guided through the recommended path that has been searched for. The navigation processing unit 250 guides the user according to each of the modes.

In the free driving mode, the navigation processing unit 250 reads out, from the map DB 100, map data of an area around the calculated current position, and then generates a map image, in which the current position is illustrated on the map, so that the map image is displayed on the display unit 290.

In the navigated route driving mode, the navigation processing unit 250 receives a path search request from the user, and then uses map data to search for a recommended path from a current position (or a departure place specified by the user) to a destination. Then, the navigation processing unit 250 guides the user to the destination by use of the periodically calculated current position, the recommended path that has been searched for, and the map data. For example, with a screen image, in which a recommended path is overlayed on a map, displayed on the display unit 290, the navigation processing unit 250 displays, on the screen, information which is required for the vehicle to travel through the recommended path (for example, information as to whether or not the vehicle should turn at the next intersection), or informs the user of the information by use of the speaker 290.

Moreover, if the map data is a support area, the navigation processing unit 250 cooperates with the warning unit 260 to issue a warning to the user, and/or cooperates with the driving control unit group 50 to perform the driving control of the vehicle.

The warning unit 260 issues a warning to the user by use of the information that has been acquired from the navigation processing unit 250. The warning unit 260 warns the user by issuing a voice warning from the speaker 280, and/or by displaying a warning image on the display unit 290. For example, when the vehicle travels through an area that is close to a school zone, the warning unit 250 gives the user a warning to the effect that the vehicle is travelling through the area close to the school zone.

The warning/control switching unit 270 switches to any one of a driving control mode in which driving control is executed, a warning mode in which warning processing is executed, and an uncontrolled mode in which neither the driving control nor the warning processing is executed. Incidentally, the processing of the warning/control switching unit 270 will be described in detail later with reference to FIG. 16.

The speaker 280 outputs audio data received from the warning unit 260, and outputs audio data received from the navigation processing unit 250.

The display unit 290 is a display device that includes a liquid crystal display. The display unit 290 displays various kinds of images including map images.

Incidentally, this embodiment does not particularly limit a hardware configuration for implementing each of the above-described functions of the car information system 10. The description below takes, as an example, a case where the car information system 10 is configured as a system that includes: an information processing unit including a CPU, a memory, a communication interface (IF), and an I/O interface (IF); the display unit 290 such as a liquid crystal display; the speaker 280; and the on-board equipment GW 210.

In this case, the memory stores the map DB 100, the terminal-side attribute-value-basis support area management table 110, the attribute-value management table 120, and the terminal-side road shape/attribute data update date management table 130. In addition, the memory also stores programs for implementing functions of the control unit 200, the communication unit 220, the attribute-basis latest map check unit 230, the attribute-basis update data transmission unit 240, the navigation processing unit 250, the warning unit 260, and the warning/control switching unit 270 respectively. The functions of the control unit 200, the communication unit 220, the attribute-basis latest map check unit 230, the attribute-basis update data transmission unit 240, the navigation processing unit 250, the warning unit 260 and the warning/control switching unit 270 are achieved by the execution of the programs stored in the memory by the CPU respectively.

Incidentally, instead of implementing the functions of the control unit 200, the communication unit 220, the attribute-basis latest map check unit 230, the attribute-basis update data transmission unit 240, the navigation processing unit 250, the warning unit 260, and the warning/control switching unit 270 by software, the functions may also be implemented by hardware circuits (for example, ASIC (Application Specific Integrated Circuit)), each of which is specifically designed to implement each of the functions.

Next, a configuration of the map update server 30 will be specifically described. The map update server 30 includes the map DB 300, the server-side attribute-value-basis support area management table 310, the server-side road shape/attribute data update date management table 320, the control unit 400, the communication unit 410, the attribute-basis latest map check unit 420, and an attribute-basis map update data transmission unit 430.

Incidentally, because the map DB 300, the server-side attribute-value-basis support area management table 310, and the server-side road shape/attribute data update date management table 320 were described above, description thereof will be omitted here.

The control unit 400 controls the operation of the map update server 30 as a whole.

The communication unit 410 communicates with outside apparatuses through networks (for example, portable telephone lines). For example, the communication unit 410 communicates with the car information system 10 that is located in the vehicle.

On the receipt of an update-data check request from the car information system 10 through the communication unit 410, the attribute-basis latest map check unit 420 checks whether or not map data stored in the car information system 10, which has transmitted the update-data check request in question, is the latest one. Through the communication unit 410, the attribute-basis latest map check unit 420 transmits the result of the check to the car information system 10 that has transmitted the update-data check request in question. Incidentally, the processing of the attribute-basis latest map check unit 420 will be described in detail later.

On the receipt of an update-data receive request from the car information system 10 through the communication unit 410, the attribute-basis map update data transmission unit 430 determines difference information between the map data stored in the car information system 10, which has transmitted the update-data receive request in question, and master map data registered in the map DB 300. Through the communication unit 410, the attribute-basis map update data transmission unit 430 transmits the determined difference information to the car information system 10 that has transmitted the update-data receive request in question. Incidentally, the processing of the attribute-basis map update data transmission unit 430 will be described in detail later.

Incidentally, this embodiment does not particularly limit a hardware configuration for implementing each of the above-described functions of the map update server 30. The description below takes, as an example, a case where the map update server 30 is formed of an information processing unit including a CPU, a memory, a communication interface (IF), and an I/O interface (IF). In this case, the memory stores the map DB 300, the server-side attribute-value-basis support area management table 310, and the server-side road shape/attribute data update date management table 320. In addition, the memory also stores programs for implementing functions of the control unit 400, the communication unit 410, the attribute-basis latest map check unit 420, and the attribute-basis update data transmission unit 430 respectively. The functions of the control unit 400, the communication unit 410, the attribute-basis latest map check unit 420, and the attribute-basis update data transmission unit 430 are achieved by the execution of the programs stored in the memory by the CPU respectively.

Incidentally, instead of implementing the functions of the control unit 400, the communication unit 410, the attribute-basis latest map check unit 420, the attribute-basis update data transmission unit 430 by software, the functions may also be implemented by hardware circuits (for example, ASIC (Application Specific Integrated Circuit)), each of which is specifically designed to implement each of the functions.

Next, the driving control unit group 50 will be described.

The driving control unit group 50 accepts a driving control execution request from the car information system 10. As soon as the driving control unit group 50 accepts the driving control execution request, the driving control unit group 50 communicates with the car information system 10 to acquire, from the car information system 10, data required for the driving control (for example, information indicating that a vehicle is approaching a school zone). Then, the driving control unit group 50 performs the driving control of the vehicle by use of the acquired data.

To be more specific, the driving control unit group 50 includes an automatic speed control unit 500, a school zone control unit 505, a railroad-crossing stop control unit 510, a temporary stop line control unit 515, a tollgate speed control unit 520, an adaptive front-lighting control unit 525, a lane keep control unit 530, a shift change control unit 535, and a HEV (Hybrid Electric Vehicle) regenerative brake control unit 540. Incidentally, it is assumed that the vehicle speed has been inputted into the driving control unit group 50 from the speed sensor.

The automatic speed control unit 500 cooperates with the car information system 10, and if a speed limit is exceeded, the automatic speed control unit 500 issues a warning. Moreover, if the overspeed state continues for a specified period of time (for example, five seconds) or more, the automatic speed control unit 500 controls the vehicle so that the vehicle speed becomes lower than the legal speed. In this embodiment, specific steps of the automatic speed control are not particularly limited. However, for example, the automatic speed control may also be performed as below. The description below takes, as an example, a case where the car information system 10 monitors the vehicle speed, and performs the warning processing, whereas the driving control unit group 50 controls the vehicle speed.

To be more specific, the navigation processing unit 250 of the car information system 10 monitors overspeeding of the vehicle by use of a periodically calculated current position of the vehicle, a shape of a road included in map data, and attribute data (speed limit (legal speed) information) of the road, and the vehicle speed received from the speed sensor. If the vehicle speed received from the speed sensor exceeds the speed limit (speed limit of a road in which the current position exists), the navigation processing unit 250 issues a warning to a user through the warning unit 260. In this case, for example, the warning unit 260 displays an image for giving the warning on the display unit 290, and/or outputs an alarm to the speaker 290.

Moreover, if the overspeed state continues for a specified period of time (for example, five seconds) or more, the navigation processing unit 250 notifies the automatic speed control unit 500 that the speed limit is exceeded. This notification includes information indicating the speed limit of the road in which the current position exists.

On the receipt of the notification from the navigation processing unit 250, the automatic speed control unit 500 uses information included in the notification to control each unit (an engine, a transmission, and a brake) of the vehicle so that the speed of the vehicle becomes lower than or equal to the speed limit (the legal speed).

The school zone control unit 505 cooperates with the car information system 10, and if the vehicle approaches a school zone, the school zone control unit 505 notifies the user of this situation so that the vehicle speed is further decreased. Specific steps of the school zone control are not particularly limited here. However, for example, the school zone control may also be performed as below. The description below takes, as an example, a case where the car information system 10 monitors whether or not the vehicle has entered a school zone, and performs the warning processing, whereas the driving control unit group 50 performs the driving control to be performed when the vehicle has entered the school zone.

By use of a periodically calculated current position of the vehicle, a shape of a road included in map data, and attribute data of the road (information as to whether or not the road includes a school zone), the navigation processing unit 250 of the car information system 10 monitors whether or not the vehicle has entered the school zone.

Then, the navigation processing unit 250 makes a judgment as to whether or not the vehicle has reached a position that is spaced away from the school zone by the specified distance (for example, 50 m). If it is judged that the vehicle has reached the position that is spaced away from the school zone by the specified distance, the navigation processing unit 250 notifies the user that the vehicle is approaching the school zone. For example, the navigation processing unit 250 instructs the warning unit 260 of the car information system 10 to issue a warning. In this case, the navigation processing unit 250 also notifies the school zone control unit 505 of the driving control unit group 50 that the vehicle is approaching the school zone. On the receipt of the above-described notification, the school zone control unit 505 judges from the vehicle speed acquired from the speed sensor whether or not the vehicle is decreasing the vehicle speed thereof. If it is judged that the vehicle is not decreasing the vehicle speed, the school zone control unit 505 decreases the engine power.

In addition, when the vehicle has entered the school zone, the navigation processing unit 250 notifies the users that the vehicle has entered the school zone, and also gives the same notification to the school zone control unit 505. On the receipt of the notification to the effect that the vehicle has entered the school zone, the school zone control unit 505 checks whether or not the vehicle is decreasing the vehicle speed thereof. If a state in which the vehicle is not decreasing the vehicle speed thereof continues for a specified period of time (for example, two seconds), the school zone control unit 505 performs the control so that the transmission is shifted down.

Moreover, if the vehicle has traveled the specified distance (for example, 50 m) after the vehicle has entered the school zone, the navigation processing unit 250 notifies the users that the vehicle is travelling through the school zone, and also gives the same notification to the school zone control unit 505. On the receipt of the notification to the effect that the vehicle is travelling through the school zone, the school zone control unit 505 checks whether or not the vehicle is decreasing the vehicle speed thereof. If it is judged that the vehicle is not decreasing the vehicle speed, the school zone control unit 505 controls a brake so that the speed of the vehicle is decreased to the specified speed (for example, 10 km per hour or less) or less.

The railroad-crossing stop control unit 510 cooperates with the car information system 10, and if the vehicle has reached a position that is spaced away from a railroad crossing by the specified distance, the railroad-crossing stop control unit 510 notifies the users of this situation. If the vehicle is not decreasing the vehicle speed thereof, the railroad-crossing stop control unit 510 decreases the vehicle speed. Specific steps of the railroad-crossing stop control are not particularly limited here. However, for example, the railroad-crossing stop control may also be performed as below. The description below takes, as an example, a case where the car information system 10 monitors whether or not the vehicle is approaching a railroad crossing, and performs the warning processing, whereas the driving control unit group 50 performs the driving control to be performed when the vehicle is approaching the railroad crossing.

By use of a periodically calculated current position of the vehicle, a shape of a road included in map data, and attribute data of the road (information indicating whether or not a railroad crossing exists), the navigation processing unit 250 of the car information system 10 monitors whether or not the vehicle is approaching the railroad crossing.

If the vehicle has reached a position that is spaced away from a temporary stop position of the railroad crossing by the first distance (for example, 200 m before the temporary stop position), the navigation processing unit 250 notifies the users of this situation. For example, the warning unit 260 gives a warning to the user.

In addition, if the vehicle has reached a position that is spaced away from the temporary stop position of the railroad crossing by the second distance (for example, 60 m before the temporary stop position) that is shorter than the first distance, the navigation processing unit 250 judges whether or not the vehicle is decreasing the vehicle speed thereof. If it is judged that the vehicle is not decreasing the vehicle speed, the navigation processing unit 250 notifies the railroad-crossing stop control unit 510 of the driving control unit group 50 of this situation. On the receipt of the above-described notification, the railroad-crossing stop control unit 510 decreases the engine power.

Moreover, if the vehicle has reached a position that is spaced away from the temporary stop position of the railroad crossing by the third distance (for example, 40 m before the temporary stop position) that is shorter than the second distance, the navigation processing unit 250 judges whether or not the vehicle is decreasing the vehicle speed thereof. As a result of the above-mentioned judgment, if it is judged that the vehicle is not decreasing the vehicle speed, the navigation processing unit 250 notifies the railroad-crossing stop control unit 510 of this situation. On the receipt of the above-described notification, the railroad-crossing stop control unit 510 performs the control so that the transmission is shifted down to decrease the vehicle speed to such a level that the vehicle can be safely stopped.

Further, if the vehicle has reached a position that is spaced away from the temporary stop position of the railroad crossing by fourth distance (for example, 20 m before the temporary stop position) that is shorter than the third distance, the navigation processing unit 250 judges whether or not the vehicle is decreasing the vehicle speed thereof. As a result of the above-mentioned judgment, if it is judged that the vehicle is not decreasing the vehicle speed, the navigation processing unit 250 notifies the railroad-crossing stop control unit 510 of this situation. On the receipt of the above-described notification, the railroad-crossing stop control unit 510 controls the brake to decrease the vehicle speed to such a level that the vehicle can be safely stopped.

The temporary stop line control unit 515 cooperates with the car information system 10, and if the vehicle is approaching a temporary stop line on a road, the temporary stop line control unit 515 notifies the users of this situation, and decreases the vehicle speed. Specific steps of the temporary stop line control are not particularly limited here. However, the travelling speed of the vehicle may also be controlled according to, for example, steps that are similar to those of the railroad crossing control described above. Incidentally, road attribute data used for the temporary stop line control is information indicating whether or not a temporary stop line exists.

The tollgate speed control unit 520 cooperates with the car information system 10, and if the vehicle is approaching a tollgate, the tollgate speed control unit 520 notifies the users of this situation, and decreases the vehicle speed. Specific steps of the tollgate temporary stop line control are not particularly limited here. However, the travelling speed of the vehicle may also be controlled according to, for example, steps that are similar to those of the railroad crossing control described above. Incidentally, road attribute data used for the tollgate speed control is information indicating a position of the tollgate.

The adaptive front-lighting control unit 525 cooperates with the car information system 10 to control directions of head lights of the vehicle in response to a road shape. Specific steps of the adaptive front-lighting control are not particularly limited here. However, for example, the adaptive front-lighting control may also be performed as below. The description below takes, as an example, a case where the car information system 10 monitors whether or not the vehicle comes into a curve, monitors whether or not the vehicle has arrived at a change point of a slope such as an upward slope and a downward slope, and performs the warning processing, whereas the driving control unit group 50 performs the driving control.

By use of a periodically calculated current position of the vehicle, a shape of a road included in map data, and attribute data of the road (the curvature of the road, and the grade of the road), the navigation processing unit 250 monitors whether or not the vehicle comes into a curve, and monitors whether or not the vehicle has arrived at a change point of a slope such as an upward slope and a downward slope. If the navigation processing unit 250 judges that the vehicle is travelling through an area just before the curve, the navigation processing unit 250 notifies the adaptive front-lighting control unit 525 of this situation. Incidentally, the notification to the effect that the vehicle is travelling through an area just before the curve is configured to include attribute data of the road around the curve. On the receipt of the notification to the effect that the vehicle is travelling through an area just before the curve, the adaptive front-lighting control unit 525 uses the road attribute data in question to control right and left directions of the headlights of the vehicle.

In addition, if the navigation processing unit 250 judges that the vehicle is located at a change point of a slope such as an upward slope and a downward slope, the navigation processing unit 250 notifies the adaptive front-lighting control unit 525 of this situation. Incidentally, the notification to the effect that the vehicle is located at a change point of a slope such as an upward slope and a downward slope is configured to include attribute data of the road around the change point. On the receipt of the notification to the effect that the vehicle is located at the change point of the slope, the adaptive front-lighting control unit 525 uses the road attribute data in question to control up and down directions of the headlights.

The lane keep control unit 530 cooperates with the car information system 10 to judge whether or not the vehicle has deviated from a driving lane. If it is judged that the vehicle has deviated from the driving lane, the lane keep control unit 530 issues a warning, and also controls a steering angle of the vehicle. Specific steps of the lane keep control are not particularly limited here. However, for example, the lane keep control may also be performed as below. The description below takes, as an example, a case where the car information system 10 judges whether or not the vehicle has deviated from a driving lane, and performs the warning processing, whereas the driving control unit group 50 controls the steering angle of the vehicle when the vehicle has deviated from the driving lane.

By use of a periodically calculated current position of the vehicle, a shape of a road included in map data, and attribute data of the road (the width of the road, and the curvature of the road), the navigation processing unit 250 of the car information system 10 judges whether or not the vehicle has deviated from the driving lane thereof.

If the navigation processing unit 250 judges that the vehicle has deviated from the driving lane, the navigation processing unit 250 uses the warning unit 260 to notify the uses that the vehicle is deviating from the driving lane. In this case, for example, the warning unit 260 displays a warning on the display unit 290, and/or outputs an alarm to the speaker 280. Moreover, if the navigation processing unit 250 judges that the vehicle has deviated from the driving lane, the navigation processing unit 250 notifies the lane keep control unit 530 that the vehicle is deviating from the driving lane. This notification is configured to include road attribute data corresponding to a current position. On the receipt of the notification to the effect that the vehicle is deviating from the driving lane, the lane keep control unit 530 uses the road attribute data in question to control a steering angle of the vehicle.

The shift change control unit 535 cooperates with the car information system 10, and if it is judged that there is a curve or a slope ahead of the vehicle, the shift change control unit 535 performs the shift up/down control in response to the slope or the curve. Specific steps of the shift change control are not particularly limited here. However, for example, the shift change control may also be performed as below. The description below takes, as an example, a case where the car information system 10 judges whether or not there is a curve or a slope ahead of the vehicle, whereas the driving control unit group 50 performs the shift change control to be performed when it is judged that there is a curve or a slope ahead of the vehicle.

By use of a periodically calculated current position of the vehicle, a shape of a road included in map data, and attribute data of the road (information about the curvature of the road, and the grade of the road), the navigation processing unit 250 judges whether or not there a curve or a slope ahead of the vehicle that is travelling. If it is judged that there is a curve or a slope ahead of the vehicle that is travelling, the navigation processing unit 250 notifies the shift change control unit 525 of the driving control unit group 50 of this situation. This notification is configured to include attribute data of a road through which the vehicle is currently travelling, and attribute data of the forward part of the road (more specifically, a curved or sloped section of the road). On the receipt of the notification to the effect that there is a curve or a slope ahead of the travelling vehicle, the shift change control unit 535 uses the attribute data in question to perform the shift up/down control in response to the slope or the curve.

The HEV regenerative brake control unit 540 cooperates with the car information system 10 to use a regenerative brake for the longest possible time before the vehicle comes into a curve, so that the vehicle speed is decreased. In addition, if it is judged that the vehicle is travelling down a slope, the HEV regenerative brake control unit 540 uses the regenerative brake. Specific steps of the HEV regenerative control are not particularly limited here. However, for example, the HEV regenerative control may also be performed as below. The description below takes, as an example, a case where the car information system 10 judges whether or not the vehicle is approaching an area just before a curve, and judges whether or not the vehicle is travelling along a slope, whereas the driving control unit group 50 controls the HEV regenerative brake.

To be more specific, by use of a periodically calculated current position of the vehicle, a shape of a road included in map data, and attribute data of the road (the curvature of the road, and the grade of the road), the navigation processing unit 250 judges whether or not the vehicle is approaching an area just before a curve, and also judges whether or not the vehicle is travelling along a slope.

If it is judged that the vehicle is approaching a curve, or if it is judged that the vehicle is travelling along a slope (or the vehicle is approaching a slope), the navigation processing unit 250 notifies the HEV regenerative brake control unit 540 of this situation. This notification is configured to include attribute data of a road through which the vehicle is currently travelling, and attribute data of the forward part of the road (more specifically, a curved or sloped section of the road). On the receipt of the notification to the effect that the vehicle is approaching a curve, the HEV regenerative brake control unit 540 uses the attribute data in question to use the regenerative brake for the longest possible time before the vehicle comes into the curve, so that the vehicle speed is decreased. In addition, on the receipt of the notification to the effect that the vehicle is travelling along a slope, the HEV regenerative brake control unit 540 uses the regenerative brake to perform the driving control of the vehicle.

Here, a correspondence table in which each kind of the driving control is associated with map data used for the each kind of the driving control is shown in FIG. 4. In the correspondence table, each driving control processing, which is performed by the car information system 10 and the driving control unit group 50 in cooperation, is associated with data used for the each driving control processing.

Incidentally, because the driving control performed by the driving control unit group 50 can be achieved by the existing techniques, description thereof will be omitted here.

Next, a data structure of each data used in the first embodiment will be described.

FIG. 5 is a diagram schematically illustrating a data structure of map data used in the first embodiment of the present invention. FIG. 5 illustrates map data stored in the map DB 300 of the map update server 30 located in the map center, and map data stored in the map DB 100 of the car information system 10 located in the vehicle. Incidentally, a data structure of the map data stored in the map DB 300 is the same as that of the map data stored in the map DB 100.

As illustrated in the figure, the pieces of map data are classified into levels according to a scale of each piece of the map data. In addition, the pieces of map data are managed with the pieces of map data grouped into data used only for drawing of each map, and data that is handled as shared data used for drawing, warning, and the driving control.

To be more specific, the pieces of map data are classified into data 1010 through 1016 that correspond to seven levels from a level 0 up to a level 6 (levels classified according to a scale of each map) respectively. Incidentally, in this embodiment, the data 1010 corresponding to the level 0 is used only for map drawing. In addition, the data 1012, 1013, 1014, 1015, 1016 corresponding to the levels 2 through 6 are used only for map drawing. Moreover, the data 1011 corresponding to the level 1 is handled as shared data used for drawing, warning, and the driving control. When the map data of the car information system 10 is updated, only the data 1011 corresponding to the level 1 is involved. To be more specific, the car information system 10 accesses the map update server 30, and then checks only the data 1011 corresponding to the level 1 among the pieces of map data stored in the map DB 100 to determine whether or not the data 1011 has been updated. If it is determined that the data 1011 has been updated, the car information system 10 acquires difference information from the map update server 30 to update the map data of the map DB 100.

Next, a data structure of the attribute-value management table 120 will be described with reference to FIG. 6.

FIG. 6 is a diagram schematically illustrating a data structure of an attribute-value management table according to the first embodiment of the present invention.

The attribute-value management table 120 associates each kind of attribute data with data indicating whether or not the driving control unit group 50 located in the vehicle uses the attribute data in question. In the illustrated attribute-value management table 120, for example, "speed limit" is associated with "unassociated". This shows that the driving control unit group 50, which is located in the vehicle having the car information system 10, includes no control unit that uses the "speed limit" included in the map data. In addition, in the illustrated attribute-value management table 120, for example, "railroad crossing (information as to whether or not a railroad crossing exists)" is associated with "associated". This shows that the driving control unit group 50, which is located in the vehicle having the car information system 10, includes a control unit that uses the "railroad crossing (information as to whether or not a railroad crossing exists)" included in the map data.

Figure 7:
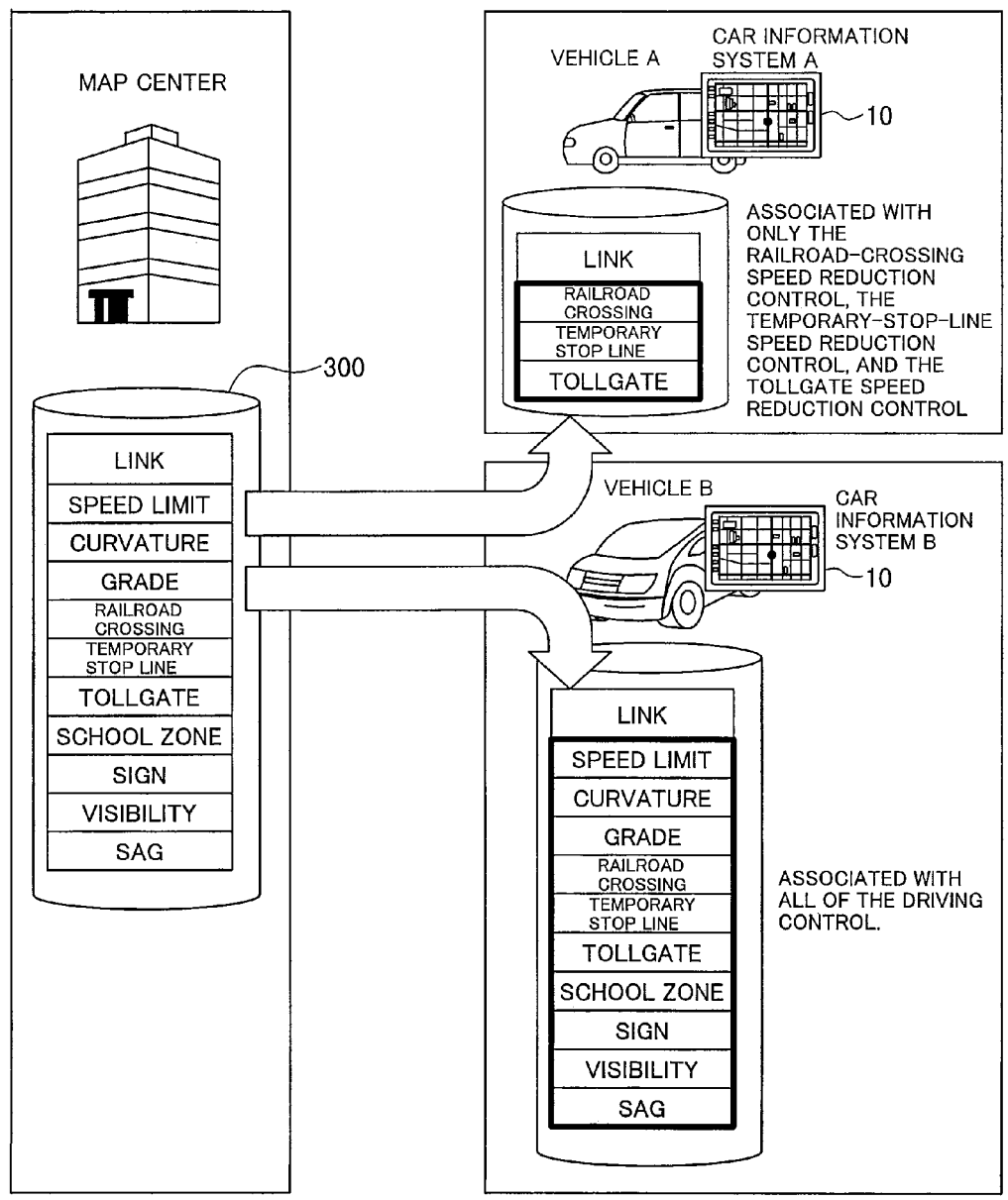
FIG. 7 is a diagram illustrating the relationship between the on-board system according to the first embodiment of the present invention and the attribute data.

Thus, as exemplified in FIG. 7, the reason why the car information system 10 is configured to include the attribute-value management table 120 is because in-vehicle driving control units differ on a vehicle basis.

FIG. 7 is a diagram illustrating the relationship between the on-board system according to the first embodiment of the present invention and the attribute data.

As illustrated in the figure, a vehicle A is equipped with driving control units that perform the railroad crossing stop control, the temporary stop line control, and the tollgate speed control. Accordingly, as attribute data used for the driving control, the vehicle A uses "railroad crossing (information as to whether or not a railroad crossing exists)", "speed limit", and "tollgate (information as to whether or not a tollgate exists)". On the other hand, a vehicle B is equipped with driving control units that perform the automatic speed control, the school zone control, the railroad crossing stop control, the temporary stop line control, the tollgate speed control, the adaptive front-lighting control, the lane keep control, the shift change control, the HEV regenerative brake control, the low visibility control, and the sag control. Therefore, as attribute data used for the driving control, the vehicle B uses all of the illustrated attribute data ("speed limit", "curvature", "grade", "railroad crossing", "temporary stop line", "tollgate", "school zone", "sign", "low visibility", and "sag").

In this embodiment, by using the attribute-value management table 120 to make it possible to check attribute data required for the driving control of the vehicle on a car information system basis, it becomes possible to eliminate the need for performing update check processing, and difference information acquisition processing, for all attribute data included in map data. To be more specific, performing the update check processing and the difference information acquisition processing only for attribute data required for the driving control of the vehicle suffices. For example, when a check is made as to whether or not attribute data used for the driving control is the latest version, the car information system A 10 included in the vehicle A has only to check only data relating to "railroad crossing (information as to whether or not a railroad crossing exists)", "speed limit", and "tollgate (information as to whether or not a tollgate exists)". As a result, at the time of the attribute-data update check processing and the difference information acquisition processing, it is possible to reduce the amount of data transferred between the car information system 10 and the map update server 30.

Next, the terminal-side attribute-value-basis support area management table 110 will be described with reference to FIG. 8.

FIG. 8 is a diagram schematically illustrating a data structure of the terminal-side attribute-value-basis support area management table 110 according to the first embodiment of the present invention.

The terminal-side attribute-value-basis support area management table 110 associates each kind of attribute data with information indicating each area (support area) that has been actually subjected to the field research. For example, in the illustrated example, "information as to whether or not a temporary stop line exists", which is attribute data, is associated with information indicating each field-researched area. In addition, "information as to whether or not an pedestrian crossing exists", which is attribute data, is associated with information indicating each field-researched area.

Here, attribute data registered in the terminal-side attribute-value-basis support area management table 110 is attribute data that is associated with information indicating "associated" in the attribute-value management table 120.

Next, the terminal-side road shape/attribute data update date management table 110 will be described with reference to FIG. 9.

FIG. 9 is a diagram schematically illustrating a terminal-side road shape/attribute data update date management table according to the first embodiment of the present invention.

The terminal-side road shape/attribute data update date management table 130 associates each area with a road shape and the update date of each attribute data. For example, in the illustrated example, each of areas 1 through 3 is associated with the registered update date of a road shape and the registered update date of each kind of attribute data. Incidentally, although not shown in the illustrated example, it is assumed that the update date of the support area management table 110 is also registered in the terminal-side road shape/attribute data update date management table 130.

Thus, the reason why the update date is registered is because it is necessary to check whether or not the map data registered in the map DB 100 is the latest version, and because it is thought that the reliability of data may change depending on the length of time elapsed after the update date (more specifically, with the increase in the length of time elapsed after the update date, the reliability of data becomes lower). In this embodiment, even if it is not possible to check whether or not the map data stored in the car information system 10 is kept in the latest version, if it is judged from the terminal-side road shape/attribute data update date management table 130 that a specified period of time (for example, two years) has not passed after the update date, the data is judged to be reliable. Therefore, the warning processing which uses the map data is performed on condition that a specified requirement (an area through which the vehicle is travelling is a support area) is satisfied. On the other hand, if it is judged that the specified period of time (for example, two years) has passed after the update date, the warning processing which uses the map data is not performed.

Next, the server-side attribute-value-basis support area management table 310 will be described.

A data structure of the server-side attribute-value-basis support area management table 310 is the same as that of the terminal-side attribute-value-basis support area management table 110 shown in FIG. 8. However, attribute data registered in the server-side attribute-value-basis support area management table 310 is attribute data (all kinds of attribute data) that is included in the master map data stored in the map DB 300.

Next, a data structure of the server-side road shape/attribute data update date management table 320 will be described with reference to FIG. 10.

FIG. 10 is a diagram schematically illustrating a data structure of the server-side road shape/attribute data update date management table 320 according to the first embodiment of the present invention.

The server-side road shape/attribute data update date management table 320 registers the update date of a road shape, and the update data of the attribute data, corresponding to each area of the master map data stored in the map DB 300, the road shape and the attribute data being included in the master map data. The data structure of the server-side road shape/attribute data update date management table 320 is the same as that of the terminal-side road shape/attribute data update date management table 110 shown in FIG. 8. However, the road shape and all kinds of attribute data, which are included in the master map data, are registered as attribute data. Incidentally, as is the case with the terminal-side road shape/attribute data update date management table 130, the server-side road shape/attribute data update date management table 320 also registers the update date of the support area management table 110.

Next, processing performed by the vehicle control system according to the first embodiment of the present invention will be described.

First of all, the whole processing performed by the on-board system according to the first embodiment will be described with reference to FIG. 11.

Figure 11:
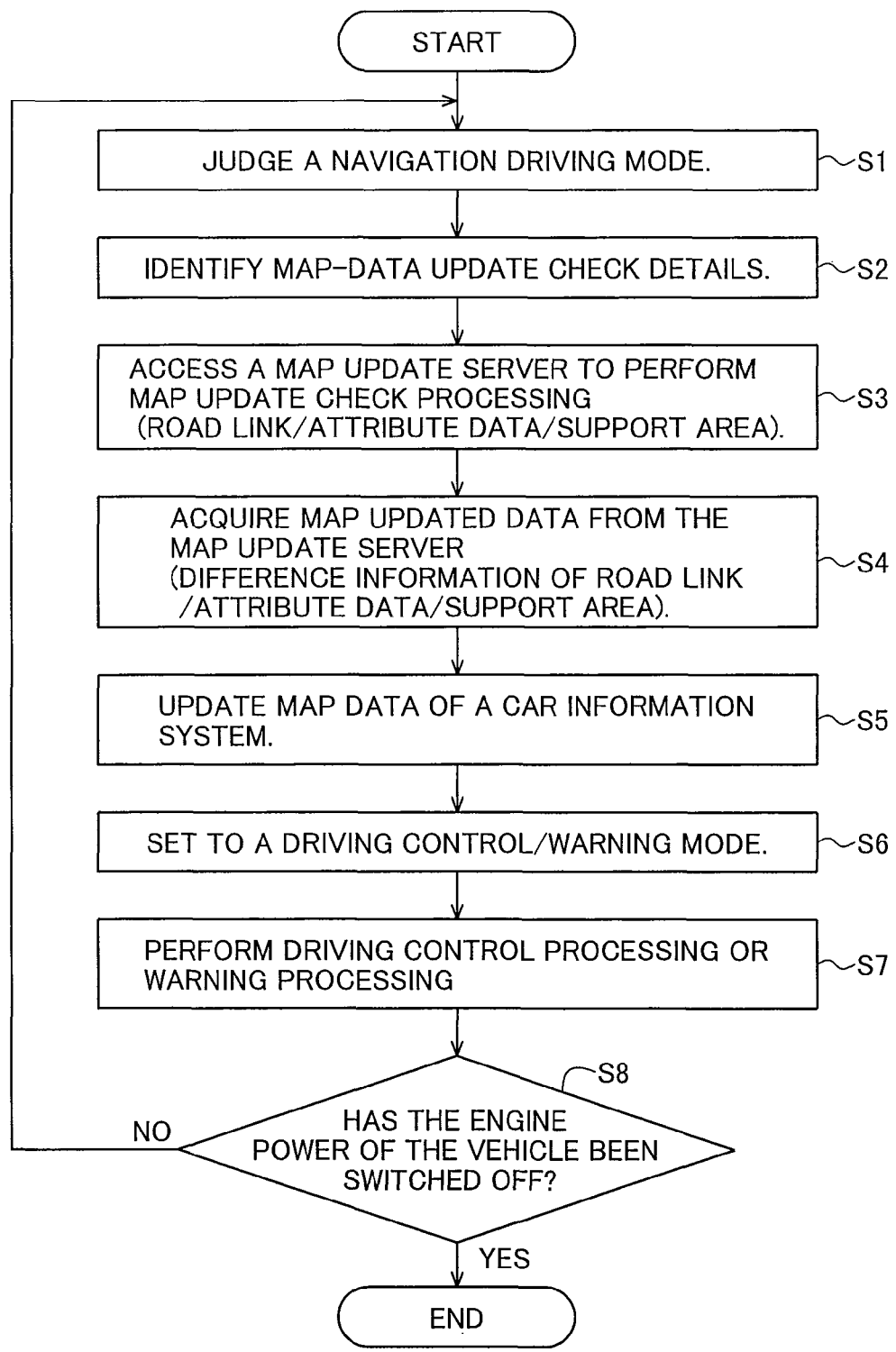
FIG. 11 is a flowchart schematically illustrating the whole processing performed by the on-board system according to the first embodiment of the present invention.

FIG. 11 is a flowchart schematically illustrating the whole processing performed by the on-board system according to the first embodiment of the present invention. Incidentally, the processing described below will be started when the engine power of a vehicle, which is equipped with the car information system 10 and the driving control unit group 50, is switched on (an ON state).

First of all, the control unit 200 of the car information system 10 judges a navigation driving mode (S1).

Next, the control unit 200 identifies map-data update check details (S2). To be more specific, by use of the terminal-side attribute-value-basis support area management table 110, the attribute-value management table 120, and the terminal-side road shape/attribute data update date management table 130, the control unit 200 identifies map-data update check details about which the control unit 200 inquires of the map update server 30. After that, the control unit 200 instructs the attribute-basis latest map check unit 230 to execute map update check processing. Incidentally, the processing of the steps S1, S2 will be specifically described with reference to FIG. 12 described below.

Next, the attribute-basis latest map check unit 230 performs the map update check processing (S3). To be more specific, on the receipt of the instruction from the control unit 200 to perform the map update check processing, the attribute-basis latest map check unit 230 accesses the map update server 30 through the communication unit 220 to perform the map update check processing (S3). As a result of the map update check processing, the attribute-basis latest map check unit 230 acquires, from the map update server 30, information as to whether or not it is necessary to update map data stored in the map DB 100, and then notifies the control unit 200 of the acquired information. Incidentally, the processing of the step S3 will be specifically described with reference to FIG. 13 described below.

Next, the control unit 200 instructs the attribute-basis update data transmission unit 240 to execute map update data acquisition processing (S4). Incidentally, the processing of the step S4 will be specifically described with reference to FIG. 14 described below.

Next, the control unit 200 performs update processing of the map data stored in the car information system 10 (S5). Incidentally, the processing of the step S5 will be specifically described with reference to FIG. 15 described below.

Next, the control unit 200 performs driving control/warning mode setting processing (S6). Incidentally, the processing of the step S6 will be specifically described with reference to FIG. 16 described below.

Next, the driving control unit group 50 cooperates with the car information system 10 to perform driving control processing or warning processing according to the mode that has been set in the step S6 (S7). Incidentally, the processing of the step S7 will be described later.

Then, when the engine power of the vehicle is switched off, the control unit 200 ends the processing (S8).

Subsequently, steps of the navigation driving judgment processing (S1), and steps of the update check details setting processing (S2), which are shown in FIG. 11, will be specifically described with reference to FIG. 12.

Figure 12:
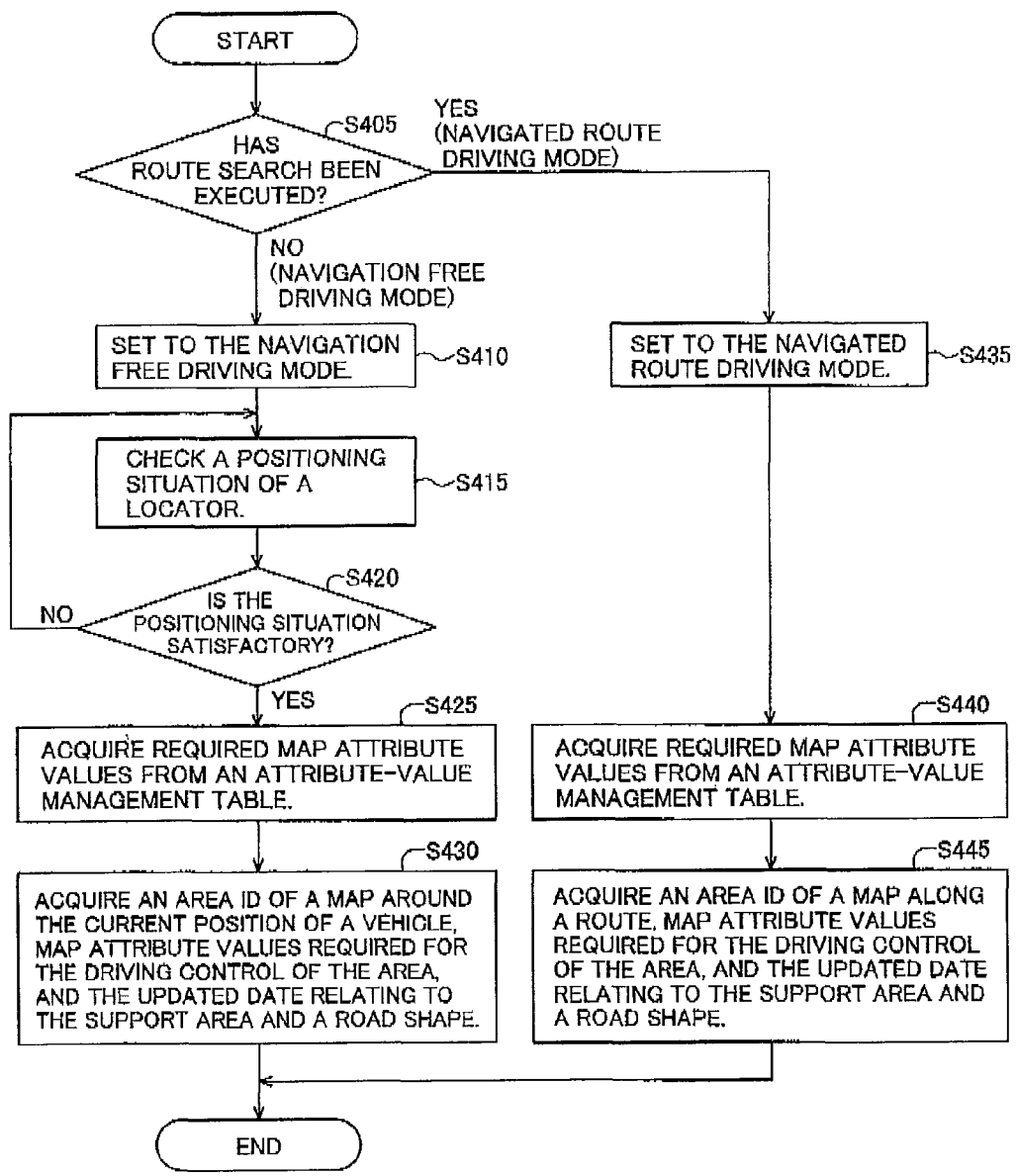
FIG. 12 is a flowchart specifically illustrating the processing steps of the steps S1, S2 shown in FIG. 11.

FIG. 12 is a flowchart specifically illustrating the processing steps of the steps S1, S2 shown in FIG. 11.

First of all, the control unit 200 checks whether or not the navigation processing unit 250 has executed path search. If it is judged that the path search has not been executed, the process proceeds to a step S410. On the other hand, if it is judged that the path search has been executed, the process proceeds to a step S435 (S405). To be more specific, the control unit 200 inquires of the navigation processing unit 250 about whether or not the navigation processing unit 250 has executed the path search. On the receipt of the inquiry from the control unit 200, the navigation processing unit 250 notifies the control unit 200 of information as to whether or not the navigation processing unit 250 has executed the path search. If the control unit 200 is notified by the navigation processing unit 250 of information to the effect that the path search has been executed, the process proceeds to the step S435. If the control unit 200 is notified by the navigation processing unit 250 of information to the effect that the path search has not been executed, the process proceeds to the step S410. Incidentally, if the navigation processing unit 250 has received a path search request from a user, and has searched for a path to a destination, the navigation processing unit 250 notifies the control unit 200 of information to the effect that the path search has been executed. On the other hand, if the navigation processing unit 250 has not searched for a path to the destination, the navigation processing unit 250 notifies the control unit that the path search has not been executed.

Next, processing of steps S410 through S430, which are executed when the path search has not been executed, will be described.

The control unit 200 sets a mode (driving mode) of processing for identifying an area of map data, which is used for driving control/warning processing (it may also be merely called "driving control"), to a navigation free driving mode (S410).

Next, the control unit 200 checks a positioning situation of a locator of the navigation processing unit 250 (a current position calculation function included in the navigation processing unit 250) (S415). If the positioning situation is judged to be satisfactory, the process proceeds to the step S425. If the positioning situation is judged to be unsatisfactory, the process returns to the step S415 (S420). Incidentally, how to check the positioning situation of the locator (the current position calculation function included in the navigation processing unit 250) is not particularly limited. It may also be so configured that, for example, if the receive sensitivity of a GPS signal received by the GPS receiving unit is higher than a specified value, the positioning is judged to be satisfactory, whereas if the receive sensitivity is lower than the specified value, the positioning is judged to be unsatisfactory. In addition, it may also be so configured that, for example, when a current position is calculated, the reliability of the calculated current position is determined, and if the reliability is higher than a specified value, the positioning is judged to be satisfactory, whereas if the reliability is lower than the specified value, the positioning is judged to be unsatisfactory. Incidentally, when the reliability of a current position is calculated, an existing calculation method is used.

In the step S425, the control unit 200 accesses the attribute-value management table 120 (shown in FIG. 6) to acquire required attribute data of map data. The required attribute data of the map data is constituted of each piece of attribute data, which is associated with information indicating "associated", among pieces of attribute data registered in the attribute-value management table 120.

The control unit 200 identifies an area (update check area) of the map data used for the driving control of the vehicle, and then acquires information about the identified update check area (attribute data, and the update date relating to a support area and a road shape that are the attribute data) that are required for the driving control (S430).

To be more specific, in the step S430, the control unit 200 identifies an area (update check area) of the map data, which is used for the driving control of the vehicle, according to processing steps determined by the driving mode set in the step S410 (in this case, the navigation free driving mode). Here, the steps determined by the navigation free driving mode will be described. In the navigation free driving mode, a path is not searched for (a destination is not inputted by a driver). According to this embodiment, in the case of the navigation free driving mode, an area within a specified distance range from a current position of the vehicle is estimated to be an area through which there is a possibility that the vehicle will travel thereafter. To be more specific, the control unit 200 acquires a current position of the vehicle from the navigation processing unit 250, and then estimates an area within the specific distance range from the current position to be an area through which the vehicle travels. Then, the estimated area of the map data is used as an area (update check area) of the map data, the area being used for the driving control of the vehicle.

Next, the control unit 200 accesses the terminal-side attribute-value-basis support area management table 110, and the terminal-side road shape/attribute data update date management table 130 to extract information required for the driving control from among the update check areas of the map data. To be more specific, the control unit 200 accesses the terminal-side attribute-value-basis support area management table 110 to acquire, from among the update check areas of the map data, a support area that is associated with the attribute data acquired in the step S425. In addition, the control unit 200 accesses the terminal-side road shape/attribute data update date management table 130 to acquire, from among the update check areas of the map data, the acquired attribute data, the update date of the support area, and the update date of the road shape. After that, the control unit 200 requests the attribute-basis latest map check unit 230 to perform the map update check processing of the map update server 30.

Here, the processing of identifying an update check area in the step S430, which is performed when the navigation free driving mode is set as a driving mode, will be described with reference to FIGS. 17, 18.

Figure 17:
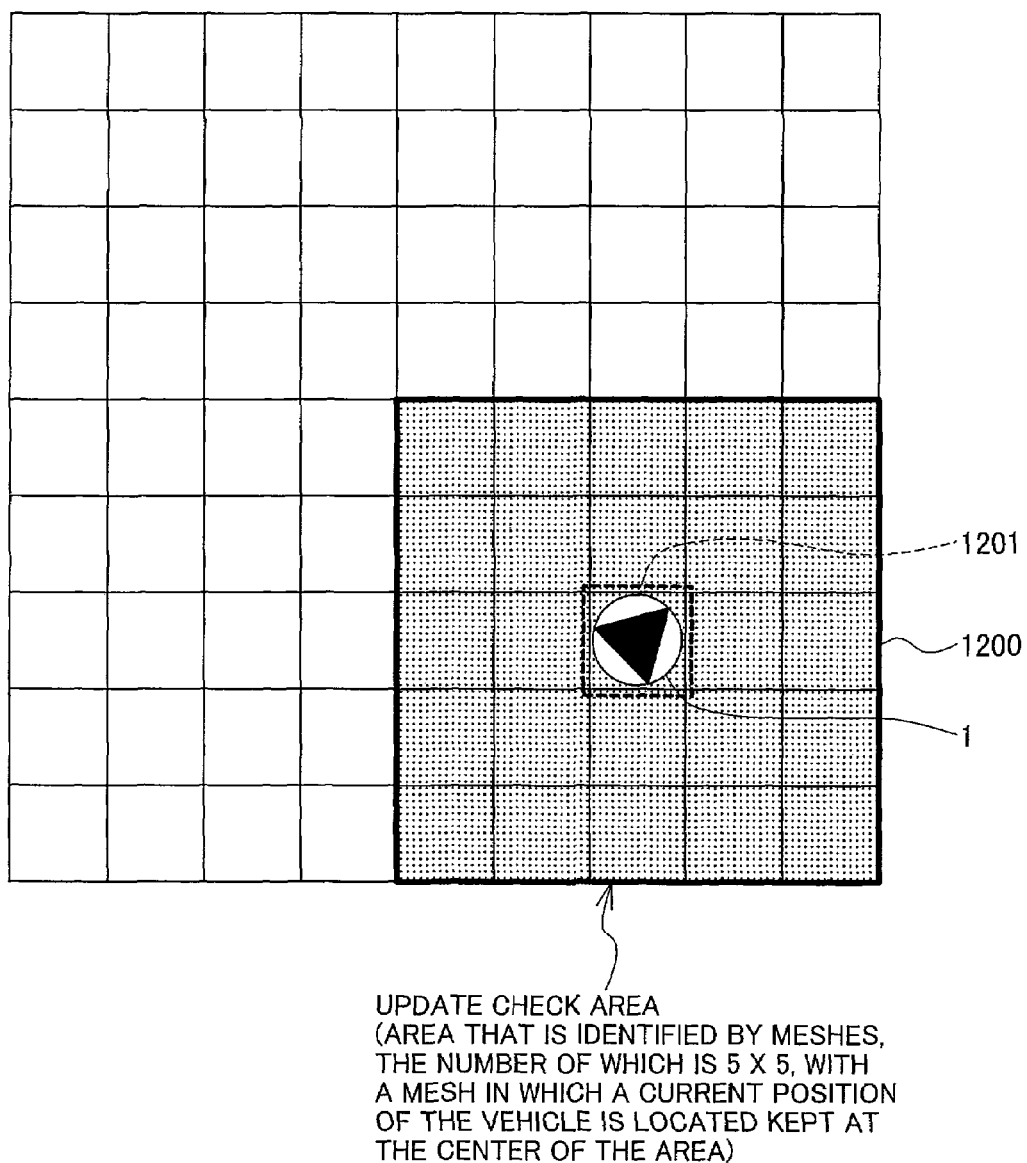
FIG. 17 is a diagram illustrating an update check area defined when an engine of the vehicle is started up in the navigation free driving mode according to the first embodiment of the present invention.

FIG. 17 is a diagram illustrating an update check area defined when an engine of the vehicle is started up in the navigation free driving mode according to the first embodiment of the present invention. FIG. 18 is a diagram illustrating an update check area defined when the vehicle is travelling in the navigation free driving mode according to the first embodiment of the present invention. Incidentally, reference numeral 1 shown in FIGS. 17, 18 denotes a current position of the vehicle.

As shown in FIG. 17, the control unit 200 identifies, as an update check area, an area within a specified range from a mesh 1201 in which a current position 1 of the vehicle is located (in the illustrated example, an area that is identified by meshes, the number of which is specified to be 5×5, with the mesh 1201 in which the current position 1 is located kept at the center of the area). The control unit 200 instructs the attribute-basis latest map check unit 230 to perform update check processing of data of this update check area 1200. For convenience of explanation, hereinafter, the update check area 1200 which has been subjected to the update check processing is called "update check completed area".

Then, if the current position 1 of the vehicle moves to another mesh, the area within the specified range is also changed with the another mesh in which the current position 1 is located kept at the center of the area. In this embodiment, when the current position 1 has moved to another mesh, an area obtained by subtracting the update check completed area from an area within a specified range from the another mesh, to which the current position 1 has moved, is identified as a new update check area. For example, as exemplified in FIG. 18, an update check area is identified in response to the move of the vehicle.

Figure 18:
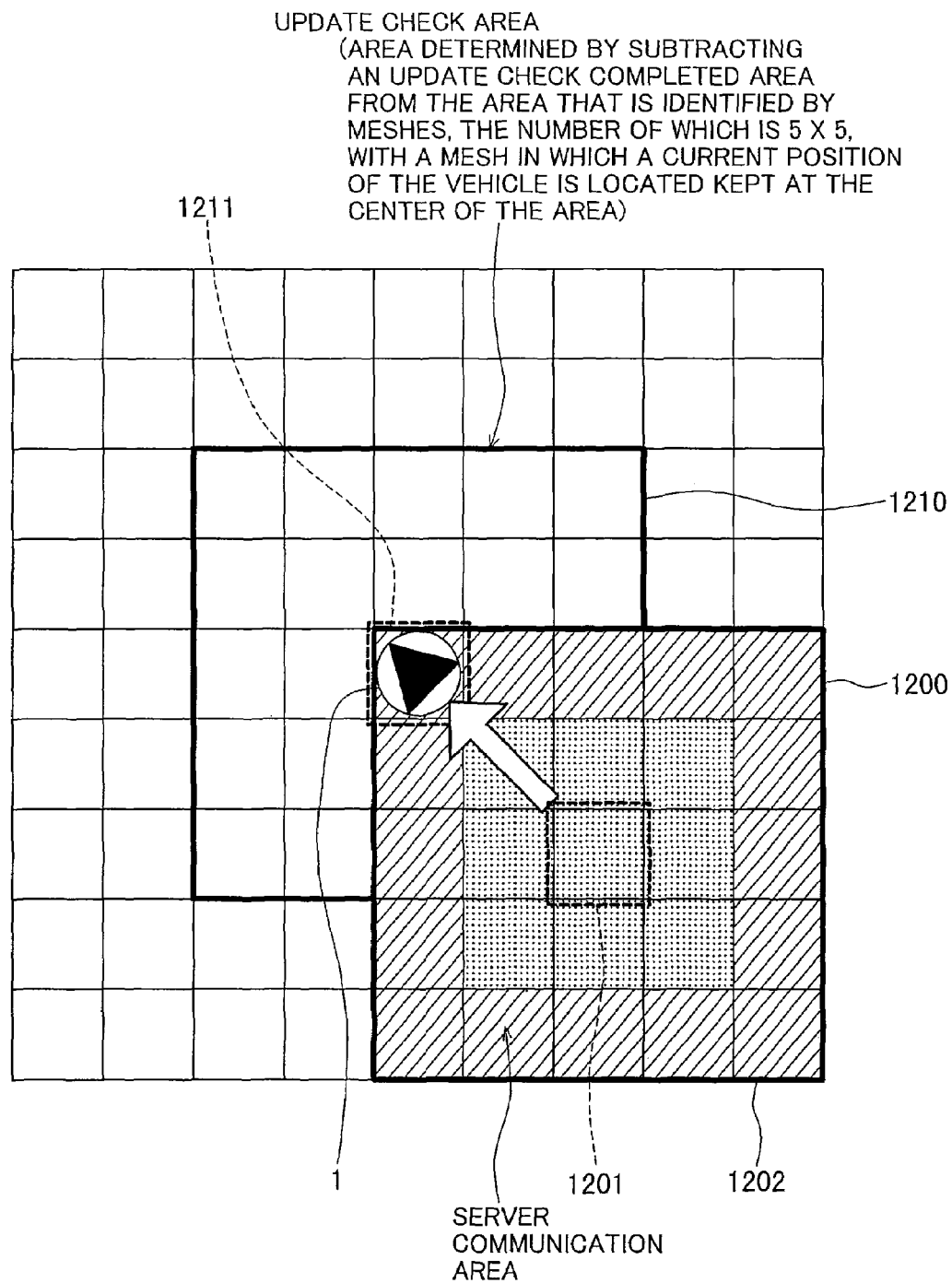
FIG. 18 is a diagram illustrating an update check area defined when the vehicle is travelling in the navigation free driving mode according to the first embodiment of the present invention.

In an example shown in FIG. 18, among meshes included in the update check area 1200, a specified area (area drawn with oblique lines) is defined as a server communication area 1202. When the current position 1 enters the server communication area 1202, the control unit 200 newly identifies an update check area. Here, it is assumed that the update check processing of the update check area 1200 is performed until the current position 1 moves to the server communication area 1202. To be more specific, the update check area 1200 becomes an update check completed area before the current position 1 moves to the server communication area 1202.

Then, for example, when the current position 1 moves to a mesh 1211 that is located in the server communication area 1202, an area within a specified range is identified with the mesh 1211 kept at the center of the area (an area that is identified by meshes, the number of which is specified to be 5×5, with the mesh 1211 in which the current position 1 is located kept at the center of the area). After that, the control unit 200 subtracts the update check completed area 1202 from the identified area within the specified range from the mesh 1211 to determine an area that is used as a new update check area 1210. In this embodiment, by successively determining the update check area 1210 in response to the move of the current position, an update situation of map data around the current position of the vehicle is checked in the navigation free driving mode.

Returning to FIG. 12, processing of steps S435 through S445, which is performed when it is judged in the step S405 that the path search has been executed, will be described.

In the step S435, the control unit 200 sets the driving mode to the navigated route driving mode.

Next, according to the same processing steps as those of the step S425, the control unit 200 accesses the attribute-value management table 120 to acquire required attribute data of map data.

Nest, the control unit 200 identifies an area (update check area) of the map data used for the driving control of the vehicle, and then acquires information about the identified update check area (attribute data, and the update date relating to a support area and a road shape that are the attribute data) that are required for the driving control (S445).

To be more specific, in the step S445, the control unit 200 identifies an area (update check area) of the map data, which is used for the driving control of the vehicle, according to processing steps determined by the driving mode set in the step S435 (in this case, the navigated route driving mode). Here, the steps determined by the navigated route driving mode will be described. The navigated route driving mode is set in a case where a path is searched for before the driving is started. According to this embodiment, in the case of the navigated route driving mode, an area constituted of meshes to which the searched path belongs is estimated to be an area through which there is a possibility that the vehicle will travel thereafter. Then, the estimated area of the map data is used as an area (update check area) of the map data, the area being used for the driving control of the vehicle.

Next, in the step S445, the control unit 200 accesses the terminal-side attribute-value-basis support area management table 110, and the terminal-side road shape/attribute data update date management table 130 to extract information required for the driving control from among the update check areas of the map data. To be more specific, the control unit 200 accesses the terminal-side attribute-value-basis support area management table 110 to acquire, from among the update check areas of the map data, a support area that is associated with the acquired attribute data described above. In addition, the control unit 200 accesses the terminal-side road shape/attribute data update date management table 130 to acquire, from among the update check areas of the map data, the attribute data acquired in the step S440, the update date of the support area, and the update date of the road shape. Then, the control unit 200 requests to perform the map update check processing of the map update server 30.

Here, the processing of identifying an update check area in the step S445, which is performed when the navigated route driving mode is set as a driving mode, will be described with reference to FIG. 19.

Figure 19:
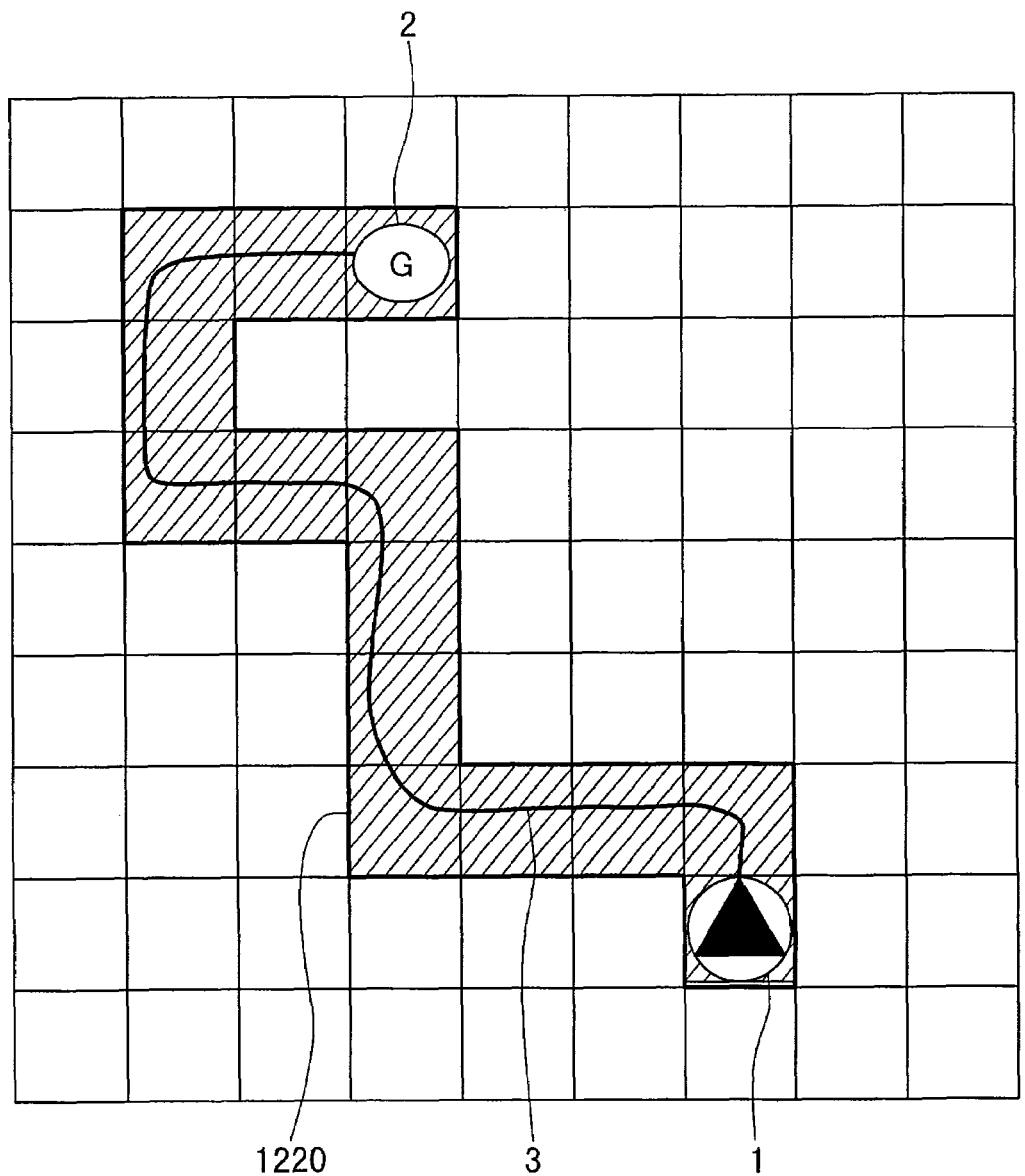
FIG. 19 is a diagram illustrating an update check area of map data in the navigated route driving mode according to the first embodiment of the present invention.

FIG. 19 is a diagram illustrating an update check area of map data in the navigated route driving mode according to the first embodiment of the present invention.

In FIG. 19, reference numeral 1 denotes a current position of the vehicle. Reference numeral 2 denotes a destination. Reference numeral 3 denotes a path from the current position 1 to the destination 2. The control unit 200 identifies an area constituted of meshes, to which a link forming the path 3 belongs, as an update check area 1220 (drawn with oblique lines).

Subsequently, the map update check processing (S3) shown in FIG. 11 will be described with reference to FIG. 13.

Figure 13:
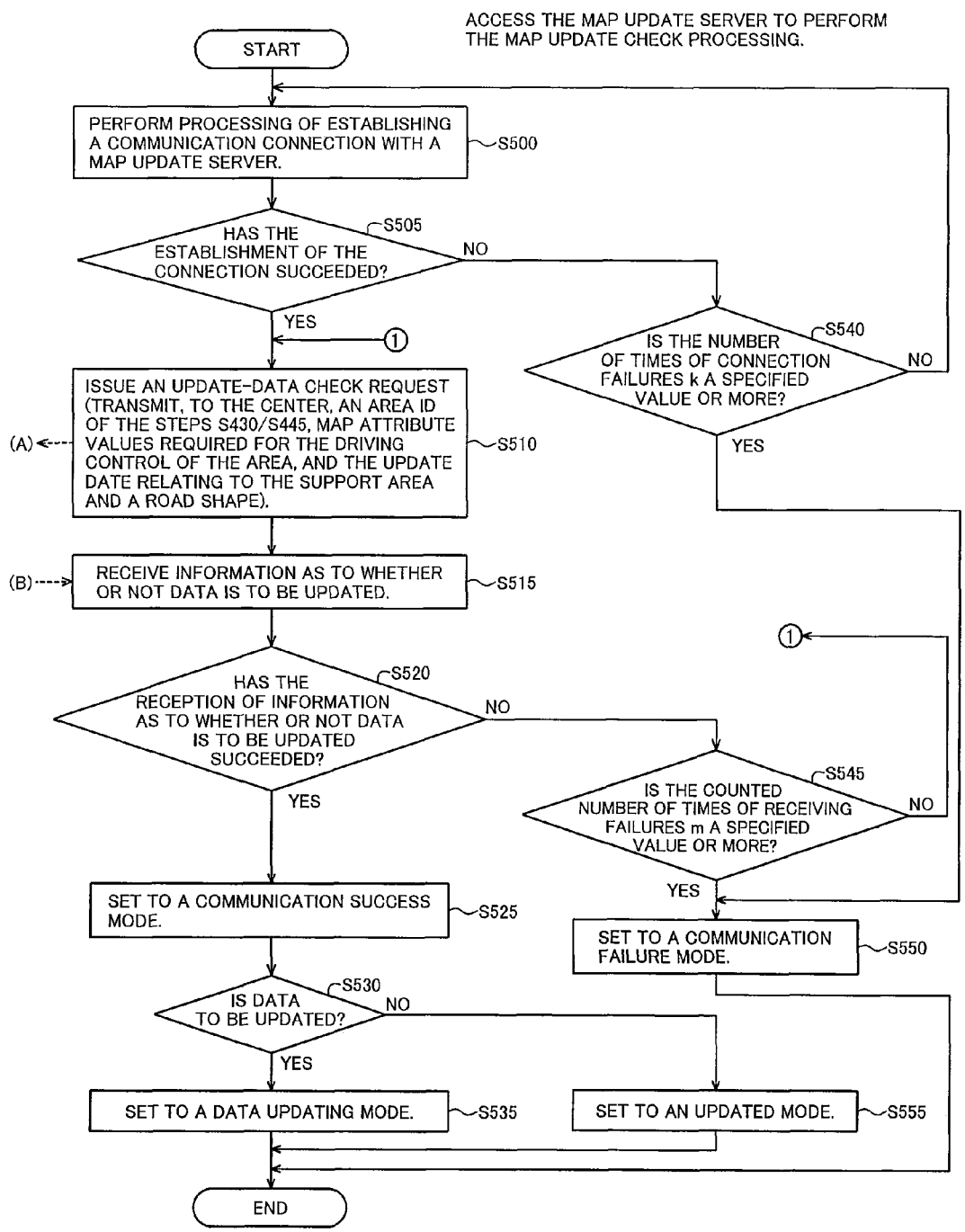
FIG. 13 is a flowchart specifically illustrating the processing steps of the step S3 shown in FIG. 11.

FIG. 13 is a flowchart specifically illustrating the processing steps of the step S3 shown in FIG. 11.

First of all, the attribute-basis latest map check unit 230 performs processing of establishing a communication connection with the map update server 30 through the communication unit 220 (S500). Incidentally, this processing is executed when the attribute-basis latest map check unit 230 receives a request from the control unit 200 to perform the map update check processing.

Next, the attribute-basis latest map check unit 230 judges whether or not the connection with the map update server 30 has been successfully established through the communication unit 220 (S505). If it is judged that the establishment of the connection has succeeded, the process proceeds to a step S510. On the other hand, if it is judged that the establishment of the connection has failed, the process proceeds to a step S540.

In the step S540, the attribute-basis latest map check unit 230 counts the number of times the establishment of the connection has failed, and also judged whether or not the counted number of times of connection failures k is a specified value or more. If the attribute-basis latest map check unit 230 judges that the number of times of connection failures k is the specified number of times or more (for example, if the number of times of connection failures k≧5), the process proceeds to a step S550. If the attribute-basis latest map check unit 230 judges that the number of times of connection failures is smaller than the specified number of times (for example, if the number of times of connection failures k<5), the process returns to the step S500, and the attribute-basis latest map check unit 230 performs the communication connection establishment processing again.

Next, processing of S510, which is performed when it is judged in the step S505 that the establishment of the connection has succeeded, will be described.

In the step S510, the attribute-basis latest map check unit 230 acquires, from the control unit 200, information required for the driving control (the information acquired by the control unit 200 in the steps S430/S445 shown in FIG. 11). Then, the attribute-basis latest map check unit 230 issues an update-data check request, which includes the acquired "information required for the driving control", to the map update server 30 through the communication unit 220, before the process proceeds to a step S515.

In the step S515, the attribute-basis latest map check unit 230 receives information as to whether or not update data exists (update data existence information) through the communication unit 220. The update data existence information is transmitted by the map update server 30 in response to the update-data check request. The update data existence information transmitted by the map update server 30 is information as to whether or not it is necessary to update "information required for the driving control" included in the update-data check request.

Incidentally, if the "information required for the driving control" included in the update-data check request is the same as that of the master map data (map data kept in the latest version) stored in the map update server 30, it is not necessary to update the "information required for the driving control". In this case, the update data existence information, which is transmitted in response to the update-data check request, becomes information indicating "map update completed" (information indicating that update is not required). On the other hand, if the "information required for the driving control" included in the update-data check request differs from that of the master map data stored in the map update server 30, it is necessary to update the "information required for the driving control". In this case, the update data existence information, which is transmitted in response to the update-data check request, becomes information indicating "map update required" (information indicating that update is required).

Next, the attribute-basis latest map check unit 230 judged whether or not the receiving of the update data existence information has succeeded. If it is judged that the receiving has succeeded, the process proceeds to a step S525, whereas if it is judged that the receiving has failed, the process proceeds to a step S545 (S520).

In the step S545, the attribute-basis latest map check unit 230 counts the number of times the receiving has failed, and also judged whether or not the counted number of times of receiving failures m is a specified value or more. If the attribute-basis latest map check unit 230 judges that the number of times of receiving failures m is the specified number of times or more (for example, if the number of times of receiving failures m≧5), the process proceeds to a step S550. If the attribute-basis latest map check unit 230 judges that the number of times of receiving failures m is smaller than the specified number of times (for example, if the number of times of receiving failures m<5), the process returns to the step S510, and the attribute-basis latest map check unit 230 issues an update-data check request to the map update server 30 again.

Next, a series of processing in steps S550 and after will be described. The series of processing are performed when the connection establishment processing in the step S500 has failed the specified number of times or more, or when the receive processing of the update data existence information in the step S515 has failed the specified number of times or more.

In the step S550, the attribute-basis latest map check unit 230 notifies the control unit 200 that the communication processing to be performed for update data check has failed. On the receipt of the notification to the effect that the communication processing to be performed for update data check has failed, the control unit 200 sets a mode for judging whether or not the update data check processing has succeeded to a communication failure mode, before ending the processing.

Next, processing of the step S525, which is performed when it is judged in the step S520 that the receiving has succeeded, will be described. In the step S525, the attribute-basis latest map check unit 230 notifies the control unit 200 that the communication processing to be performed for update data check has succeeded. On the receipt of the notification to the effect that the communication processing to be performed for update data check has succeeded, the control unit 200 sets the mode for judging whether or not the update data check processing has succeeded to a communication success mode.

Next, the control unit 200 checks the update data existence information received in the step S515. As a result of the check, if the update data existence information is "map update required" (information indicating that update is required), the process proceeds to a step S535. On the other hand, if the update data existence information is "map update completed" (information indicating that update is not required), the process proceeds to a step S555.

In the step S535, the control unit 200 sets a mode for judging the update data existence information to an update data existing mode, before ending the processing.

In the step S555, the control unit 200 sets the mode for judging the update data existence information to an update completed mode, before ending the processing.

Subsequently, the map update data acquisition processing (S4) shown in FIG. 11 will be described with reference to FIG. 14.

Figure 14:
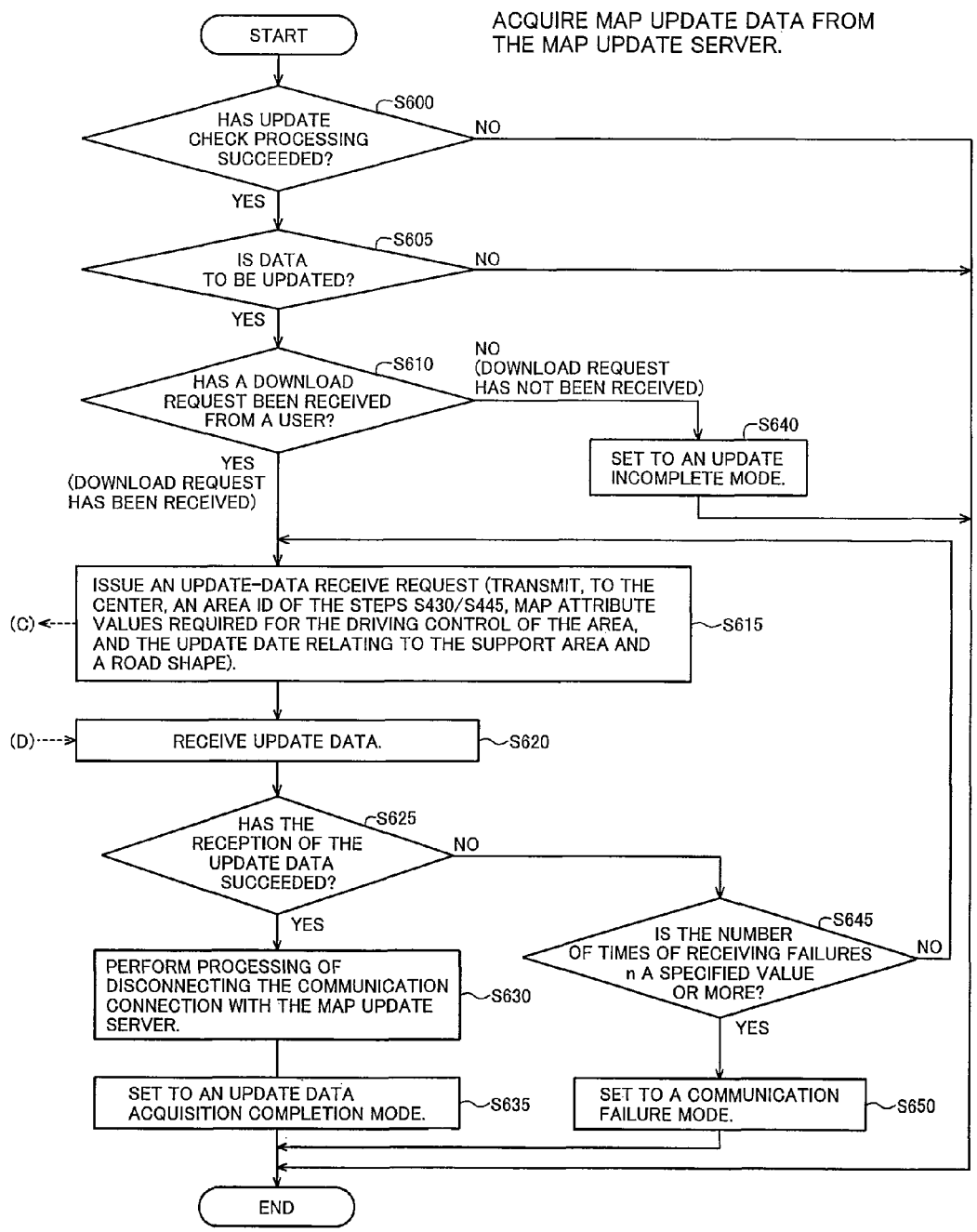
FIG. 14 is a flowchart specifically illustrating the processing steps of the step S4 shown in FIG. 11.

FIG. 14 is a flowchart specifically illustrating the processing steps of the step S4 shown in FIG. 11. Incidentally, processing shown in FIG. 14 is started when processing shown in FIG. 13 ends.

First of all, the control unit 200 checks whether or not the update check processing has succeeded. If it is judged that the update check processing has succeeded, the process proceeds to a step S605. On the other hand, if it is judged that the update check processing has failed, the control unit 200 ends the processing (S600). To be more specific, if the mode for judging whether or not the update data check processing has succeeded is set to the communication success mode, the process proceeds to a step S605. If the mode for judging whether or not the update data check processing has succeeded is set to the communication failure mode, the control unit 200 ends the processing.

In the step S605, the control unit 200 judges the update data existence information. To be more specific, if the control unit 200 judges that the mode for judging the update data existence information is the update data existing mode, the process proceeds to a step S610; and if the control unit 200 judges that the mode for judging the update data existence information is the update completed mode, the control unit 200 ends the processing.

In the step S610, the control unit 200 judge whether or not a download request has been received from a user. If it is judged that a download request has been received, the process proceeds to a step S615, whereas if it is judged that a download request has not been received, the process proceeds to a step S640.

In the step S640, the control unit 200 sets a mode for judging a map update data acquisition state to an update incomplete mode, before ending the processing.

In the step S615, the control unit 200 instructs the attribute-basis update data transmission unit 240 to perform update-data receive processing so that update data is received from the map update server 30. When the attribute-basis update data transmission unit 240 is instructed to perform the update-data receive processing, the attribute-basis update data transmission unit 240 acquires, from the control unit 200, information required for the driving control (the information acquired by the control unit 200 in the steps S430/S445 shown in FIG. 11). Then, the attribute-basis update data transmission unit 240 issues an update-data receive request, which includes the acquired "information required for the driving control", to the map update server 30 through the communication unit 220, before the process proceeds to a step S620.

In the step S620, the attribute-basis update data transmission unit 240 receives, through the communication unit 220, update data that is transmitted by the map update server 30 in response to the update-data receive request. Here, the update data transmitted by the map update server 30 is the difference between the "information required for the driving control" included in the update-data receive request and data of a corresponding area included in the master map data (map data kept in the latest version) stored in the map update server 30 (refer to FIG. 2). Incidentally, in this step, the received update data is temporarily stored in a specified area of an unillustrated memory of the car information system 10. To be more specific, in this stage, the map data registered in the map DB 100 is not updated. In addition, when the update data is temporarily stored in the memory, the date and time on which the update data has been stored are also stored together with the update data. Incidentally, the processing on the map update server 30 side will be described with reference to FIG. 24 described below.

Next, the attribute-basis update data transmission unit 240 judged whether or not the receiving of the update data has succeeded. If it is judged that the receiving has succeeded, the process proceeds to a step S630, whereas if it is judged that the receiving has failed, the process proceeds to a step S645 (S625).

In the step S645, the attribute-basis update data transmission unit 240 counts the number of times the receiving has failed, and also judged whether or not the counted number of times of receiving failures n is a specified value or more. If the number of times of receiving failures n is the specified number of times or more (for example, the number of times of receiving failures n≧5), the attribute-basis update data transmission unit 240 notifies the control unit 200 that the communications have failed, and then the process proceeds to a step S650. If the attribute-basis update data transmission unit 240 judges that the number of times of receiving failures n is smaller than the specified number of times (for example, if the number of times of receiving failures n<5), the process returns to the step S615, and the attribute-basis update data transmission unit 240 issues an update-data receive request to the map update server 30 again.

In the step S650, the control unit 200 sets the mode for judging a map update data acquisition state to the communication failure mode, before ending the processing.

Next, processing of the step S630, which is performed when it is judged in the step S625 that the receiving has succeeded, will be described. In the step S630, the attribute-basis update data transmission unit 240 performs processing of disconnecting the communication connection with the map update server 30 through the communication unit 220.

Next, the attribute-basis update data transmission unit 240 notifies the control unit 200 that the map update data has been acquired. The control unit 200 sets a mode for judging an update data acquisition state to an update-data acquisition completed mode, before ending the processing.

Subsequently, the terminal map (car information system map) data update processing (S5) shown in FIG. 11 will be described with reference to FIG. 15.

Figure 15:
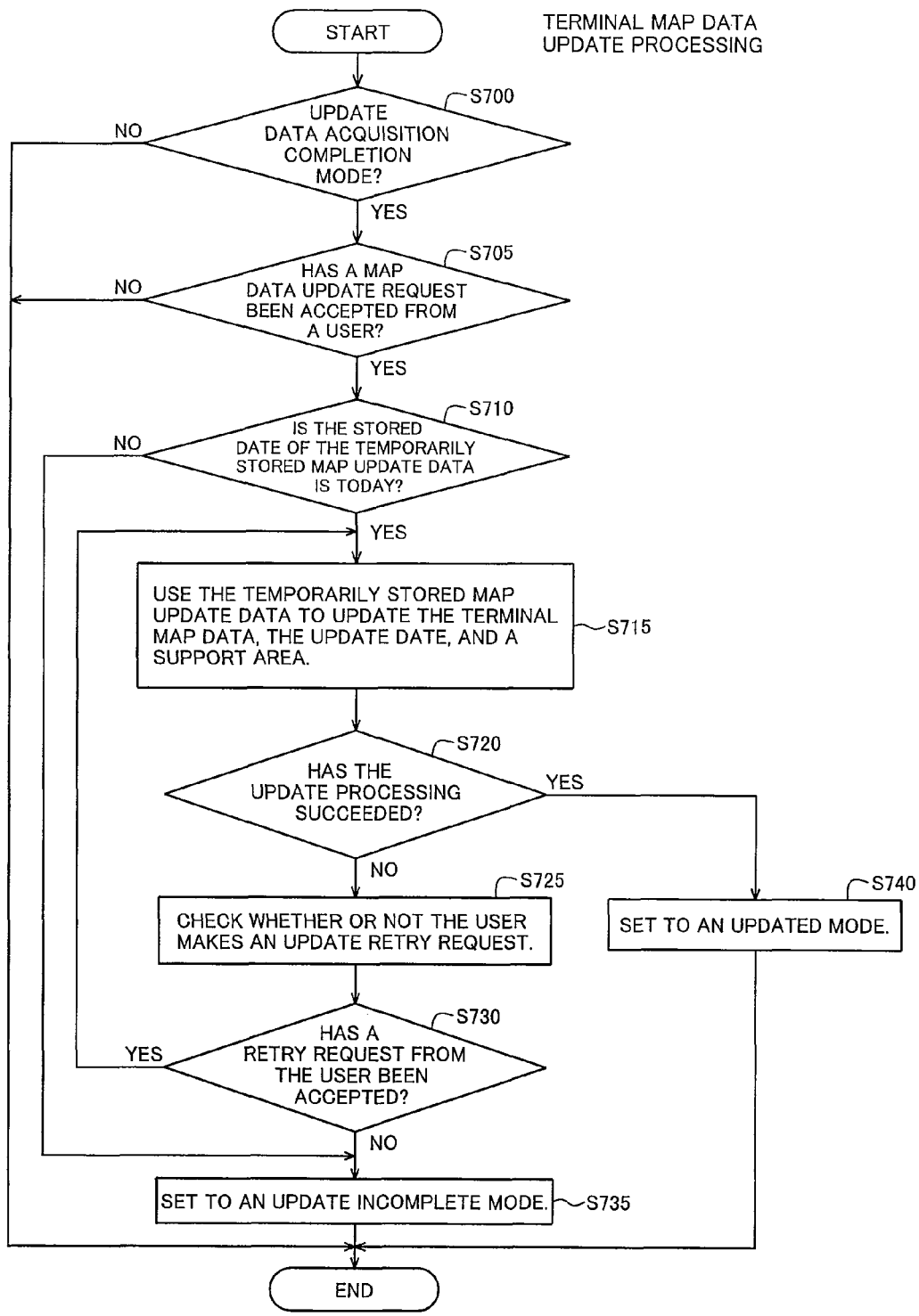
FIG. 15 is a flowchart specifically illustrating the processing steps of the step S5 shown in FIG. 11.

FIG. 15 is a flowchart specifically illustrating the processing steps of the step S5 shown in FIG. 11. The illustrated processing is started when the above-described processing in FIG. 14 ends.

First of all, the control unit 200 refers to the mode for judging the update data acquisition state. If the mode for judging the update data acquisition state is the update-data acquisition completed mode, the process proceeds to a step S705. If the mode for judging the update data acquisition state is not the update-data acquisition completed mode, the control unit 200 ends the processing (S700).

In the step S705, if it is judged that a map data update request has been accepted from a user, the process proceeds to a step S710. On the other hand, if it is judged that a map data update request has not been accepted, the control unit 200 ends the processing. Thus, the reason why it is configured that an update request is accepted from the user when map data is updated is because what is taken into consideration is that even if update data has been acquired, there is a case where the user wishes to execute the map data update processing later.

In the step S710, the control unit 200 judges whether or not the stored date of the update data of the map data is today. The update data in question has been temporarily stored in the specified area of the memory in the step S620 shown in FIG. 14. As a result of the judgment, if it is judged that the stored date of the update data of the map data is today, the process proceeds to a step S715. If it is judged that the stored date of the update data in question is not today, the process proceeds to a step S735 (more specifically, if the stored date of the update data in question is the date earlier than today, the process proceeds to the step S735). Incidentally, the reason why this step is provided is as follows. To be more specific, this embodiment is so configured that map data is updated on the acceptance of an update request from a user. In addition, it is also supposed that after the acquisition of update data, a long period of time has passed before the acceptance of an update request, and accordingly the update data does not always reflect the latest map data. Therefore, by providing this step, only new update data is used for updating of the map data.

In the step S715, by use of the temporarily stored update data, the control unit 200 updates the map data of the map DB 100, the terminal-side attribute-value-basis support area management table 110, and the terminal-side road shape/attribute data update date management table 130.

Then, the control unit 200 judges whether or not the update performed in the step S715 has succeeded. If it is judged that the update has succeeded, the process proceeds to a step S740, whereas if it is judged that the update has failed, the process proceeds to a step S725 (S720).

In the step S740, the control unit 200 sets a mode for judging whether or not the update processing has succeeded to the update completed mode, before ending the processing.

In the step S725, the control unit 200 checks whether or not the user makes an update retry request. Incidentally, how to check whether or not the user makes an update retry request is not particularly limited. For example, notification to the effect that the update processing of the map data has been failed is displayed on the display unit 290. In addition to it, an image, which prompts the user to input whether or not the map data update processing is retried, is also displayed on the display unit 290.

If the control unit 200 accepts a retry request from the user to retry the map data update processing, the process returns to the step S715. If the control unit 200 does not accept a retry request to retry the map data update processing, the process proceeds to the step S735 (S730).

In the step S735, the control unit 200 sets the mode for judging whether or not the update processing has succeeded to the update incomplete mode, before ending the processing.

Subsequently, the driving control/warning mode setting processing (S6) shown in FIG. 11 will be described with reference to FIG. 16. Incidentally, it is assumed that the control unit 200 is provided with a driving control/warning mode (more specifically, a control mode in which the driving control is executed, a warning mode in which warning processing is executed, and an uncontrolled mode in which neither the driving control nor the warning processing is executed). In addition, the warning/control switching unit 270 sets the driving control/warning mode according to the illustrated flow. According to a setting state of the driving control/warning mode, the on-board system performs the driving control of the vehicle by use of map data, or performs only the warning processing without performing the driving control, or performs neither the driving control nor the warning processing.

Figure 16:
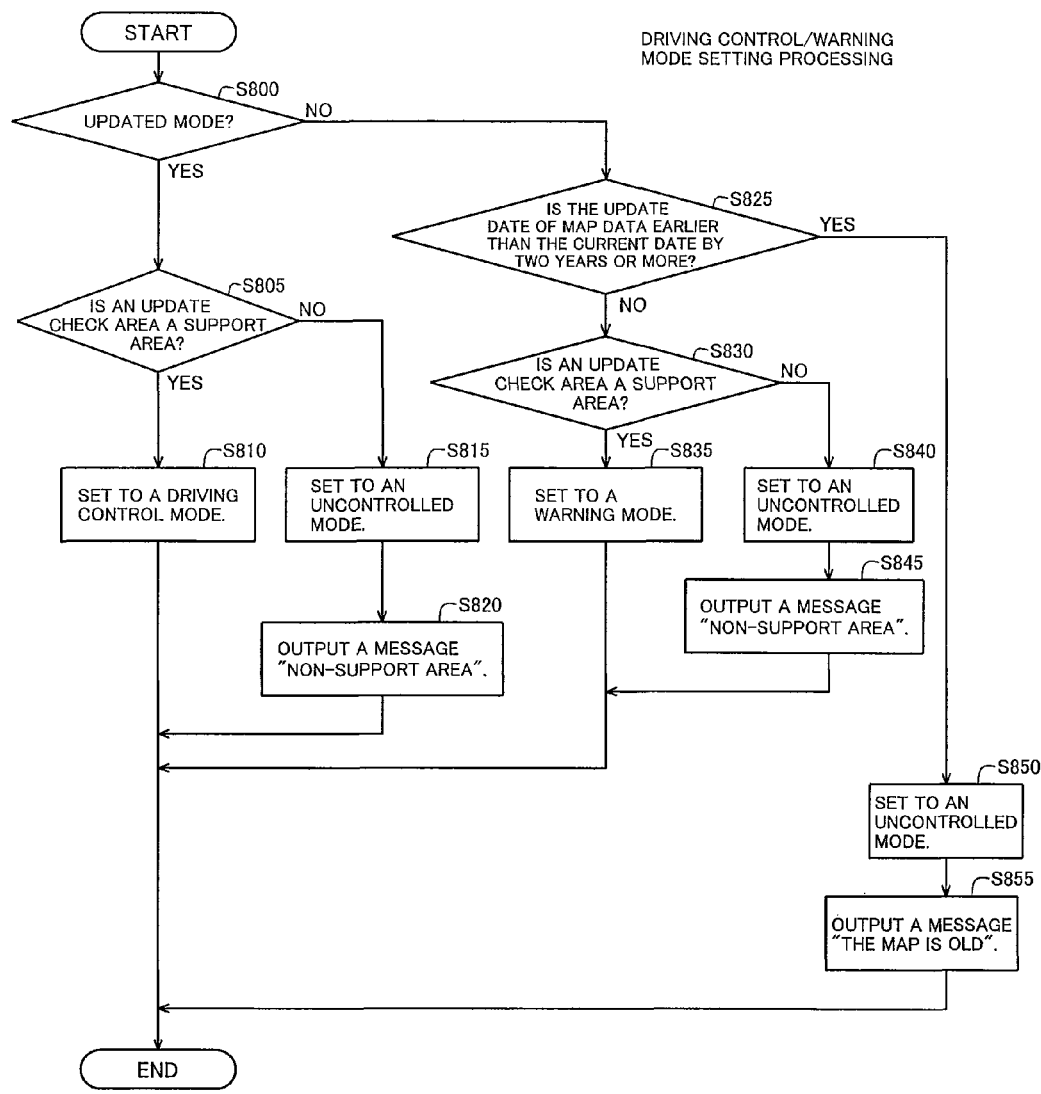
FIG. 16 is a flowchart specifically illustrating the processing steps of the step S6 shown in FIG. 11.

FIG. 16 is a flowchart specifically illustrating the processing steps of the step S6 shown in FIG. 11. The warning/control switching unit 270 executes the illustrated processing after the above-described processing shown in FIG. 15 ends. Incidentally, after the above-described processing shown in FIG. 14 ends, the control unit 200 instructs the warning/control switching unit 270 to perform the driving control/warning mode setting processing.

First of all, the warning/control switching unit 270 checks whether or not the map data of the map DB 100 is the updated data (S800). To be more specific, the warning/control switching unit 270 checks the mode for judging whether or not the update processing has succeeded, the mode being set in the control unit 200. If the warning/control switching unit 270 judges that the set mode is the update completed mode, the process proceeds to a step S805. On the other hand, if it is judged that the set mode is not the update completed mode, the process proceeds to a step S825. To be more specific, if the warning/control switching unit 270 judges that the map data of the map DB 100 is the latest data, the process proceeds to a step S805. On the other hand, if it is judged that the map data of the map DB 100 is not the latest data, the process proceeds to a step S825.

Next, a series of processing performed in steps S805 through S820 will be described. The series of processing is performed when it is judged that map data of an area, which is used for the driving control of the vehicle, has been updated to the latest data.

In the step S805, the warning/control switching unit 270 judges whether or not an update check area, whose map update has been checked by the map update server 30, is a support area. To be more specific, by use of information about the update check area, which has been acquired from the control unit 200, the map data registered in the map DB 100, the terminal-side attribute-value-basis support area management table 110, and the attribute-value management table 120, the warning/control switching unit 270 judges whether or not the update check area is a support area of attribute data required for the driving control. Incidentally, whether or not the update check area is a support area is judged for each kind of attribute data. Then, if the warning/control switching unit 270 judges that the update check area is a support area, the process proceeds to a step S810. On the other hand, if it is judged that the update check area is not a support area, the process proceeds to a step S815.

In the step S810, the warning/control switching unit 270 sets the driving control/warning mode of the control unit 200 to the driving control mode, before ending the processing.

In the step S815, the warning/control switching unit 270 sets the driving control/warning mode of the control unit 200 to the uncontrolled mode, and then the process proceeds to a step S820.

In the step S820, the warning/control switching unit 270 notifies the user that the map data is a non-support area, before ending the processing. Incidentally, how to notify the user is not particularly limited. For example, audio data indicating that the map data is a non-support area may also be output from the speaker 280, or the notification to the effect that the map data is a non-support area may also be displayed on the display unit 290 as image information.

Next, a series of processing performed in steps S825 through S855 will be described. The series of processing is performed when it is judged in the step S800 that the set mode is not the update completed mode (more specifically, if it is not judged that the map data of the map DB 100 is the latest one).

In the step S825, the warning/control switching unit 270 checks the update date of the map data corresponding to the update check area whose map update has been checked by the map update server 30 (S3 shown in FIG. 10). Then, if it is judged that the update date (year, month, and day) is earlier than the current date (year, month, and day) by two years or more, the process proceeds to a step S850. On the other hand, if the warning/control switching unit 270 judges that the update date (year, month, and day) is earlier than the current date (year, month, and day) by less than two years, the process proceeds to a step S830. To be more specific, the warning/control switching unit 270 refers to the terminal-side road shape/attribute data update date management table 130 to check the update date of the attribute data and road shape of the map data corresponding to the update check area, which has been received from the control unit 200. Incidentally, in the example described above, the judgment as to whether or not the data is new is made by the difference between the current date (year, month, and day) and the update date, the difference being shorter than two years. However, this is merely taken as an example. For example, a judgment as to whether or not data is new may also be made by the difference between the current date and the update date, the difference being shorter than one year.

In the step S830, according to the same processing steps as those of the step S805 described above, a judgment is made as to whether or not an update check area is a support area. If the update check area is judged to be a support area, the process proceeds to a step S835, whereas if the update check area is not judged to be a support area, the process proceeds to a step S840.

In the step S835, the warning/control switching unit 270 sets the driving control/warning mode of the control unit 200 to the warning mode, before ending the processing.

In the steps S840 through S845, the same series of processing as those performed in the steps S815 though 820 are performed, before the process ends.

Next, processing of the step S850, which is performed when it is judged in the step S825 that the update date (year, month, and day) of the map data is earlier than the current date by two years or more (when the map data is judged to be old), will be described.

In the step S850, the warning/control switching unit 270 sets the driving control/warning mode of the control unit 200 to the uncontrolled mode, and then the process proceeds to the step S855.

In the step S855, the warning/control switching unit 270 notifies the user that the map data is old, before ending the processing. Incidentally, how to notify the user is not particularly limited. For example, the notification to the effect that "the map is old" may also be output from the speaker 280; or the notification to the effect that "the map is old" may also be displayed on the display unit 290 as image information.

Here, how the driving control/warning mode used for the above-described driving control of the vehicle is associated with each setting condition will be described with reference to FIGS. 20A through 20C.

FIGS. 20A through 20C are diagrams each illustrating the driving control/warning mode used for the driving control of the vehicle, and setting conditions, according to the first embodiment of the present invention.

As shown in FIG. 20A, necessary conditions on which the driving control mode is set are the following: the mode for judging whether or not the update processing has succeeded, which is set in the control unit 200, is the update completed mode; and the map data used for the driving control is a support area.

In this embodiment, cases where the driving control mode is set are, for example:

(i) it can be judged that the car information system 10 stores the latest-version map data, which is stored in the map update server 30; and at the same time, the map data used for the driving control is a support area; and (ii) difference information between the latest-version map data stored in the map update server 30 and the map data stored in the car information system 10 has been downloaded, and then the map data has been updated by use of the difference information; and at the same time, the map data used for the driving control is a support area. 0218

In addition, as shown in FIG. 20B, necessary conditions on which the warning mode is set are the following: the mode for judging whether or not the update processing has succeeded is not the update completed mode; and the last update check of the map data has been performed at least two years ago or later; and the map data used for the driving control is a support area.

In this embodiment, cases where the warning mode is set are, for example:

(iii) the last update check of the map data has been performed at least two years ago or later, and at the same time, the map data used for the driving control is a support area; however, for reasons of a communication failure, or the like, it is not possible to check whether or not the map data stored in the car information system 10 is the same as the latest-version map data stored in the map update server; and (iv) the last update check of the map data has been performed at least two years ago or later, and at the same time, the map data used for the driving control is a support area; and although difference information (update data) between the latest-version map data stored in the map update server 30 and the map data stored in the car information system 10 has been downloaded, the map data has not been updated by use of the difference information (update data).

Moreover, as shown in FIG. 20C, the uncontrolled mode is set when any one of the following two necessary conditions is satisfied: (c-1) the mode for judging whether or not the update processing has succeeded is not the update completed mode, and at the same time, the last update check of the map data has not been performed two years ago or later; or (c-2) the map data used for the driving control is not a support area.

In this embodiment, cases where the uncontrolled mode is set are, for example:

(v) the map data of the car information system 10 has not been updated for two years or more;

(vi) the last update check of the map data has been performed at least two years ago or later, and the car information system 10 stores the latest-version map data, which is stored in the map update server 30; however, the map data used for the driving control is not a support area; and (vii) although it is not possible to check whether or not the map data stored in the car information system 10 is the same as the latest-version map data, the last update check of the map data has been performed at least two years ago or later; and the map data used for the driving control is not a support area.

Subsequently, the driving control/warning processing (S7) shown in FIG. 11 will be described with reference to FIGS. 21, 22. Incidentally, in order to simplify the description below, the school zone control and the railroad crossing control are selected from among the series of driving control so that they are taken as examples.

Figure 21A:
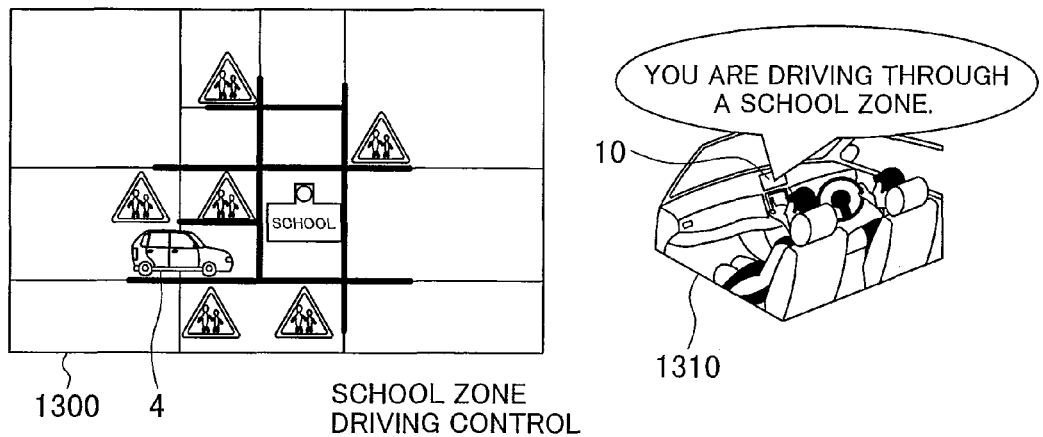
FIGS. 21A, 21B are diagrams each illustrating processing of the school zone control according to the first embodiment of the present invention.
Figure 21B:
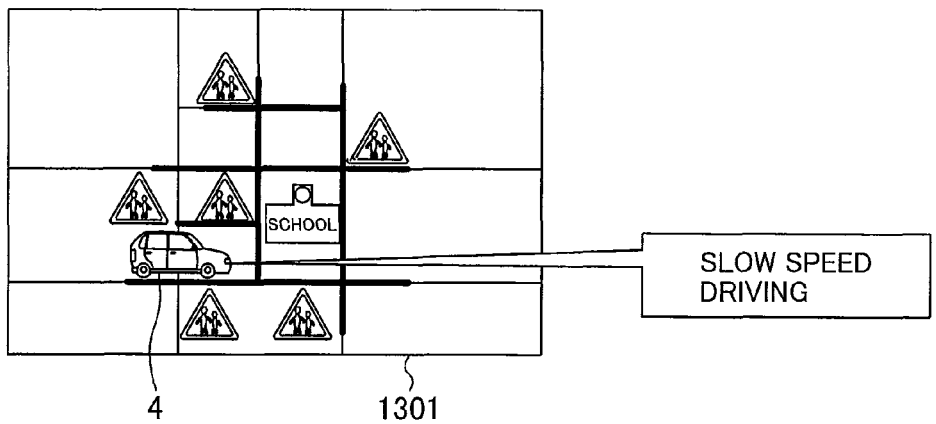

FIGS. 21A, 21B are diagrams each illustrating processing of the school zone control according to the first embodiment of the present invention. More specifically, FIG. 21A is a diagram illustrating the operation performed in the warning mode; and FIG. 21B is a diagram illustrating the operation performed in the driving control mode.

In FIG. 21A, reference numeral 1300 denotes an image illustrating that a vehicle 4 is entering a school zone (each thick line indicates a school zone road) in the warning mode; and reference numeral 1310 denotes the car information system 10 located inside the vehicle. The warning mode is a mode that is set on conditions that, although map data used for map driving control/warning processing is not the latest one, the length of time elapsed after the last update of the map data is only a specified period of time, and at the same time, that the map data is a support area.

As illustrated in the figure, if the warning mode is set, when the vehicle enters the school zone, the car information system 10 uses audio data, or the like, to notify a user that the vehicle is travelling through the school zone, without controlling the driving control unit group 50 (without automatically reducing the travelling speed of the vehicle).

To be more specific, if the warning mode is set by the warning/control switching unit 270, the control unit 200 requests the warning unit 260 to perform the warning processing.

On the receipt of the warning request from the control unit 200, the warning unit 260 transmits/receives various kinds of data to/from the navigation processing unit 250 to perform the school zone warning processing for the user. Although a specific method of the school zone warning processing is not particularly limited, the undermentioned method may also be adopted.

For example, on the receipt of the warning request from the control unit 200, the warning unit 260 requests the navigation processing unit 250 to perform school zone monitoring. On the receipt of the school-zone monitoring request, the navigation processing unit 250 uses a periodically calculated current position and map data to monitor whether or not the vehicle is approaching a school zone. If the vehicle is approaching an area within a specified range (for example, 200 m) from a school zone, and if the vehicle is entering the school zone, the navigation processing unit 250 notifies the warning unit 200 of this situation. On the receipt of the notification from the navigation processing unit 250, the warning unit 260 outputs audio data notifying this situation from the speaker 280, and/or displays an image notifying this situation on the display unit 290.

In FIG. 21B, reference numeral 1301 denotes an image illustrating that the vehicle 4 is entering a school zone (each thick line indicates a school zone road) in the driving control mode. The control mode is a mode that is set on conditions that map data used for the map driving control/warning processing is the latest one, and that the map data is a support area.

As illustrated in the figure, if the control mode is set, when the vehicle enters the school zone, the car information system 10 controls the driving control unit group 50 so as to cause the vehicle to travel slowly.

To be more specific, when the control mode is set by the warning/control switching unit 270, the control unit 200 controls the navigation processing unit 250 to perform various kinds of data communications with the school zone control unit 505 of the driving control unit group 50 so that the school zone control unit 505 executes the driving control of the vehicle. Specific steps of the school zone control are not particularly limited. However, for example, the school zone control unit 505 cooperates with the car information system 10 to perform the driving control as described above. To be more specific, the navigation processing unit 250 monitors whether or not the vehicle enters a school zone. If the vehicle enters a school zone, the navigation processing unit 250 notifies the school zone control unit 505 of this situation. On the receipt of the notification to the effect that the vehicle has entered the school zone, the school zone control unit 505 performs the speed reduction control. In addition, when the vehicle enters the school zone, the navigation processing unit 250 notifies the user of this situation.

Figure 22A:
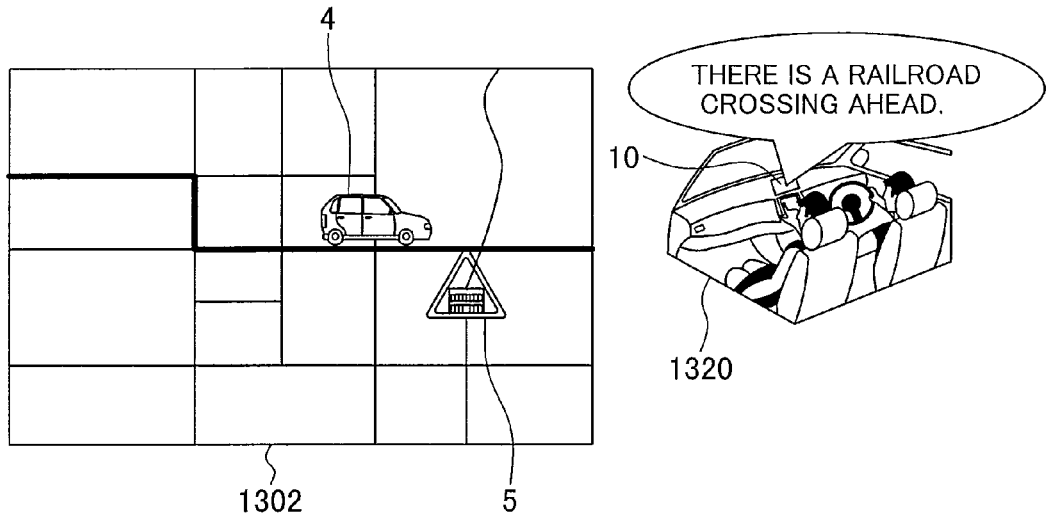
FIGS. 22A, 22B are diagrams each illustrating railroad-crossing stop control processing according to the first embodiment of the present invention.
Figure 22B:
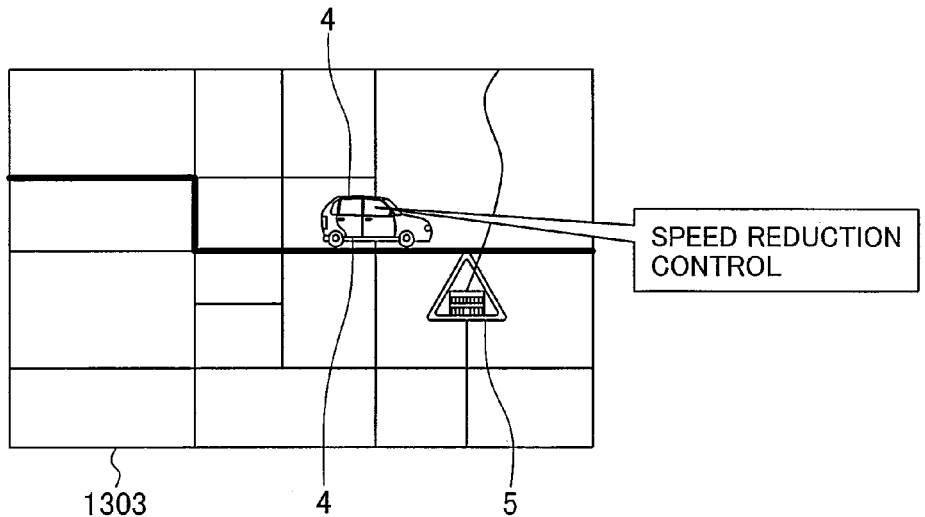

FIGS. 22A, 22B are diagrams each illustrating railroad-crossing stop control processing according to the first embodiment of the present invention. More specifically, FIG. 22A is a diagram illustrating the operation performed in the warning mode; and FIG. 22B is a diagram illustrating the operation performed in the driving control mode.

In FIG. 22A, reference numeral 1302 denotes an image illustrating that the vehicle 4 is approaching a railroad crossing in the warning mode; and reference numeral 1320 denotes the car information system 10 located inside the vehicle.

As illustrated in the figure, if the warning mode is set, when the vehicle approaches a railroad crossing, the car information system 10 notifies the user that the vehicle is approaching the railroad crossing, without controlling the driving control unit group 50 (without automatically reducing the travelling speed).

To be more specific, if the warning/control switching unit 270 sets the vehicle control mode to the warning mode, the control unit 200 requests the warning unit 260 to perform the warning processing.

On the receipt of the warning request from the control unit 200, the warning unit 260 transmits/receives various kinds of data to/from the navigation processing unit 250 to perform railroad crossing warning processing. Although a specific method of the railroad crossing warning processing is not particularly limited, the undermentioned method may also be adopted.

For example, on the receipt of the warning request from the control unit 200, the warning unit 260 requests the navigation processing unit 250 to perform railroad-crossing approach monitoring. On the receipt of the railroad-crossing approach monitoring request, the navigation processing unit 250 uses a periodically calculated current position and map data to monitor whether or not the vehicle is approaching a railroad crossing. If the vehicle is approaching an area within a specified range from the railroad crossing, the navigation processing unit 250 notifies the warning unit 200 of this situation. On the receipt of the notification from the navigation processing unit 250, the warning unit 260 outputs audio data notifying this situation from the speaker 280, and/or displays an image notifying this situation on the display unit 290. In addition, the warning unit 260 outputs, from the speaker 280, audio data indicating that the vehicle is not kept in the driving control mode (more specifically, audio data talking that "the vehicle is not kept in the driving control mode").

In FIG. 22B, reference numeral 1303 denotes an image illustrating that the vehicle 4 is approaching a railroad crossing in the driving control mode.

As illustrated in the figure, if the control mode is set, when the vehicle approaches the railroad crossing, the car information system 10 controls the driving control unit group 50 so that the speed reduction control of the vehicle is performed.

To be more specific, when the control mode is set by the warning/control switching unit 270, the control unit 200 controls the navigation processing unit 250, and the temporary stop line control unit 515 of the driving control unit group 50, so that the temporary stop line control unit 515 executes the driving control of the vehicle. Specific steps of the temporary stop line control are not particularly limited. However, for example, the temporary stop line control unit 515 cooperates with the car information system 10 to perform the driving control as described above. To be more specific, the navigation processing unit 250 monitors whether or not the vehicle approaches the railroad crossing. If the vehicle approaches the railroad crossing, the navigation processing unit 250 notifies the temporary stop line control unit 515 of this situation. On the receipt of the notification to the effect that the vehicle has approached the railroad crossing, the temporary stop line control unit 515 performs the speed reduction control. In addition, when the vehicle approaches the railroad crossing, the navigation processing unit 250 notifies the user of this situation.

Subsequently, processing on the map update server 30 side will be described.

First of all, map-data update check processing, which is performed when the map update server 30 receives an update-data check request from the car information system 10, will be described with reference to FIG. 23. The flow described below is illustrated as an example of processing in which a check is made as to whether or not an update check area of map data, which is included in an update-data check request transmitted from the car information system 10, has been updated, and then the result of the check is sent back to the car information system 10. Incidentally, so long as it is possible to check whether or not a requested update check area of the map data has been updated, and then to send back the result of the check, other steps may also be adopted.

Figure 23:
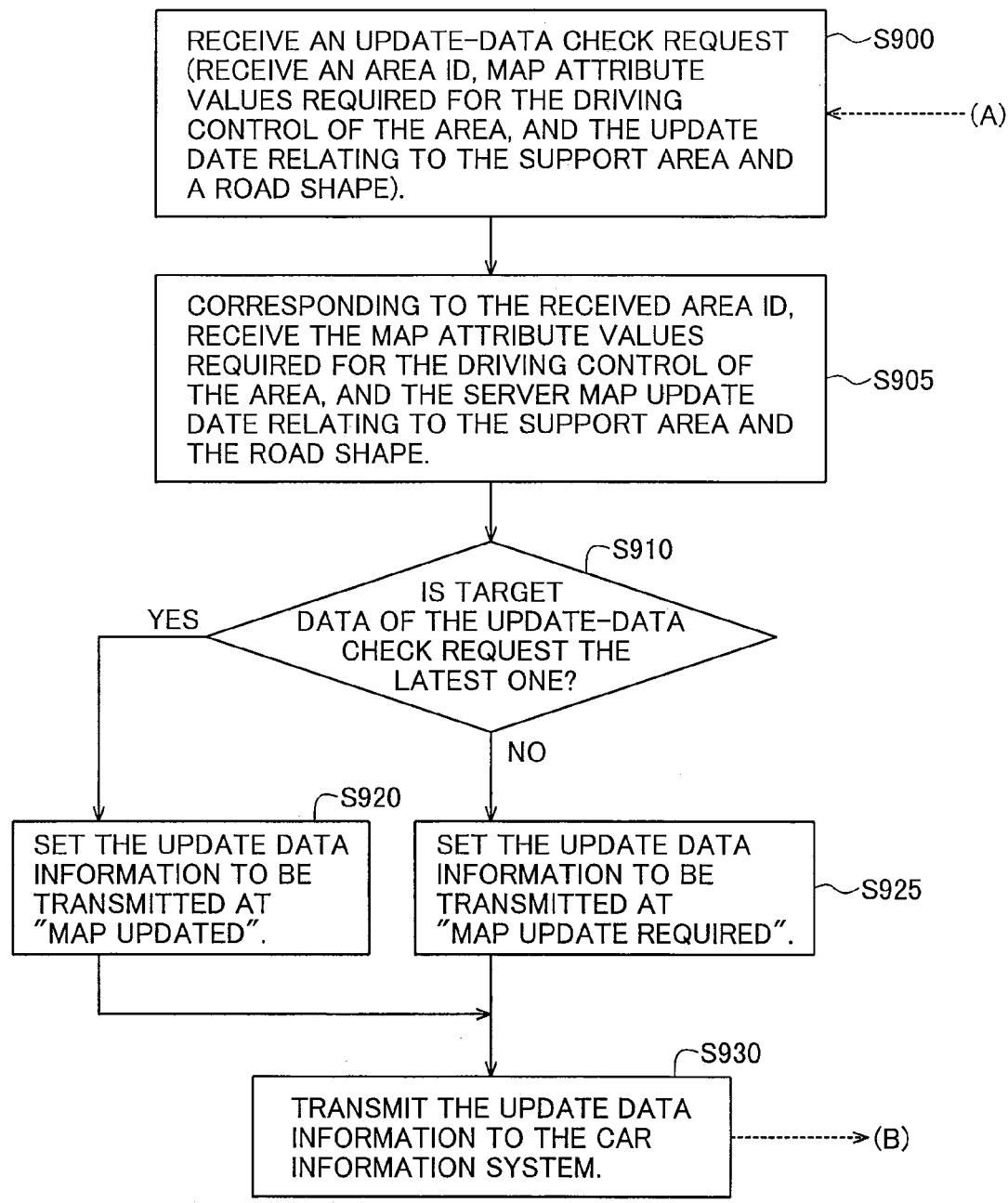
FIG. 23 is a flowchart illustrating steps of the map-data update check processing performed by the map update server 30 according to the first embodiment of the present invention.

FIG. 23 is a flowchart illustrating steps of the map-data update check processing performed by the map update server 30 according to the first embodiment of the present invention.

First of all, the attribute-basis latest map check unit 420 receives an "update-data check request" from the car information system 10 through the communication unit 410 (S900). In the above-described processing in the step S510 shown in FIG. 13, the "update-data check request" received from the car information system 10 is a request transmitted from the car information system 10. The "update-data check request" includes: an area ID used to identify an update check area; attribute data required for the driving control of the update check area; a support area (support area on the terminal side); the update date (the update date on the terminal side) of a road shape of a road included in the update check area; the update date (the update date on the terminal side) of the required attribute data; and the update date (the update date on the terminal side) of the support area.

Next, the attribute-basis latest map check unit 420 refers to the map DB 300, the server-side attribute-value-basis support area management table 310, and the server-side road shape/attribute data update date management table 320, and thereby acquires a support area (support area on the server side) of the attribute data, the update date (the update date on the server side) of a road shape of a road included in the update check area, the update date (the update date on the server side) of the required attribute data, and the update date (the update date on the server side) of the support area, corresponding to the attribute data required for the driving control of the update check area, which is included in the "update-data check request" received in the step S900 (S905).

Next, the attribute-basis latest map check unit 420 checks whether or not target data of the "update-data check request" received in the step S900 is reflected by the latest-version map data stored in the map update server 30. If it is judged that the target data is the latest one, the process proceeds to a step S920, whereas if it is judged that the target data is not the latest one, the process proceeds to a step S925.

Here, the case where the process proceeds to the step S920 includes a case where the "update date on the server side" is the same as the "update date on the terminal side" (more specifically, all of the update date of the attribute data, and the update date of the road shape, which are compared, are the same), and at the same time, the support area on the terminal side is the same as the support area on the server side that has been acquired in the step S905.

The case where the process proceeds to the step S925 includes a case where the "update date on the terminal side" differs from the "update date on the server side". In addition, the case where the process proceeds to the step S925 also includes a case where the support area on the terminal side differs from the support area on the server side that has been acquired in the step S905.

In the step S920, the attribute-basis latest map check unit 420 sets the update data existence information, which is transmitted as a response to the car information system 10, to "map update completed".

In the step S925, the attribute-basis latest map check unit 420 sets the update data existence information, which is transmitted as a response to the car information system 10, to "map update required".

Then, the attribute-basis latest map check unit 420 transmits, to the car information system 10, the update data existence information whose value has been determined in the step S920 or S925. Here, the transmitted update data existence information is received by the car information system 10 in the above-described step S515 shown in FIG. 13.

Next, map update data delivery processing, which is performed when the map update server 30 receives an update-data receive request from the car information system 10, will be described with reference to FIG. 24. Incidentally, the flow described below is taken as an example of processing in which corresponding to an area of map data included in an update-data receive request transmitted from the car information system 10, update data of the area is acquired from the map DB 300, and is then delivered to the car information system 10. Therefore, so long as the update data can be delivered, other steps may also be adopted.

Figure 24:
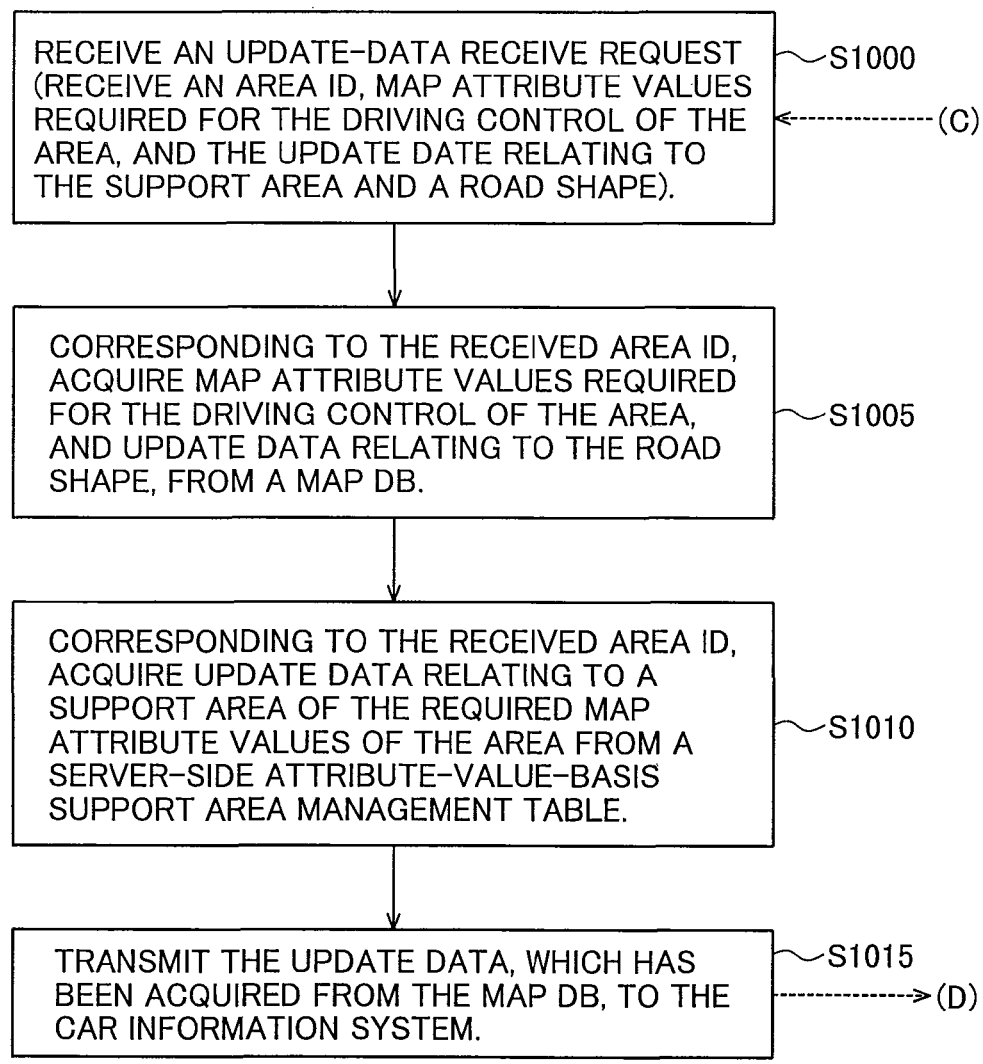
FIG. 24 is a flowchart illustrating steps of the map update data delivery processing performed by the map update server 30 according to the first embodiment of the present invention.

FIG. 24 is a flowchart illustrating steps of the map update data delivery processing performed by the map update server 30 according to the first embodiment of the present invention.

First of all, the attribute-basis map update data transmission unit 430 receives an "update-data receive request" from the car information system 10 through the communication unit 410 (S1000). In the above-described processing in the step S615 shown in FIG. 14, the "update-data receive request" received from the car information system 10 is a request transmitted from the car information system 10. The "update-data receive request" includes: an area ID used to identify an update check area; attribute data required for the driving control of the update check area; a support area (support area on the terminal side); the update date (the update date on the terminal side) of a road shape of a road included in the update check area; and the update date (the update date on the terminal side) of the required attribute data.

Next, corresponding to the area ID included in the "update-data receive request" received in the step S1000, the attribute-basis map update data transmission unit 430 acquires required map attribute data of the area, and update data relating to a road shape, from the map DB 300 (S1005). To be more specific, the attribute-basis map update data transmission unit 430 determines the difference between the attribute data and the road shape corresponding to the update check area included in the "update-data receive request", and the required map attribute data and the road shape corresponding to the update check area of the master map data registered in the map DB 300.

Next, corresponding to the area ID included in the "update-data receive request" received in the step S1000, the attribute-basis map update data transmission unit 430 acquires update data relating to a support area of required map attribute data of the area from the server-side attribute-value-basis support area management table 310 (S1010). To be more specific, the attribute-basis map update data transmission unit 430 determines the difference between a support area of required map attribute data of map data identified by data included in the update-data check request, and a support area of required map attribute data relating to master map data that is registered in the server-side attribute-value-basis support area management table 310.

The attribute-basis map update data transmission unit 430 transmits the information (update data) acquired in the steps S1005, S1010 to the car information system 10 through the communication unit 410 (S1015). Here, the transmitted update data is received by the car information system 10 in the above-described step S620 shown in FIG. 14.

Thus, according to the embodiment of the present invention, attribute data of links constituting map data is associated with a support area on an attribute data basis. In addition, the on-board system is so configured that if it is judged that map data stored in the on-board system in question is the latest-version map data, and at the same time, if an area through which the vehicle is estimated to travel is a support area, the driving control of the vehicle is performed by use of the map data.

To be more specific, in the first embodiment, if map data is the latest-version map data, and at the same time, only in the case of a field-researched support area, the map data is used for the driving control of the vehicle. Accordingly, according to the first embodiment, it is possible to achieve the driving control with high accuracy.

In addition, in the first embodiment, the on-board system is so configured that even if the map data stored in the on-board system in question is not the latest-version map data (or even if it is not possible to judge that the map data stored in the on-board system in question is the latest-version map data), if the length of time elapsed after the last update of the map data is only a specified period of time, the warning processing is performed by use of the map data so long as an area through which the vehicle is estimated to travel is a support area.

Therefore, in the first embodiment, if map data is new to some extent, only attribute data thereof, which is judged to have been subjected to the field research, can be used for the warning processing. Accordingly, according to the first embodiment, it is possible to issue a warning with high reliability.

Moreover, this embodiment is also so configured that if an area through which the vehicle is estimated to travel is not a support area, neither the driving control processing nor the warning processing is executed. Therefore, it is possible to prevent the improper driving control from being performed (for example, the driving control causes the vehicle to slow down on a road having no temporary stop line); and it is also possible to prevent incorrect warning processing from being performed (when the vehicle is travelling through a school zone, the vehicle fails to inform a user of it).

Second Embodiment

Next, a second embodiment of the present invention will be described as below. The second embodiment is a modified example of the vehicle control system according to the first embodiment described above. The second embodiment is so configured that a table used to identify attribute data, which is required for the driving control of each on-board system located in each vehicle, is stored on the map update server side, and that attribute data required for each on-board system is judged on the map update server side. To be more specific, because the map update server takes charge of the processing that is performed by the car information system in the first embodiment described above, a processing load of the car information system is reduced.

Incidentally, in the description of the second embodiment, similar reference numerals are used to designate parts that are similar to those of the first embodiment. In addition, the second embodiment will be described with primary attention focused on points that differ from the first embodiment.

First of all, a functional configuration of the second embodiment will be described with reference to FIG. 25.

Figure 25:
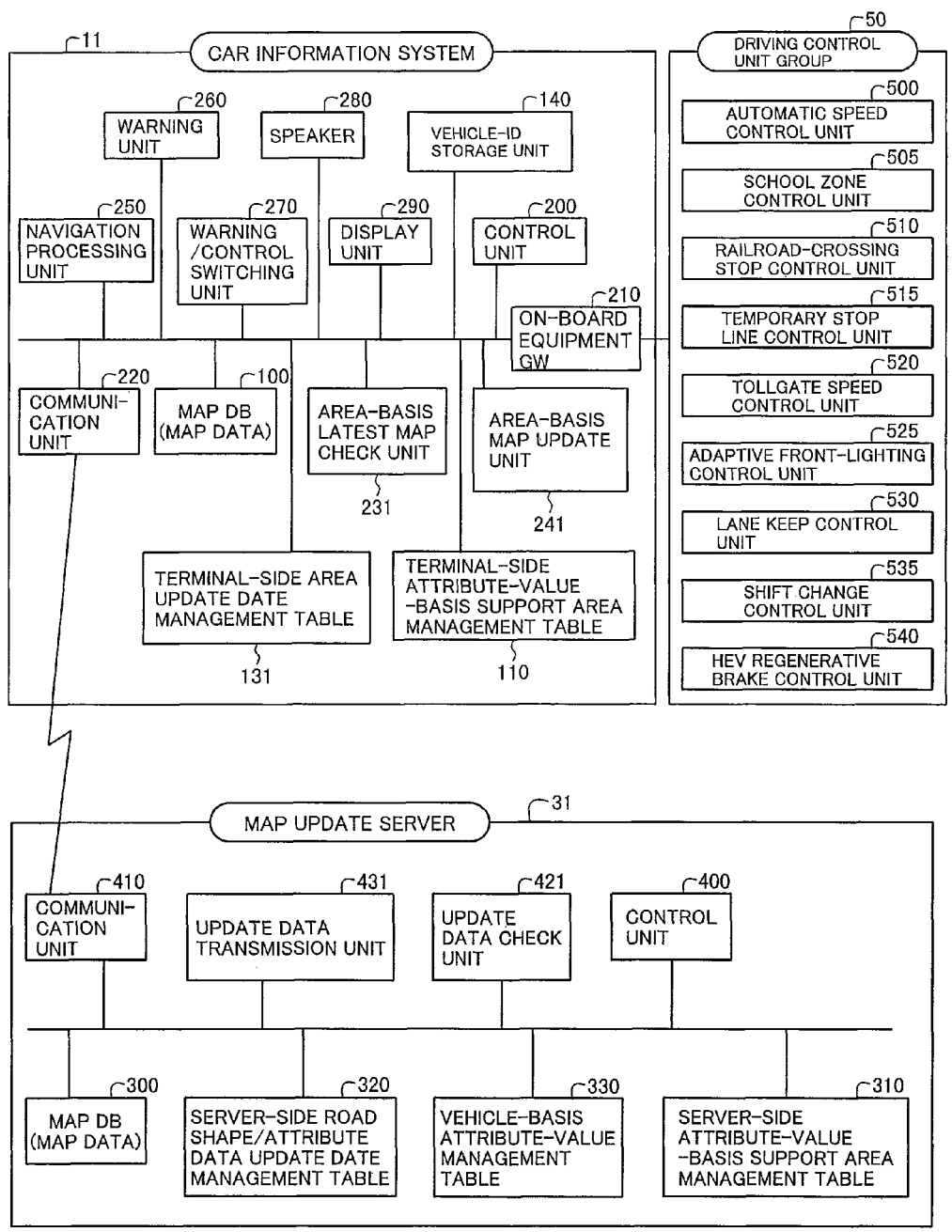
FIG. 25 is a functional block diagram illustrating a vehicle control system according to a second embodiment of the present invention.

FIG. 25 is a functional block diagram illustrating a vehicle control system according to the second embodiment of the present invention.

As illustrated in the figure, as is the case with the first embodiment, the vehicle control system according to the second embodiment includes: an on-board system that includes a car information system 11, and the driving control unit group 50; and a map update server 31 for providing the car information system 11 with map data, and information about the map data. Incidentally, the driving control unit group 50 is the same as that of the first embodiment.

The car information system 11 includes the map DB 100, the terminal-side attribute-value-basis support area management table 110, a terminal-side area update date management table 131, a vehicle-ID storage unit 140, the control unit 200, the on-board equipment gateway (GW) 210, the communication unit 220, an area-basis latest map check unit 231, an area-basis map update unit 241, the navigation processing unit 250, the warning unit 260, the warning/control switching unit 270, the speaker 280, and the display unit 290. Incidentally, the map DB 100, the terminal-side attribute-value-basis support area management table 110, the control unit 200, the on-board equipment gateway (GW) 210, the communication unit 220, the navigation processing unit 250, the warning unit 260, the warning/control switching unit 270, the speaker 280, and the display unit 290 are the same as those of the first embodiment.

The terminal-side area update date management table 131 is a table in which map data is divided into specified areas so that each of the areas (each area ID for identifying each area) is associated with the update date of map data in the area.

The vehicle-ID storage unit 140 stores a vehicle ID for identifying a vehicle that is equipped with an on-board system (the car information system 11 and the driving control unit group 50).

The area-basis latest map check unit 231 accesses the map update server 31 through the communication unit 220, and issues a check request (an update-data check request) to check whether or not it is necessary to update map data of an area (update check area) through which the vehicle is estimated to travel, and thereby judges whether or not it is necessary to update the map data of the update check area.

If the area-basis latest map check unit 231 judges that it is necessary to update the map data, the area-basis map update unit 241 acquires the update data of the map data from the map update server 31. To be more specific, the area-basis map update unit 241 accesses the map update server 31 through the communication unit 220 to issue a receive request (update-data receive request) to receive update data relating to the map data of the update check area, and thereby acquires the update data from the map update server 31.

Incidentally, a hardware configuration of the car information system 11 is not particularly limited. As is the case with the first embodiment, the description below takes, as an example, a case where the car information system 1 is configured as a system that includes: an information processing unit including a CPU, a memory, a communication interface (IF), and an I/O interface (IF); the display unit 290 such as a liquid crystal display; the speaker 280; and the on-board equipment GW 210.

In this case, it is assumed that the memory stores the map DB 100, the terminal-side attribute-value-basis support area management table 110, and the terminal-side area update date management table 131. In addition, the memory also stores programs for implementing functions of the control unit 200, the communication unit 220, the area-basis latest map check unit 231, the area-basis map update unit 241, the navigation processing unit 250, the warning unit 260, and the warning/control switching unit 270 respectively. Moreover, the vehicle-ID storage unit 140 is formed in a specified area of the memory. The functions of the control unit 200, the communication unit 220, the area-basis latest map check unit 231, the area-basis map update unit 241, the navigation processing unit 250, the warning unit 260, and the warning/control switching unit 270 are achieved by the execution of the programs stored in the memory by the CPU respectively.

Next, a configuration of the map update server 31 will be specifically described.

The map update server 31 includes the map DB 300, the server-side attribute-value-basis support area management table 310, the server-side road shape/attribute data update date management table 320, a vehicle-basis attribute-value management table 330, the control unit 400, the communication unit 410, an update data check unit 421, and the update data transmission unit 431. Incidentally, the map DB 300, the server-side attribute-value-basis support area management table 310, the server-side road shape/attribute data update date management table 320, the control unit 400, and the communication unit 410 are the same as those of the first embodiment.

The vehicle-basis attribute-value management table 330 is used to judge, on a vehicle ID basis, attribute data that is used for the driving control by a vehicle identified by the vehicle ID. Here, an example of a data structure of the vehicle-basis attribute-value management table 330 is shown in FIG. 26.

FIG. 26 is a diagram schematically illustrating a data structure of the vehicle-basis attribute-value management table 330 according to the second embodiment of the present invention. As illustrated in the figure, on a vehicle ID basis, the vehicle-basis attribute-value management table 330 associates each kind of attribute data with data indicating whether or not a vehicle identified by a vehicle ID uses the attribute data. In the illustrated example, on a vehicle ID basis, attribute data used for the driving control is associated with information indicating "associated", whereas attribute data which is not used for the driving control is associated with information indicating "unassociated".

Returning to FIG. 25, the description of the configuration of the map update server 31 will be continued.

On the receipt of an update-data check request from the car information system 11, the update data check unit 421 checks whether or not it is necessary to update data required for the driving control, the data being selected from among pieces of map data of the update check area. Then, the update data check unit 421 transmits the result of the check to the car information system 11.

On the receipt of an update-data receive request from the car information system 11, the update data transmission unit 431 selects update data relating to the data required for the driving control from among pieces of map data of the update check area, and then transmits the selected update data to the car information system 11.

Incidentally, a hardware configuration of the map update server 12 is not particularly limited. As is the case with the first embodiment, the description below takes, as an example, a case where the map update server 12 is formed of an information processing unit including a CPU, a memory, a communication interface (IF), and an I/O interface (IF). In this case, the memory stores the map DB 300, the server-side attribute-value-basis support area management table 310, the server-side road shape/attribute data update date management table 320, and the vehicle-basis attribute-value management table 330. In addition, the memory also stores programs for implementing functions of the control unit 400, the communication unit 410, the update data check unit 421, and the update data transmission unit 431 respectively. The functions of the control unit 400, the communication unit 410, the update data check unit 421, and the update data transmission unit 431 are achieved by the execution of the programs stored in the memory by the CPU respectively.

Subsequently, processing performed according to the second embodiment of the present invention will be described.

First of all, processing performed on the on-board system side (the car information system 11 and the driving control unit group 50) according to the second embodiment will be described. The on-board system according to the second embodiment executes the processing steps (S1 through S8) shown in FIG. 11. However, for the processing steps of the steps S1 through S5, the on-board system according to the second embodiment performs processing steps that differ from those performed in the first embodiment described above. Therefore, only the processing steps (S1 through S5) that differ from those of the first embodiment will be described as below, and the description of the same processing steps (S6 through S8) will be omitted.

First of all, steps of the navigation driving judgment processing (S1) and steps of the update check details setting processing (S2) according to the second embodiment will be specifically described with reference to FIG. 27.

FIG. 27 is a flowchart illustrating steps of the driving judgment processing, and steps of the update check details setting processing, which are performed by the car information system according to the second embodiment. Incidentally, the driving judgment processing, and the update check details setting processing, according to the first embodiment shown in FIG. 12, are partially changed to form the flow described below. Therefore, the description of the same processing as that shown in FIG. 12 will be simplified as below.

First of all, according to the same processing steps as those of the step S405 in FIG. 12, the control unit 200 of the car information system 11 judges whether or not path search has been executed (S1605). Then, if it is judged that the path search has been executed, the process proceeds to a step S1610. On the other hand, if it is judged that the path search has not been executed, the process proceeds to a step S1630.

Next, processing of steps S1610 through S1625, which are executed when the path search has not been executed, will be described.

The control unit 200 sets the driving mode to the navigation free driving mode according to the same processing steps as those of the step S410 in FIG. 12 (S1610).

Next, according to the same processing steps as those of the steps S415, S420 in FIG. 12, the control unit 200 judges a positioning situation of a locator of the navigation processing unit 250. If it is judged that the positioning situation is satisfactory, the process proceeds to a step S1625 (S1615, 1620).

In the step S1625, the control unit 200 identifies an area (update check area) of the map data, which is used for the driving control of the vehicle, according to processing steps determined by the driving mode set in the step S1610 (in this case, the navigation free driving mode). Incidentally, a method for identifying an update area is the same as that of the step S430 shown in FIG. 12 (refer to FIGS. 17, 18). The control unit 200 refers to the terminal-side area update date management table 131, and thereby acquires the update date of each area ID of each area included in the identified update check area. After that, the control unit 200 requests the area-basis latest map check unit 231 to perform the map update check processing of the map update server 30.

Next, processing of the steps S1630 through S1635, which is performed when it is judged in the step S1605 that the path search has been executed, will be described.

In the step S1630, the control unit 200 sets the driving mode to the navigated route driving mode according to the same processing steps as those of the step S455 in FIG. 12.

In the step S1635, the control unit 200 identifies an area (update check area) of the map data, which is used for the driving control of the vehicle, according to processing steps determined by the driving mode set in the step S1630 (in this case, the navigated route driving mode). Incidentally, a method for identifying an update area is the same as that of the step S445 shown in FIG. 12 (refer to FIG. 19). The control unit 200 refers to the terminal-side area update date management table 131, and thereby acquires the update date of each area ID of each area included in the identified update check area. After that, the control unit 200 requests the area-basis latest map check unit 231 to perform the map update check processing of the map update server 30.

Next, steps of the map update check processing (S3) performed according to the second embodiment will be specifically described with reference to FIG. 28.

Figure 28:
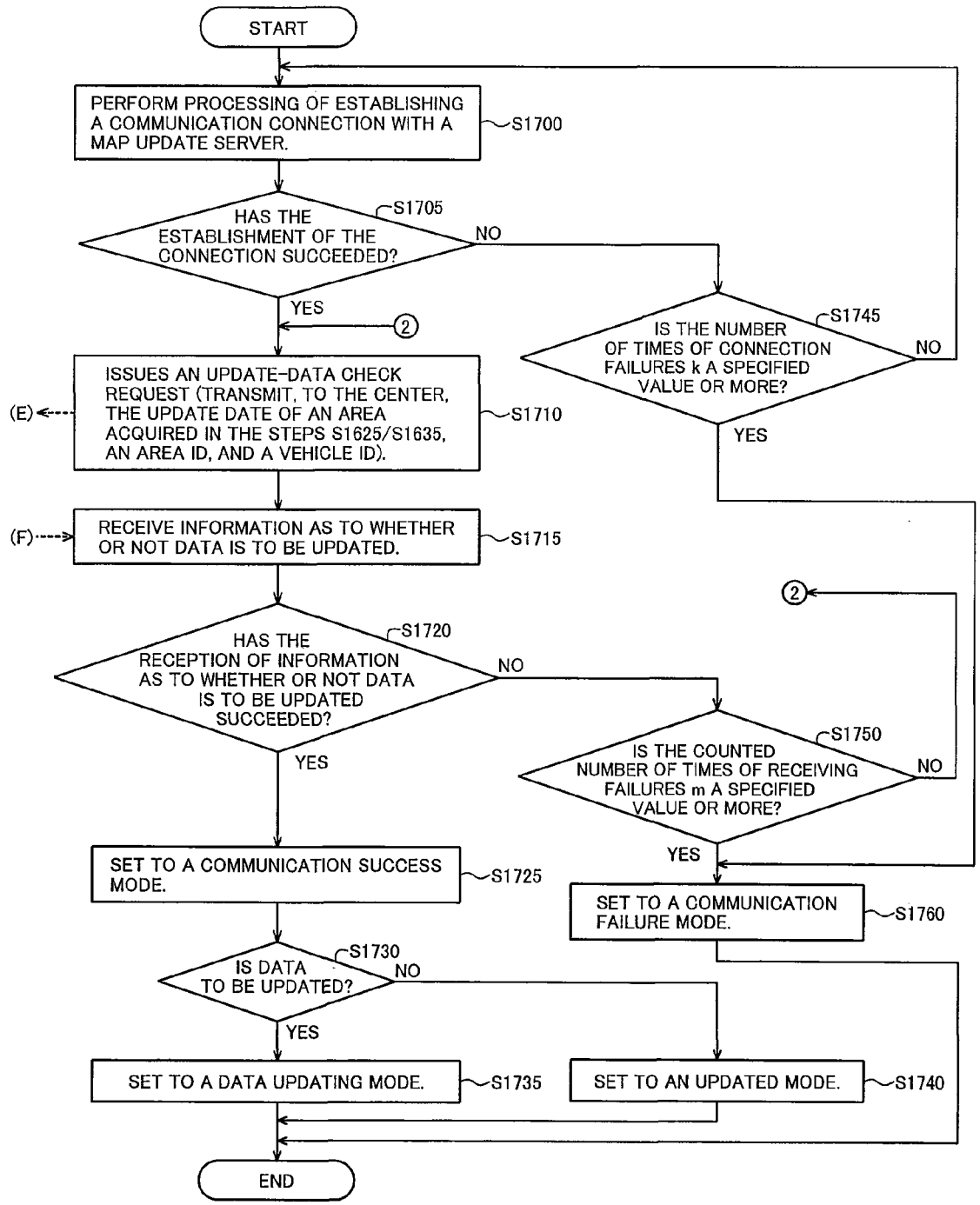
FIG. 28 is a flowchart illustrating steps of the map update check processing performed by the car information system according to the second embodiment of the present invention.

FIG. 28 is a flowchart illustrating steps of the map update check processing performed by the car information system according to the second embodiment. Incidentally, the map update check processing according to the first embodiment shown in FIG. 13 is partially changed to form the flow described below. Therefore, the description of the same processing as that shown in FIG. 13 will be simplified as below.

First of all, according to the same processing steps as those of the step S500 in FIG. 13, the area-basis latest map check unit 231 performs processing of establishing a communication connection with the map update server 30 (S1700).

Next, according to the same processing steps as those of the step S505 in FIG. 13, the area-basis latest map check unit 231 judges whether or not the establishment of the communication connection has succeeded (S1705). If it is judged that the establishment of the communication connection has succeeded, the process proceeds to a step S1710, whereas if it is judged that the establishment of the communication connection has failed, the process proceeds to a step S1745.

In the step S1745, according to the same processing steps as those of the step S540 in FIG. 13, the area-basis latest map check unit 231 counts the number of times the establishment of the connection has failed (the number of times of connection failures k). If the counted number of times of connection failures k is a specified value or more (for example, the number of times of connection failures k≧5), the process proceeds to a step S1760. In addition, if the counted number of times of connection failures k is smaller than the specified value (for example, the number of times of connection failures k<5), the process returns to the step S1700, and the area-basis latest map check unit 231 performs the communication connection establishment processing again.

Next, processing of S1710, which is performed when it is judged in the step S1705 that the establishment of the connection has succeeded, will be described.

In the step S1710, the area-basis latest map check unit 231 issues an update-data check request to the map update server 31 through the communication unit 220. To be more specific, the area-basis latest map check unit 231 receives, from the control unit 200, information required for the driving control (an area ID of an area included in an update check area, and the update date of each area ID (the information that has been acquired by the control unit 200 in the steps S1625/S1635 shown in FIG. 27)). In addition, the area-basis latest map check unit 231 reads out a vehicle ID from the vehicle-ID storage unit 140. Then, the area-basis latest map check unit 231 transmits, to the map update server 31, an update-data check request that includes the received information required for the driving control (the area ID, and the update date of each area ID), and the vehicle ID.

Next, the area-basis latest map check unit 231 performs the same processing as that of the step S515 shown in FIG. 13 (S1715). To be more specific, the area-basis latest map check unit 231 receives update data existence information that is transmitted by the map update server 31 in response to the update-data check request (S1715).

Next, as is the case with the step S520 shown in FIG. 13, the area-basis latest map check unit 231 judges whether or not the update data existence information has been successfully received (S520). In this step, if it is judged that the receiving has succeeded, the process proceeds to a step S1725, whereas if it is judged that the receiving has failed, the process proceeds to a step S1750.

In the step S1750, as is the case with the step S545 shown in FIG. 13, the area-basis latest map check unit 231 counts the number of times the receiving has failed. If the counted number of times of failures m is a specified value or more (for example, the number of times of failures m≧5), the process proceeds to a step S1760. On the other hand, if the area-basis latest map check unit 231 judges that the counted number of times of failures m is smaller than the specified number of times (for example, if the number of times of failures m<5), the process returns to the step S1710, and the area-basis latest map check unit 231 issues an update-data check request to the map update server 31 again.

Next, processing of the step S1760 will be described. This processing is performed when the connection establishment processing in the step S1700 has failed the specified number of times or more, or when the receive processing of the update data existence information in the step S1715 has failed the specified number of times or more. In the step S1760, the same processing as that of the step S550 shown in FIG. 13 is performed. To be more specific, in the step S1760, the mode for judging whether or not the update data check processing has succeeded is set to the communication failure mode.

Incidentally, in the step S1720, the series of processing in the steps S1725 and after (S1725, S1730, S1735, S1740), which are performed when it is judged that the receiving has succeeded, are the same as those in the steps S525, S530, S535, S555 shown in FIG. 13. Therefore, the description thereof will be omitted here.

Next, steps of the map update data acquisition processing (S4) performed according to the second embodiment will be specifically described with reference to FIG. 29.

Figure 29:
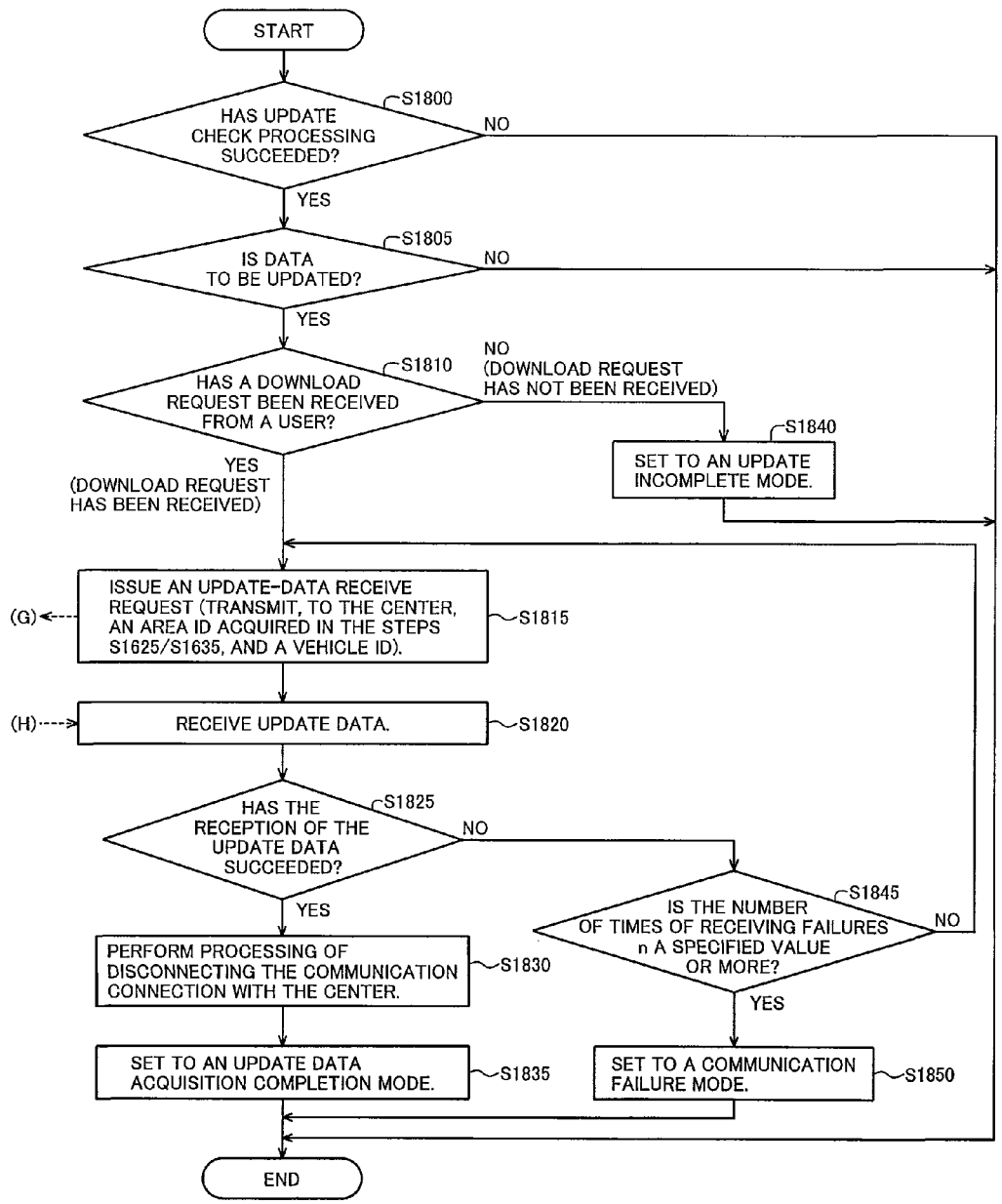
FIG. 29 is a flowchart illustrating steps of the map update data acquisition processing performed by the car information system according to the second embodiment of the present invention.

FIG. 29 is a flowchart illustrating the steps of the map update data acquisition processing performed by the car information system according to the second embodiment. Incidentally, the map update data acquisition processing shown in FIG. 14 is partially changed to form the flow described below. Therefore, the description of the same processing as that shown in FIG. 14 will be simplified as below.

First of all, according to the same processing steps as those of the step S600 in FIG. 14, the control unit 200 judges whether or not the update check processing has succeeded. If it is judged that the update check processing has succeeded, the process proceeds to a step S1805. On the other hand, if it is judged that the update check processing has failed, the control unit 200 ends the processing (S1800).

Next, according to the same processing steps as those of the step S605 in FIG. 14, the control unit 200 judges the update data existence information. If the update data existence information is judged to be an update information existing mode, the process proceeds to a step S1810. On the other hand, if the update data existence information is judged to be an update completed mode, the control unit 200 ends the processing (S1805).

Next, according to the same processing steps as those of the step S610 in FIG. 14, the control unit 200 judges whether or not a download request has been received from a user. If it is judged that the download request has been received from the user, the process proceeds to a step S1815. On the other hand, if the control unit 200 judges that the download request has not been received from the user, the process proceeds to a step S1840 (S1810). Incidentally, if the process proceeds to the step S1840, the same processing as that of the step S640 shown in FIG. 14 is performed. To be more specific, the mode for judging a map update data acquisition state is set to the update incomplete mode, before the processing ends.

In the step S1815, the control unit 200 instructs the area-basis map update unit 241 to perform the update-data receive processing so that update data is received from the map update server 31. On the receipt of the instruction to perform the update-data receive processing, the area-basis map update unit 241 receives, from the control unit 200, an area ID of an area included in an update check area, and the update date of each area ID (the information that has been acquired by the control unit 200 in the steps S1625/S1635 shown in FIG. 27). In addition, the area-basis latest map check unit 231 reads out a vehicle ID from the vehicle-ID storage unit 140. Then, the area-basis latest map check unit 231 transmits, to the map update server 31, an update-data receive request that includes the received area ID, the received update date of each area ID, and the vehicle ID.

In the step S1820, the area-basis map update unit 241 receives, through the communication unit 220, update data that is transmitted by the map update server 31 in response to the update-data receive request. Then, the process proceeds to a step S1825.

Incidentally, because series of processing of the steps S1825 and after (S1825, S1830, S1835, S1845, S1850) are the same as those of the steps S625 and after (S625, S630, S635, S645, S650) shown in FIG. 14, description thereof will be omitted here.

Subsequently, processing performed by the map update server 31 according to the second embodiment of the present invention will be described.

First of all, map-data update check processing, which is performed when the map update server 31 receives an update-data check request from the car information system 11, will be described with reference to FIG. 30.

Figure 30:
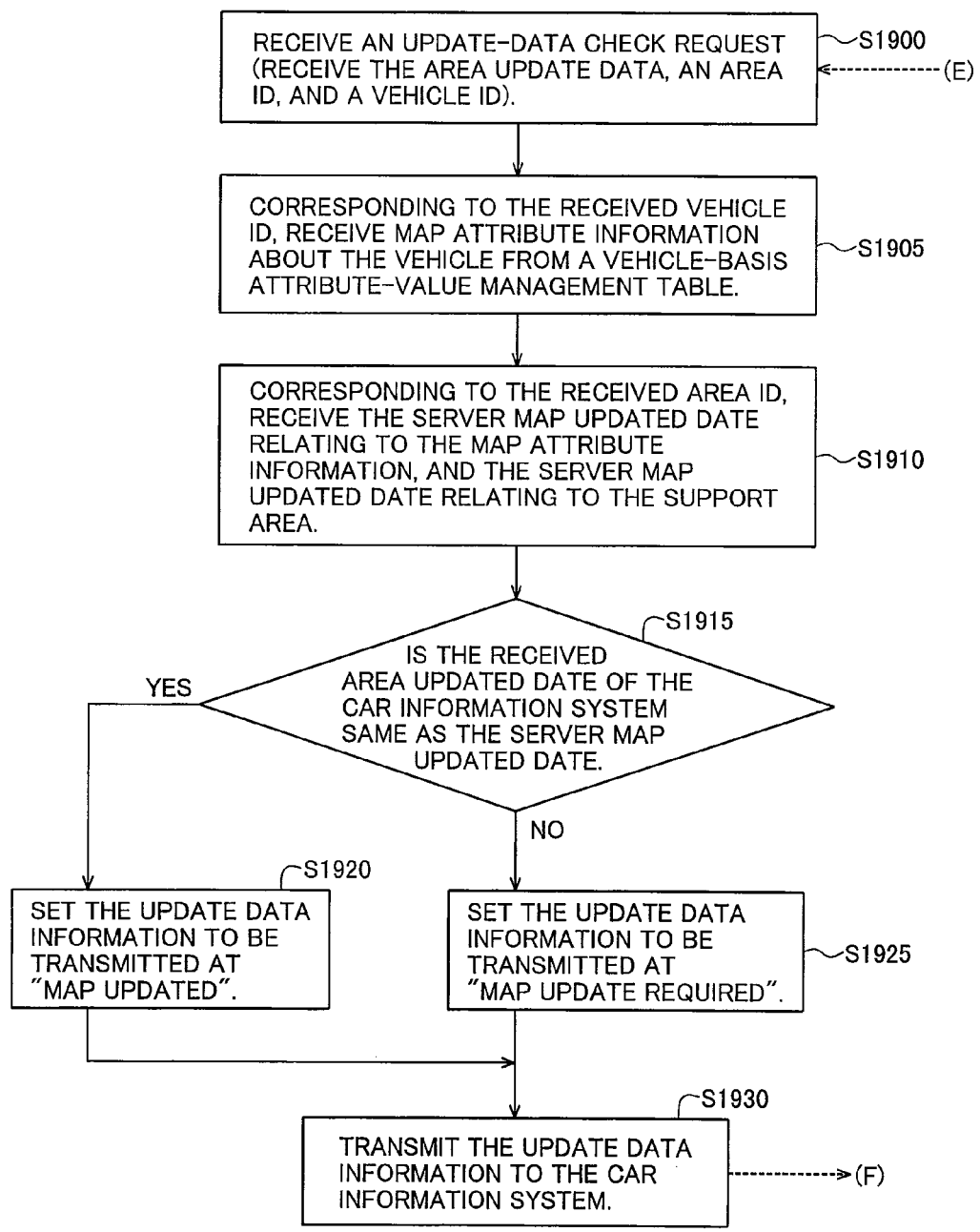
FIG. 30 is a flowchart illustrating steps of the map-data update check processing performed by the map update server 31 according to the second embodiment of the present invention.

FIG. 30 is a flowchart illustrating steps of the map-data update check processing performed by the map update server 31 according to the second embodiment of the present invention.

First of all, the update data check unit 421 receives an update-data check request from the car information system 11 through the communication unit 410 (S1900). In the above-described processing in the step S1710 shown in FIG. 28, the "update-data check request" received from the car information system 11 is a request transmitted from the car information system 11. This update-data check request includes an area ID of an area included in an update check area, the update date of each area ID (the terminal area update date), and a vehicle ID.

Subsequently, the update data check unit 421 accesses the vehicle-basis attribute-value management table 330 to identify map attribute data relating to the received vehicle ID (S1905). To be more specific, the update data check unit 421 selects, from among pieces of data registered in the vehicle-basis attribute-value management table 330, attribute data that is associated with the received vehicle ID, and at the same time that is associated with information indicating "associated". For example, in the vehicle-basis attribute-value management table 330 shown in FIG. 26, the vehicle ID included in the update-data check request is assumed to be "5255". In this case, the update data check unit 421 accesses the vehicle-basis attribute-value management table 330 to select "railroad crossing", "temporary stop line", and "tollgate" as attribute data required for a vehicle having the vehicle ID included in the update-data check request.

Next, the update data check unit 421 refers to the server-side road shape/attribute data update date management table 320, and thereby acquires the update date (the server map update date) of a support area of the attribute data acquired in the step S1905, corresponding to the area ID received in the step S1900 (S1910).

Next, the update data check unit 421 compares "the terminal area update date" received in the step S1900 with "the server map update date" acquired in the step S1910. If both of them agree with each other, the process proceeds to a step S1920, whereas if both of them differ from each other, the process proceeds to a step S1925 (S1915).

In the step S1920, the update data check unit 421 sets the update data existence information, which is transmitted as a response to the car information system 11, to "map update completed".

In the step S1925, the update data check unit 421 sets the update data existence information, which is transmitted as a response to the car information system 10, to "map update required".

Then, the attribute-basis latest map check unit 420 transmits, to the car information system 11, the update data existence information whose value has been determined in the step S1920 or S1925. Here, the transmitted update data existence information is received by the car information system 11 in the above-described step S1715 shown in FIG. 28.

Next, map update data delivery processing, which is performed when the map update server 31 receives an update-data receive request from the car information system 11, will be described with reference to FIG. 31.

Figure 31:
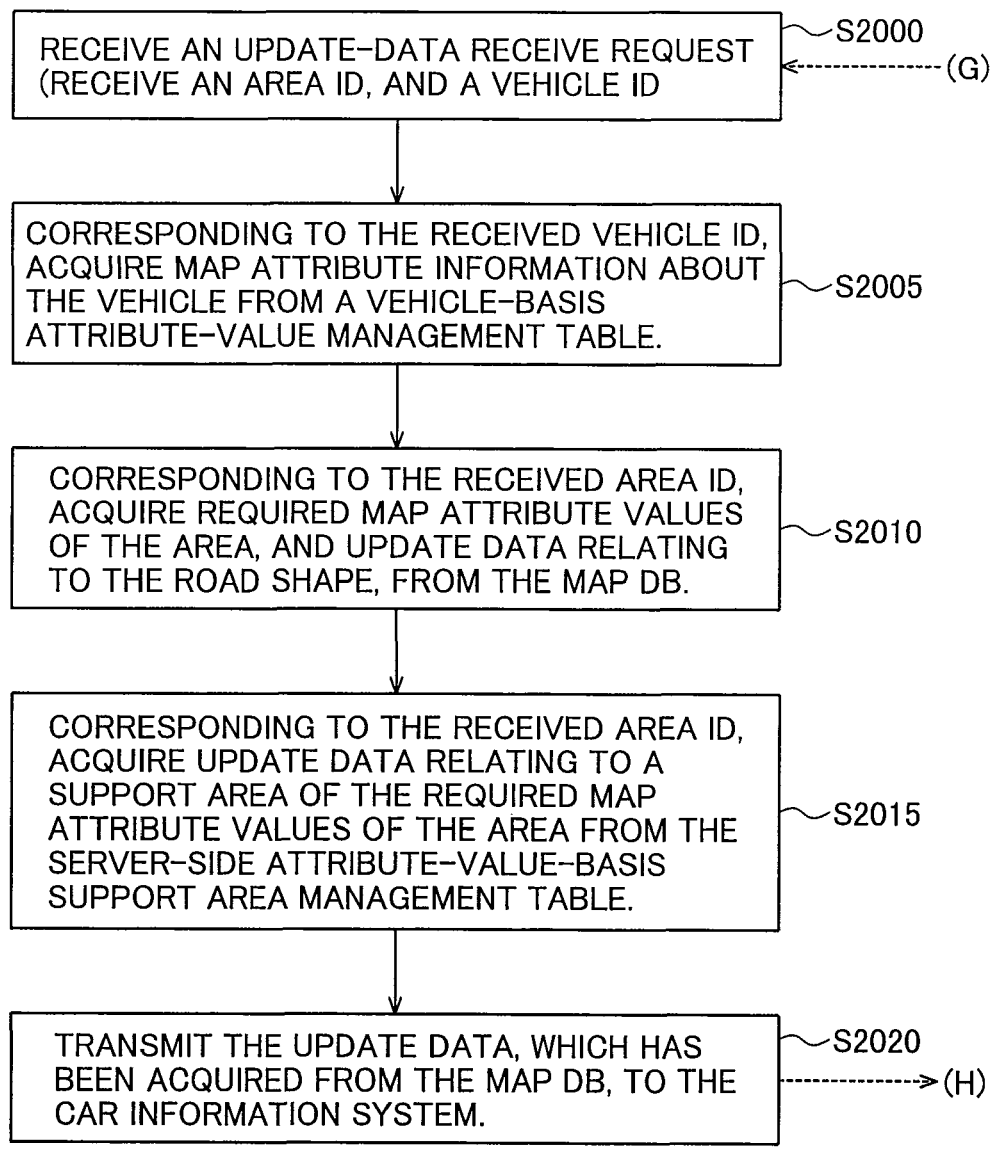
FIG. 31 is a flowchart illustrating steps of the map update data delivery processing performed by the map update server 31 according to the second embodiment of the present invention.

FIG. 31 is a flowchart illustrating steps of the map update data delivery processing performed by the map update server 31 according to the second embodiment of the present invention.

First of all, the update data transmission unit 431 receives an update-data receive request from the car information system 11 through the communication unit 410 (S2000). In the above-described processing in the step S1815 shown in FIG. 29, the "update-data receive request" is a request transmitted from the car information system 11. This update-data receive request includes an area ID of an area included in an update check area, the update date of each area ID (the terminal area update date), and a vehicle ID.

Next, the update data transmission unit 431 performs the same processing as that of the step S1905 shown in FIG. 31 to identify attribute data relating to the received vehicle ID (S2005).

Next, corresponding to map data of an area ID included in the update-data receive request received in the step S2000, the update data transmission unit 431 acquires map attribute data required for the area, and update data of a road shape, from the map DB 300 (S2010). Incidentally, the map attribute data required for the area is the attribute data that is identified in the S2005 among pieces of attribute data included in the map data identified by the received area ID.

Next, corresponding to the area ID included in the update-data receive request received in the step S2000, the update data transmission unit 431 acquires, from the server-side attribute-value-basis support area management table 310, update data relating to a support area of map attribute data required for the area (S2015).

Next, the update data transmission unit 431 transmits the information (update data) acquired in the steps S2010, S2015 to the car information system 11 through the communication unit 410 (S2020). Here, the transmitted update data is received by the car information system 11 in the above-described step S1820 shown in FIG. 29.

Thus, according to the second embodiment of the present invention, the map update server 31 stores the vehicle-basis attribute-value management table 330 in which each vehicle ID is associated with attribute data that is used for the driving control by the vehicle identified by the vehicle ID. On the receipt of an update-data check request (or an update-data receive request) of map data, which includes a vehicle ID, and which is transmitted from the car information system 11, the map update server 31 uses the received vehicle ID and the vehicle-basis attribute-value management table 330 to judge attribute data required for the car information system 11. To be more specific, the second embodiment is configured to identify attribute data required for each car information system on the map update server 31 side. The map update server 31 sends back, to the information processing apparatus 11, information as to whether or not update data relating to the identified attribute data exists (or update data).

Thus, according to the second embodiment of the present invention, the map update server located on the center side takes charge of the judgment processing of judging attribute data required for the driving control of each vehicle, the judgment processing being performed by the car information system in the first embodiment described above. This configuration of the second embodiment not only produces the effects of the first embodiment, but also makes it possible to further reduce a processing load on the car information system side.

Third Embodiment

Next, a third embodiment of the present invention will be described as below. The third embodiment is a modified example of the vehicle control system according to the first embodiment described above. According to the third embodiment, an inquiry is sent from each unit constituting a driving control unit group to a map update server through a car information system so as to check whether or not map data stored on the on-board system side is the latest one. If it is judged that the map data is not the latest one, the map data is updated.

Incidentally, in the description of the third embodiment, similar reference numerals are used to designate parts that are similar to those of the first embodiment. In addition, the third embodiment will be described with primary attention focused on points that differ from the first embodiment.

First of all, a functional configuration of the third embodiment will be described with reference to FIG. 32.

Figure 32:
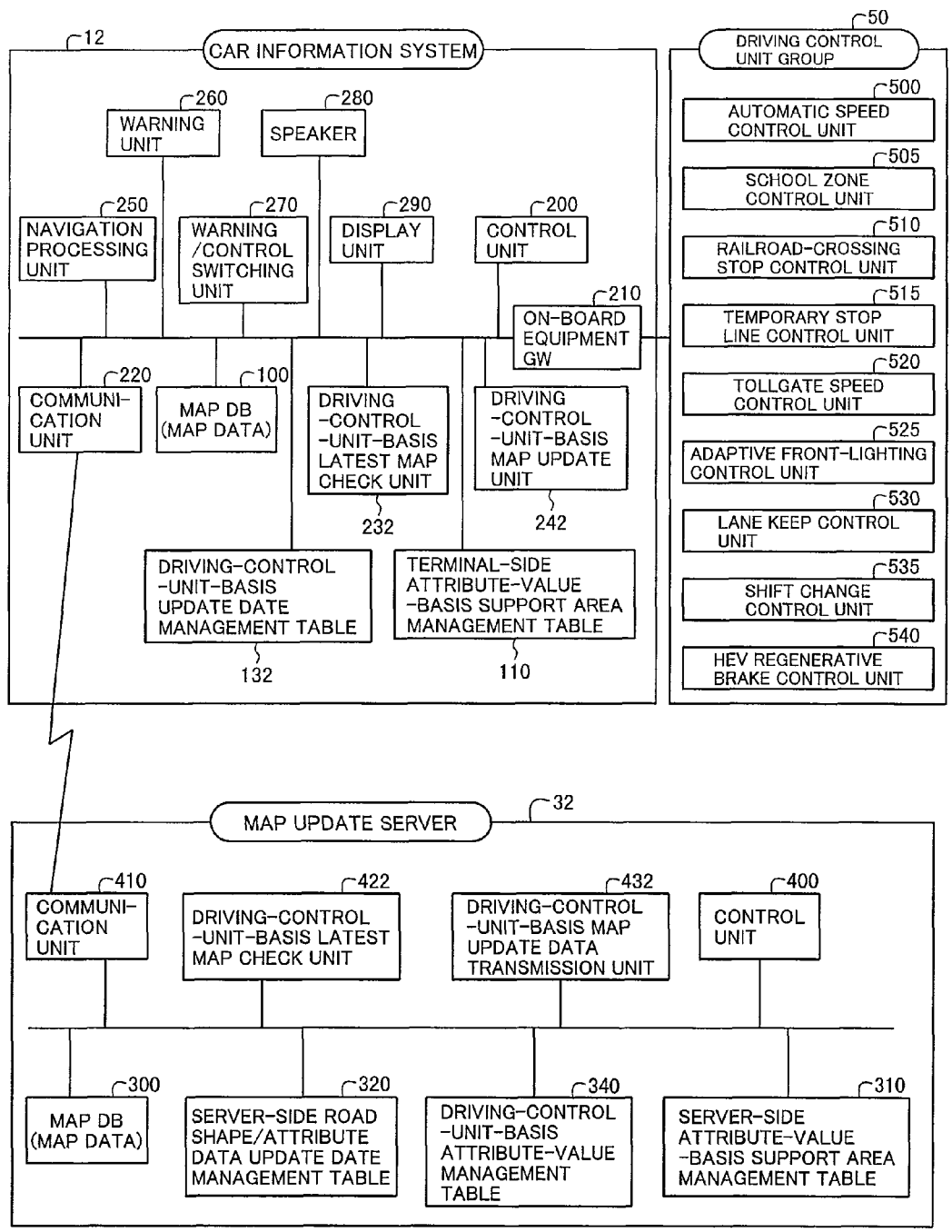
FIG. 32 is a functional block diagram illustrating a vehicle control system according to a third embodiment of the present invention.

FIG. 32 is a functional block diagram illustrating a vehicle control system according to the third embodiment of the present invention.

As illustrated in the figure, as is the case with the first embodiment, the vehicle control system according to the third embodiment includes: an on-board system that includes a car information system 12, and the driving control unit group 50; and a map update server 32 for providing the car information system 12 with map data, and information about the map data.

In addition to the above-described functions of the first embodiment, the driving control unit group 50 further includes a function of making an inquiry about whether or not it is necessary to update map data stored in the car information system 12, the inquiry being sent to the map update server 32 through the car information system 12. To be more specific, the driving control unit group 50 is configured to make an inquiry about whether or not map data stored in the on-board system is kept in the latest version. Incidentally, for convenience of explanation, the same reference numerals as those of the first embodiment are used to designate elements of the driving control unit group 50.

The car information system 12 includes the map DB 100, the terminal-side attribute-value-basis support area management table 110, a driving-control-unit-basis update date management table 132, the control unit 200, the on-board equipment gateway (GW) 210, the communication unit 220, a driving-control-unit-basis latest map check unit 232, a driving-control-unit-basis map update unit 242, the navigation processing unit 250, the warning unit 260, the warning/control switching unit 270, the speaker 280, and the display unit 290. Incidentally, the map DB 100, the terminal-side attribute-value-basis support area management table 110, the control unit 200, the on-board equipment gateway (GW) 210, the communication unit 220, the navigation processing unit 250, the warning unit 260, the warning/control switching unit 270, the speaker 280, and the display unit 290 are the same as those of the first embodiment.

The driving-control-unit-basis update date management table 132 is a table in which the update date of each driving control unit is registered on an area basis. Here, a data structure of the driving-control-unit-basis update date management table 132 is shown in FIG. 33.

FIG. 33 is a diagram schematically illustrating a data structure of the driving-control-unit-basis update date management table 132 according to the third embodiment of the present invention.

As shown in the figure, in the driving-control-unit-basis update date management table 132, map data is divided into specified areas; and on an area (each area ID for identifying the area) basis, each driving control unit is associated with the update date of map data to be used (map data registered in the map DB 100). In the illustrated example, for each of areas 1, 2, 3, each driving control unit is associated with the update date of map data to be used.

Returning to FIG. 32, the description will be continued. The driving-control-unit-basis latest map check unit 232 receives, from the driving control unit group 50, an update request relating to map data to be used. Accordingly, the driving-control-unit-basis latest map check unit 232 access the map update server 32 to issue a check request (an update-data check request) to check whether or not it is necessary to update map data corresponding to a driving control unit that is a target of the update check request, and thereby judges whether or not it is necessary to update the update check area.

If the driving-control-unit-basis latest map check unit 232 judges that it is necessary to update the map data, the driving-control-unit-basis map update unit 242 acquires the update data of the map data from the map update server 32.

Incidentally, a hardware configuration of the car information system 12 is not particularly limited. As is the case with the first embodiment, the description below takes, as an example, a case where the car information system 12 is configured as a system that includes: an information processing unit including a CPU, a memory, a communication interface (IF), and an I/O interface (IF); the display unit 290 such as a liquid crystal display; the speaker 280; and the on-board equipment GW 210.

In this case, it is assumed that the memory stores the map DB 100, the terminal-side attribute-value-basis support area management table 110, and the driving-control-unit-basis update date management table 132. In addition, the memory also stores programs for implementing functions of the control unit 200, the communication unit 220, the driving-control-unit-basis latest map check unit 232, the driving-control-unit-basis map update unit 242, the navigation processing unit 25, the warning unit 260, and the warning/control switching unit 270 respectively. The functions of the control unit 200, the on-board equipment gateway (GW) 210, the communication unit 220, the driving-control-unit-basis latest map check unit 232, the driving-control-unit-basis map update unit 242, the navigation processing unit 250, the warning unit 260, and the warning/control switching unit 270 are achieved by the execution of the programs stored in the memory by the CPU respectively.

Next, a configuration of the map update server 32 will be specifically described.

The map update server 32 includes the map DB 300, the server-side attribute-value-basis support area management table 310, the server-side road shape/attribute data update date management table 320, a driving-control-unit-basis attribute-value management table 340, the control unit 400, the communication unit 410, the driving-control-unit-basis latest map check unit 422, and a driving-control-unit-basis map update data transmission unit 432. Incidentally, the map DB 300, the server-side attribute-value-basis support area management table 310, the server-side road shape/attribute data update date management table 320, the control unit 400, and the communication unit 410 are the same as those of the first embodiment.

In the driving-control-unit-basis attribute-value management table 340, map data is divided into specified areas; and on an area (each area ID for identifying the area) basis, each driving control unit is associated with the update date (the server side update date) of map data to be used (master map data registered in the map DB 300).

On the receipt of an update-data check request from the car information system 12, the driving-control-unit-basis latest map check unit 422 checks whether or not it is necessary to update map data of an update check area, which is required for the driving control, corresponding to a driving control unit that is a target of the update-data check request. Then, the driving-control-unit-basis latest map check unit 422 transmits the result of the check to the car information system 12.

On the receipt of an update-data receive request from the car information system 12, the driving-control-unit-basis map update data transmission unit 432 transmits, to the car information system 12, update data of map data of an update check area corresponding to a driving control unit that is a target of the update data receive request.

Incidentally, a hardware configuration of the map update server 32 is not particularly limited. As is the case with the first embodiment, the description below takes, as an example, a case where the map update server 32 is formed of an information processing unit including a CPU, a memory, a communication interface (IF), and an I/O interface (IF). In this case, the memory stores the map DB 300, the server-side attribute-value-basis support area management table 310, the server-side road shape/attribute data update date management table 320, and the driving-control-unit-basis attribute-value management table 340. In addition, the memory also stores programs for implementing functions of the control unit 400, the communication unit 410, the driving-control-unit-basis latest map check unit 422, and the driving-control-unit-basis map update data transmission unit 432 respectively. The functions of the control unit 400, the communication unit 410, the driving-control-unit-basis latest map check unit 422, and the driving-control-unit-basis map update data transmission unit 432 are achieved by the execution of the programs stored in the memory by the CPU respectively.

Subsequently, processing performed according to the third embodiment of the present invention will be described.

First of all, the whole processing performed by the on-board system according to the third embodiment will be described with reference to FIG. 34.

Figure 34:
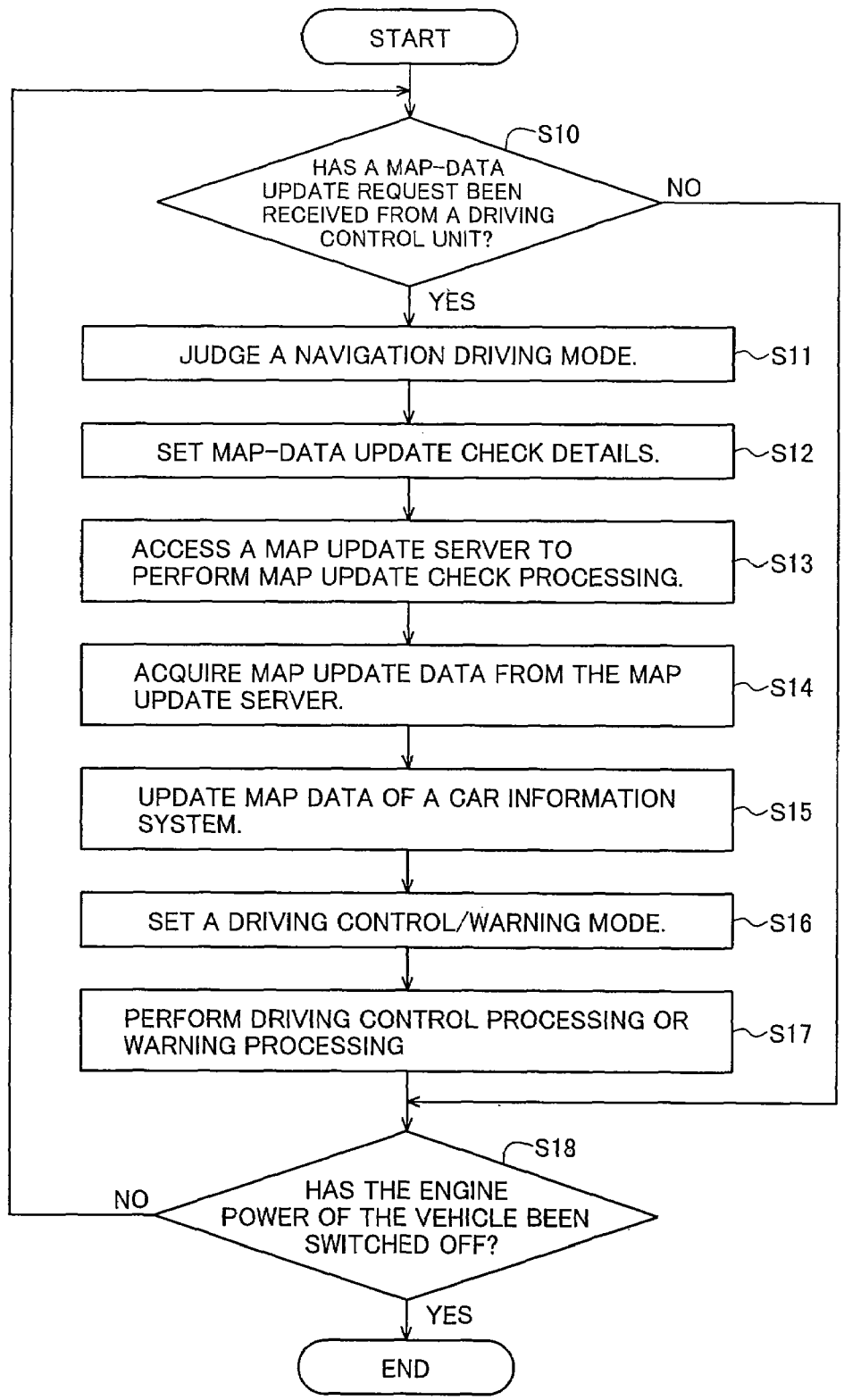
FIG. 34 is a flowchart schematically illustrating the whole processing performed by the on-board system according to the third embodiment of the present invention.

FIG. 34 is a flowchart schematically illustrating the whole processing performed by the on-board system according to the third embodiment of the present invention. Incidentally, the processing described below will be started when the engine power of a vehicle, which is equipped with the car information system 12 and the driving control unit group 50, is switched on (an ON state).

First of all, the control unit 200 of the car information system 12 judges whether or not a map-data update request has been received from the driving control unit group 50 (S10). To be more specific, if the control unit 200 judges that a map-data update request has been received from the driving control unit group 50 through the on-board equipment GW 210, the process proceeds to a step S11. On the other hand, it is judged that a map-data update request has not been received from the driving control unit group 50, the process proceeds to a step S18. Here, it is assumed that the map-data update request received from the driving control unit group 50 includes a driving control unit ID for identifying a driving control unit included in the driving control unit group 50.

Incidentally, the timing in which a map-data update request is issued from the driving control unit group 50 is not particularly limited. For example, the driving control unit group 50 issues an update request in the timing in which the engine power of the vehicle is brought into the ON state.

In the step S11, the control unit 200 judges the navigation driving mode according to the same processing steps as those of the step S1 shown in FIG. 11. Then, the process proceeds to a step S12. In the step S12, the control unit 200 performs processing of setting update check details about which the map update server 12 is inquired. Incidentally, the processing of the steps S1, S12 will be specifically described with reference to FIG. 35 described below.

Next, the driving-control-unit-basis latest map check unit 232 accesses the map update server 32 through the communication unit 220 to perform the map update check processing (S13). Incidentally, the processing of the step S13 will be specifically described with reference to FIG. 36 described below.

Next, the driving-control-unit-basis map update unit 242 accesses the map update server 32 through the communication unit 220 to perform map update data acquisition processing (S14). Then, the process proceeds to a series of processing of steps S15 and after. Incidentally, the processing of the step S14 will be specifically described with reference to FIG. 37 described below.

Incidentally, because the series of processing of the steps S15 and after are the same as those of the steps S5 and after shown in FIG. 11, description thereof will be omitted here.

Subsequently, steps of the navigation driving judgment processing (S11), and steps of the update check details setting processing (S12), which are shown in FIG. 34, will be specifically described with reference to FIG. 35.

Figure 35:
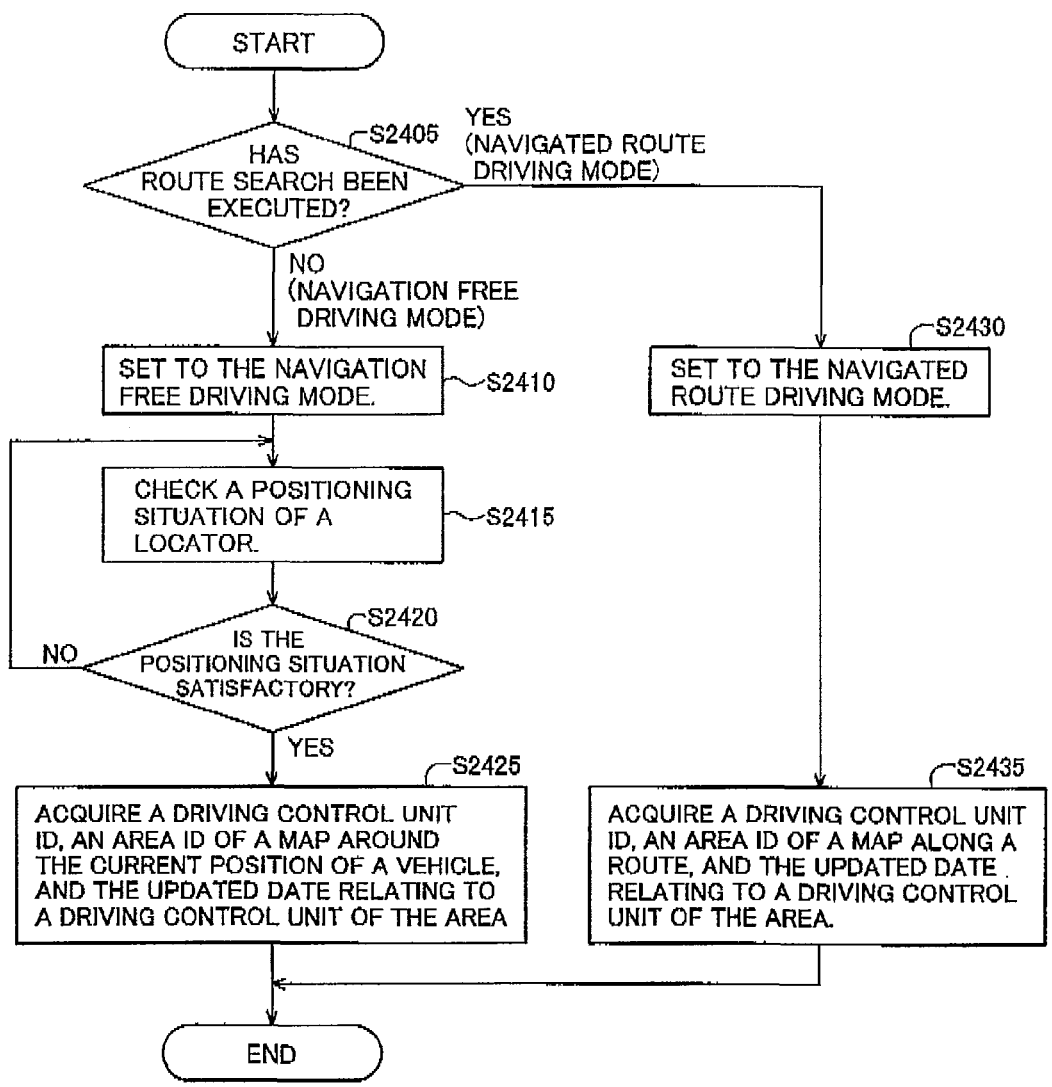
FIG. 35 is a flowchart specifically illustrating the processing steps of the steps S11, S12 shown in FIG. 34.

FIG. 35 is a flowchart specifically illustrating the processing steps of the steps S11, S12 shown in FIG. 34. Incidentally, the driving judgment processing, and the update check details setting processing, according to the first embodiment shown in FIG. 12, are partially changed to form the flow described below. Therefore, the description of the same processing as that shown in FIG. 12 will be simplified as below.

First of all, according to the same processing steps as those of the step S405 in FIG. 12, the control unit 200 of the car information system 12 judges whether or not path search has been executed (S2405). Then, if it is judged that the path search has been executed, the process proceeds to a step S2410. On the other hand, if it is judged that the path search has not been executed, the process proceeds to a step S2430.

Next, a series of processing of steps S2410 through S2425, which are executed when the path search has not been executed, will be described.

According to the same processing steps as those of the step S410 in FIG. 12, the control unit 200 sets a mode (driving mode) of processing for identifying an area of map data, which is used for the driving control/warning processing, to the navigation free driving mode (S2410).

Next, according to the same processing steps as those of the steps S415, S420 in FIG. 12, the control unit 200 judges a positioning situation of a locator of the navigation processing unit 250. If it is judged that the positioning situation is satisfactory, the process proceeds to a step S2425 (S2415, 2420).

In the step S2425, the control unit 200 identifies an area (update check area) of the map data, which is used for the driving control of the vehicle, according to processing steps determined by the driving mode set in the step S2410 (in this case, the navigation free driving mode). Incidentally, a method for identifying an update area is the same as that of the step S430 shown in FIG. 12 (refer to FIGS. 17, 18). Here, the update check area becomes an area that is identified by the specified number of meshes with a mesh in which a current position of the vehicle is located kept at the center of the area.

In addition, in the step S2425, the control unit 200 refers to the driving-control-unit-basis update date management table 132 to acquire the update date that is associated with a driving control unit of each area included in the identified update check area. Here, the driving control unit of each area is a driving control unit that is identified by a driving control unit ID received in the step S10 shown in FIG. 34. After that, the control unit 200 requests the driving-control-unit-basis latest map check unit 232 to perform the map update check processing.

Next, a series of processing of steps S2430 through S2435, which are performed when it is judged in the step S2405 that the path search has been executed, will be described.

In the step S2430, the control unit 200 sets the driving mode to the navigated route driving mode according to the same processing steps as those of the step S435 in FIG. 12.

In the step S2435, the control unit 200 identifies an area (update check area) of the map data, which is used for the driving control of the vehicle, according to processing steps determined by the driving mode set in the step S2430 (in this case, the navigated route driving mode). Incidentally, a method for identifying an update area is the same as that of the step S445 shown in FIG. 12 (refer to FIG. 19). Here, because the driving mode is the navigated route driving mode, the update check area becomes an area that is identified by meshes to which a link forming the searched path belongs.

Moreover, in the step S2435, the control unit 200 refers to the driving-control-unit-basis update date management table 132 to acquire the update date that is associated with a driving control unit of each area included in the identified update check area. Here, the driving control unit of each area is a driving control unit that is identified by a driving control unit ID received in the step S10 shown in FIG. 34. After that, the control unit 200 requests the driving-control-unit-basis latest map check unit 232 to perform the map update check processing.

Subsequently, steps of the map update check processing (S13) shown in FIG. 34 will be specifically described with reference to FIG. 36.

Figure 36:
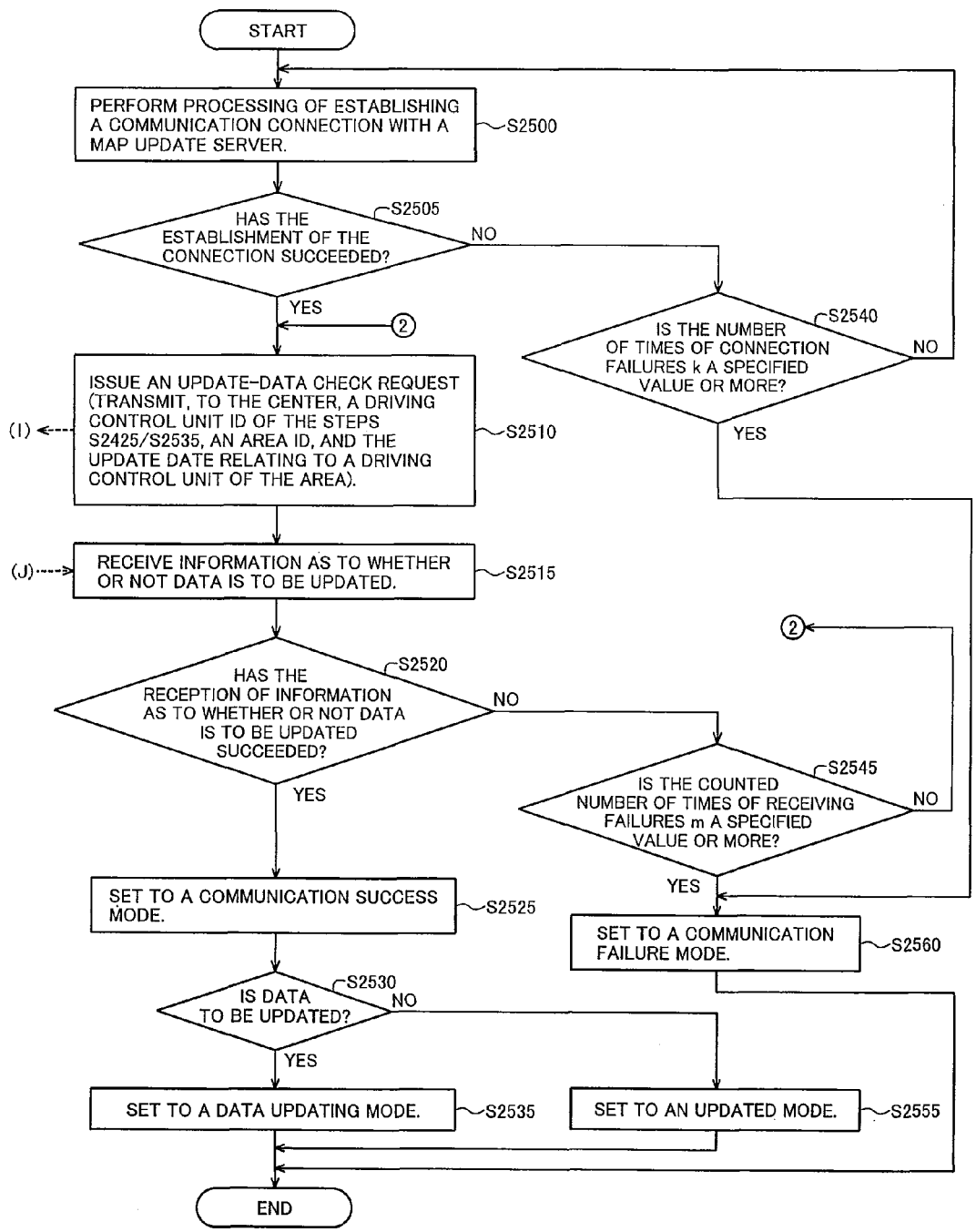
FIG. 36 is a flowchart specifically illustrating the processing steps of the step S13 shown in FIG. 34.

FIG. 36 is a flowchart specifically illustrating the processing steps of the step S13 shown in FIG. 34. Incidentally, the map update check processing according to the first embodiment shown in FIG. 13 is partially changed to form the flow described below. Therefore, the description of the same processing as that shown in FIG. 13 will be simplified as below.

First of all, according to the same processing steps as those of the step S500 in FIG. 13, the driving-control-unit-basis latest map check unit 232 performs processing of establishing a communication connection with the map update server 32 (S2500).

Next, according to the same processing steps as those of the step S505 in FIG. 13, the driving-control-unit-basis latest map check unit 232 judges whether or not the establishment of the communication connection has succeeded (S2505). If it is judged that the establishment of the communication connection has succeeded, the process proceeds to a step S2510, whereas if it is judged that the establishment of the communication connection has failed, the process proceeds to a step S2540.

In the step S2540, according to the same processing steps as those of the step S540 in FIG. 13, the driving-control-unit-basis latest map check unit 232 counts the number of times the establishment of the connection has failed (the number of times of connection failures k). If the counted number of times of connection failures k is a specified value or more (for example, the number of times of connection failures k≧5), the process proceeds to a step S2550. In addition, if the counted number of times of connection failures k is smaller than the specified value (for example, the number of times of connection failures k<5), the process returns to the step S2500, and the driving-control-unit-basis latest map check unit 232 performs the communication connection establishment processing again.

Next, processing of S2510, which is performed when it is judged in the step S2505 that the establishment of the connection has succeeded, will be described.

In the step S2510, the driving-control-unit-basis latest map check unit 232 issues an update-data check request to the map update server 32 through the communication unit 220. To be more specific, the driving-control-unit-basis latest map check unit 232 acquires, from the control unit 200, "information about map update (the driving control unit ID received in the step S10 shown in FIG. 34, the area ID of the update check area, and the update date corresponding to a driving control unit of each area ID)". The driving-control-unit-basis latest map check unit 232 transmits, to the map update server 32, an update-data check request that includes the acquired "information about map update". Incidentally, the "information about map update" is the information which the control unit 200 has acquired in the steps S2425/S2535 shown in FIG. 35.

Next, the driving-control-unit-basis latest map check unit 232 performs the same processing as that of the step S515 shown in FIG. 13 (S2515). To be more specific, the driving-control-unit-basis latest map check unit 232 receives update data existence information that is transmitted by the map update server 32 in response to the update-data check request.

After that, the process by the driving-control-unit-basis latest map check unit 232 proceeds to a series of processing of the steps S2520 and after.

Incidentally, in the steps S2520 and after, because the series of processing performed by the driving-control-unit-basis latest map check unit 232 and the control unit 200 are the same as those of the steps S520 and after in FIG. 13, description thereof will be omitted here.

Subsequently, steps of the map update data acquisition processing (S14) shown in FIG. 34 will be specifically described with reference to FIG. 37.

Figure 37:
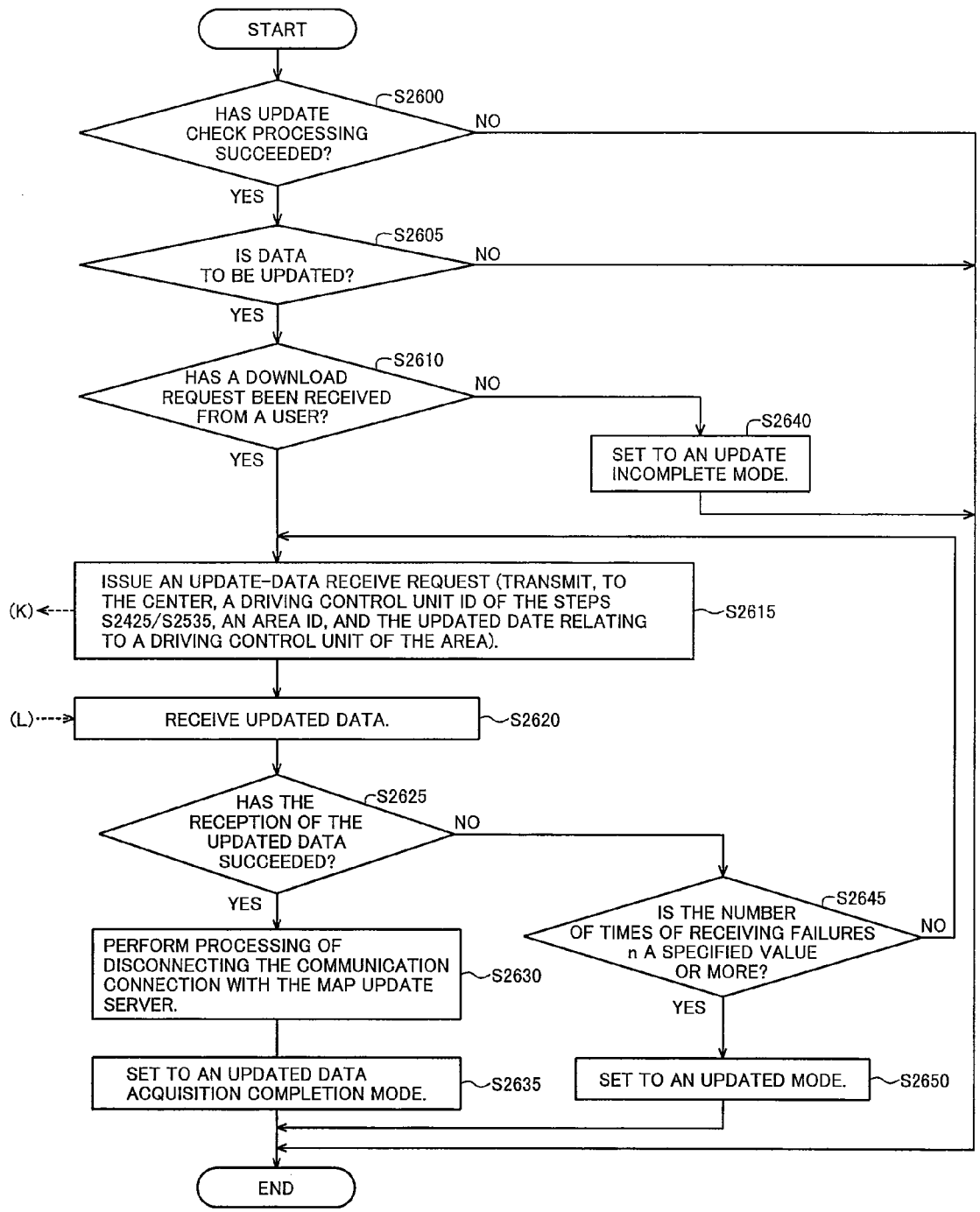
FIG. 37 is a flowchart specifically illustrating the processing steps of the step S14 shown in FIG. 34.

FIG. 37 is a flowchart specifically illustrating the processing steps of the step S14 shown in FIG. 34. Incidentally, the map update data acquisition processing according to the first embodiment shown in FIG. 14 is partially changed to form the flow described below. Therefore, the description of the same processing as that shown in FIG. 13 will be simplified as below.

First of all, according to the same processing steps as those of the step S600 in FIG. 14, the control unit 200 judges whether or not the update check processing has succeeded. If it is judged that the update check processing has succeeded, the process proceeds to a step S2605. On the other hand, if it is judged that the update check processing has failed, the control unit 200 ends the processing (S2600).

Next, according to the same processing steps as those of the step S605 in FIG. 14, the control unit 200 judges the update data existence information. If it is judged that update data exists, the process proceeds to a step S2610, whereas if it is judged that update data does not exist, the control unit 200 ends the processing (S2605).

Next, according to the same processing steps as those of the step S610 in FIG. 14, the control unit 200 judges whether or not a download request has been received from a user. If it is judged that the download request has been received from the user, the process proceeds to a step S2615. On the other hand, if the control unit 200 judges that the download request has not been received from the user, the process proceeds to a step S2640 (S2610). Incidentally, if the process proceeds to the step S2640, the same processing as that of the step S640 shown in FIG. 14 is performed, before the processing ends.

In the step S2615, the control unit 200 instructs the driving-control-unit-basis map update unit 242 to perform the update-data receive processing so that update data is received from the map update server 32. On the receipt of the instruction to perform the update-data receive processing, the driving-control-unit-basis map update unit 242 acquires, from the control unit 200, "information about map update (the driving control unit ID received in the step S10 shown in FIG. 34, the area ID of the update check area, and the update date corresponding to a driving control unit of each area ID)". The driving-control-unit-basis map update unit 242 transmits, to the map update server 32, an update-data check request that includes the "information about map update".

In the step S2620, the driving-control-unit-basis map update unit 242 receives, through the communication unit 220, update data that is transmitted by the map update server 32 in response to the update-data receive request. Then, the process proceeds to a step S2625.

Incidentally, because a series of processing of the steps S2625 and after are the same as those of the steps S625 and after shown in FIG. 14, description thereof will be omitted here.

Subsequently, processing performed by the map update server 32 according to the third embodiment of the present invention will be described.

First of all, map-data update check processing, which is performed when the map update server 32 receives an update-data check request from the car information system 12, will be described with reference to FIG. 38.

Figure 38:
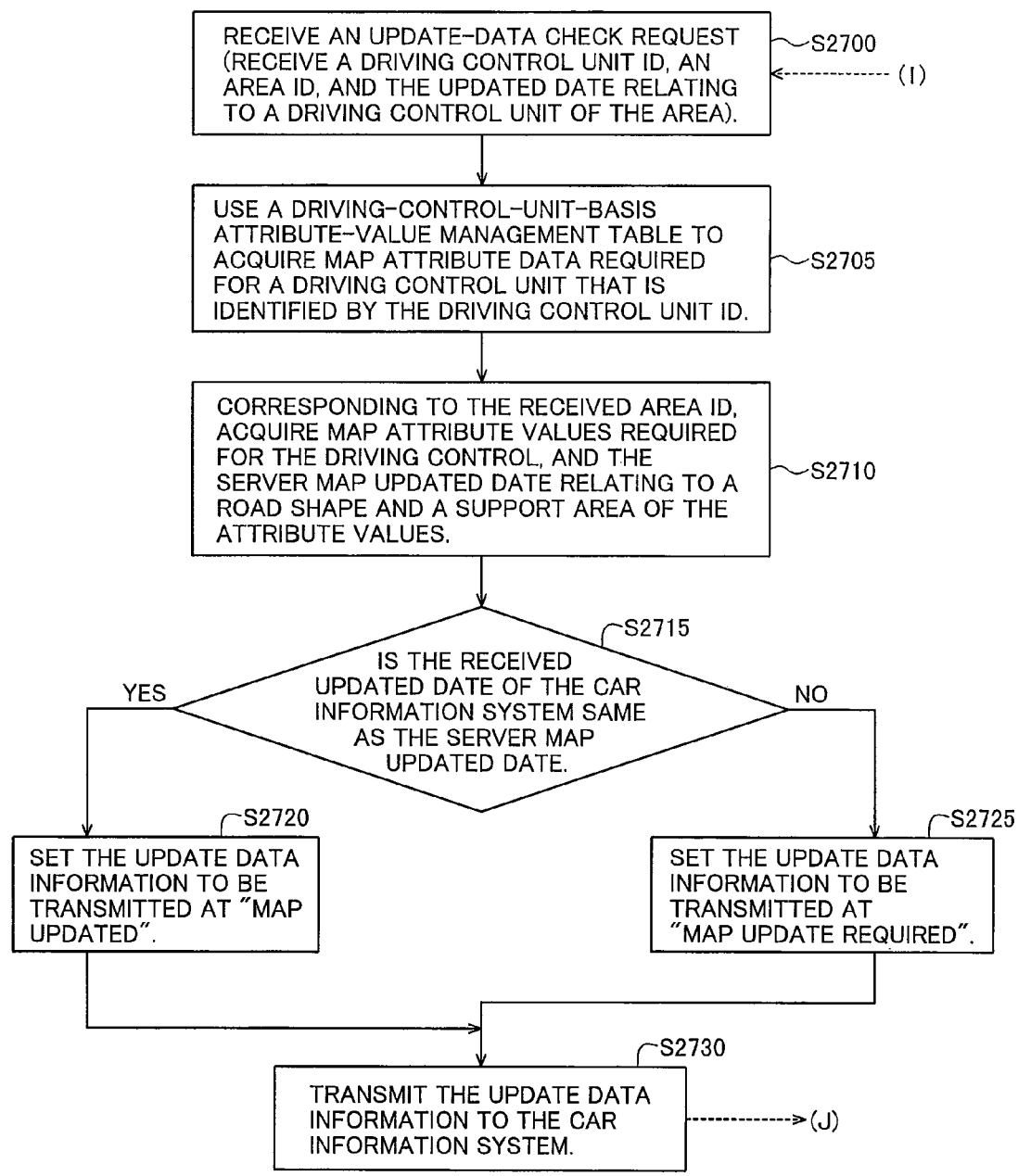
FIG. 38 is a flowchart illustrating steps of the map-data update check processing performed by the map update server 32 according to the third embodiment of the present invention.

FIG. 38 is a flowchart illustrating steps of the map-data update check processing performed by the map update server 32 according to the third embodiment of the present invention.

First of all, the driving-control-unit-basis latest map check unit 422 receives an "update-data check request" from the car information system 12 through the communication unit 410 (S2700). In the above-described processing in the step S2510 shown in FIG. 36, the "update-data check request" received from the car information system 12 is a request transmitted from the car information system 12. This update-data check request includes "information about map update (the driving control unit ID received in the step S10 shown in FIG. 34, the area ID of the update check area, and the update date (the terminal side update date) corresponding to a driving control unit of each area ID)".

Subsequently, the driving-control-unit-basis latest map check unit 422 accesses the driving-control-unit-basis attribute-value management table 340 to acquire map attribute data required for a driving control unit that is identified by the driving control unit ID included in the update-data check request received in the step S2700 (S2705).

Next, corresponding to the update check area, the driving-control-unit-basis latest map check unit 422 acquires attribute data required for the driving control, and the update date (the server side update date) relating to a road shape and a support area of attribute data (S2710). To be more specific, by use of the area ID of the update check area included in the update-data check request received in the S2700, the attribute data identified in the step S2705, the server-side attribute-value-basis support area management table 310, the server-side road shape/attribute data update date management table 320, and the map DB 300, the driving-control-unit-basis latest map check unit 422 acquires attribute data required for the driving control, and the server map update date relating to a road shape and a support area of the attribute data, corresponding to the update check area.

Next, the driving-control-unit-basis latest map check unit 422 compares "the terminal side update date" received in the step S2700 with "the server side update date" acquired in the step S2710. If both of them agree with each other, the process proceeds to a step S2720, whereas if both of them differ from each other, the process proceeds to a step S2725 (S2715).

In the step S2720, the driving-control-unit-basis latest map check unit 422 sets the update data existence information, which is transmitted as a response to the car information system 12, to "map update completed".

In the step S2725, the driving-control-unit-basis latest map check unit 422 sets the update data existence information, which is transmitted as a response to the car information system 12, to "map update required".

Then, the driving-control-unit-basis latest map check unit 422 transmits, to the car information system 12, the update data existence information whose value has been determined in the step S2720 or S2725. Here, the transmitted update data existence information is received by the car information system 12 in the above-described step S2515 shown in FIG. 36.

Next, map update data delivery processing, which is performed when the map update server 32 receives an update-data receive request from the car information system 12, will be described with reference to FIG. 39.

Figure 39:
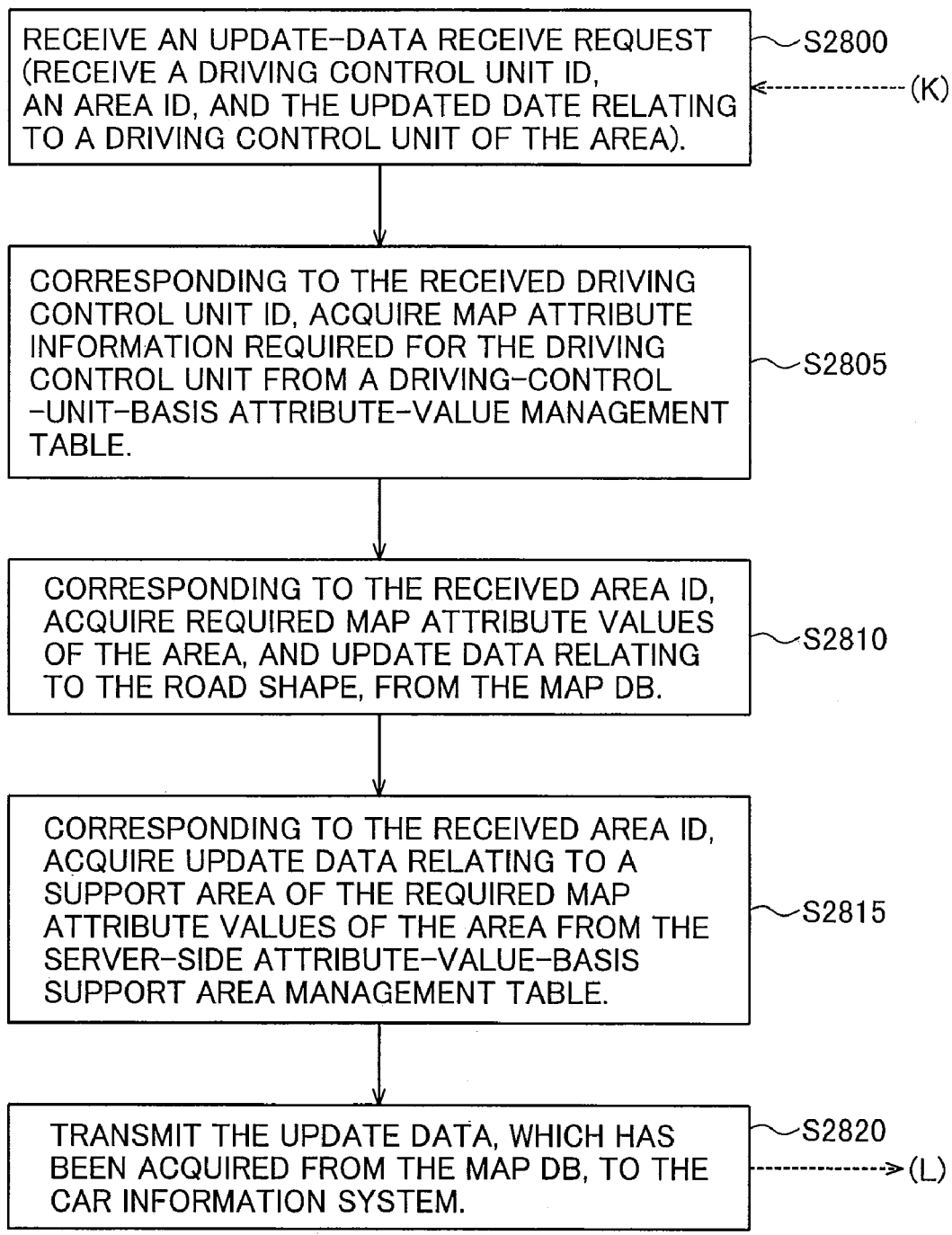
FIG. 39 is a flowchart illustrating steps of the map update data delivery processing performed by the map update server 32 according to the third embodiment of the present invention.

FIG. 39 is a flowchart illustrating steps of the map update data delivery processing performed by the map update server 32 according to the third embodiment of the present invention.

First of all, the driving-control-unit-basis map update data transmission unit 432 receives an update-data receive request from the car information system 12 through the communication unit 410 (S2800). In the above-described processing in the step S2615 shown in FIG. 37, the update-data receive request is a request transmitted from the car information system 12. This update-data receive request includes "information about map update (the driving control unit ID received in the step S10 shown in FIG. 34, the area ID of the update check area, and the update date (the terminal side update date) corresponding to a driving control unit of each area ID)".

Next, the driving-control-unit-basis map update data transmission unit 432 performs the same processing steps as those of the step S2705 shown in FIG. 38, and thereby identifies map attribute data required for a driving control unit that is identified by the driving control unit ID included in the update-data check request received in the step S2800 (S2805).

Next, corresponding to map data of an area ID included in the update-data receive request received in the step S2800, the driving-control-unit-basis map update data transmission unit 432 acquires map attribute data required for the area, and update data of a road shape, from the map DB 300 (S2810). Incidentally, the map attribute data required for the area is the attribute data that is identified in the S2805 among pieces of attribute data included in the map data identified by the received area ID.

Next, corresponding to the area ID included in the update-data receive request received in the step S2800, the driving-control-unit-basis map update data transmission unit 432 acquires, from the server-side attribute-value-basis support area management table 310, update data relating to a support area of map attribute data required for the area (S2815).

Next, the update data transmission unit 431 transmits the information (update data) acquired in the steps S2810, S2815 to the car information system 12 through the communication unit 410 (S2820). Here, the transmitted update data is received by the car information system 12 in the above-described step S2620 shown in FIG. 37.

Thus, according to the third embodiment of the present invention, the map update server 32 is configured to store the driving-control-unit-basis attribute-value management table 340 in which each driving control unit ID is associated with attribute data that is used by a driving control unit identified by the driving control unit ID in question. On the receipt of an update-data check request (or an update-data receive request) of map data, which includes a driving control unit ID, and which is transmitted from the car information system 12, the map update server 32 uses the received driving control unit ID and the driving-control-unit-basis attribute-value management table 340 to judge attribute data required for the car information system 12. To be more specific, the third embodiment is configured to identify attribute data required for the car information system on the map update server 32 side.

Thus, according to the third embodiment of the present invention, the map update server located on the center side takes charge of the judgment processing of judging attribute data required for the driving control of each vehicle, the judgment processing being performed by the car information system in the first embodiment described above. As is the case with the second embodiment, this configuration of the third embodiment not only produces the effects of the first embodiment, but also makes it possible to further reduce a processing load on the car information system side.

Incidentally, the present invention is not limited to the above-described embodiments, and therefore, the present invention may be modified in various ways within the spirit and scope of the present invention.

For example, in the above-described embodiments, the judgments, such as the judgment as to whether or not the vehicle is travelling within a range of the legal speed, and the judgment as to whether or not the vehicle has entered a school zone, are made on the car information system side. However, it may also be so configured that these judgments (such as the judgment as to whether or not the vehicle is travelling within a range of the legal speed, and the judgment as to whether or not the vehicle has entered a school zone) are made on the driving control unit group 50 side. In this case, the car information system 12 transmits, to the driving control unit group 50, a current position of the vehicle, a shape of a road of map data, and attribute data of the road. Then, by use of the information transmitted from the car information system 12, various kinds of judgments are made on the driving control unit group 50 side.

In addition, in the driving control/warning mode setting processing shown in FIG. 16 according to the above embodiment, first of all, the judgment is made as to whether or not the set mode is the update completed mode (S800). However, this is merely taken as an example. For example, it may also be so configured that the update date of map data used for the driving control is checked before the processing of the step S800, and then if it is judged that the specified period of time has passed since the update date (for example, if two years or more has passed since the update date), the mode is set to the uncontrolled mode. In this case, if the length of time elapsed after the update date of the map data does not exceed the specified period of time, the processing of the step S800 is performed.

Moreover, in the above-described embodiment, the update-data check request and the update-data receive request are separately handled. However, the present invention is not limited to this method. For example, it may also be so configured that when the map update server receives an update-data check request, if it is judged that update is required, update data is transmitted to the car information system.

Furthermore, in the above-described embodiments, when the map data stored in the car information system is compared with the map data stored in the map update server, the update date is used. However, data other than the update date may also be used.

What is claimed is:

1. A car information system for communicating with a driving control unit located in a vehicle, and for controlling the driving control unit so that the driving control of the vehicle is performed, the car information system comprising:

a map database (DB) in which map data is registered, the map data including a link constituting a road, a road shape of the link, and attribute data of the link at each of a plurality of meshes into which a map area is divided, wherein the map area is divided into meshes of a support area that is judged by field research whether attribute data is present or absent for each kind of attribute data in said map data, and meshes of a non-support area that is not judged by field research;

a support area management table in which the meshes of the support area are registered; and control means for estimating a traveling area through which the vehicle travels, for using said support area management table to judge whether or not estimated meshes of areas are associated with the support area of the attribute data, and for, if it is judged that the estimated meshes of areas are associated with the support area of the attribute data, controlling the driving control unit so that the driving control of the vehicle is performed by use of the map data, whereas if it is judged that the estimated meshes of areas are not associated with the support area of the attribute data, not performing the driving control of the vehicle by use of the map data.

2. The car information system according to claim 1, further comprising:
   an update-date management table for storing the update date of attribute data of a link, the update date of a road shape of the link, and the update date of data of said support area management table, the link being included in each of areas into which the map data is sectioned;
   communication means for communicating with a map server which stores the latest-version map data; and
   update check means for accessing the map server through the communication means, issuing an update check request to perform update check of the estimated area, said update check request including the update date stored in the update-date management table, on the basis of the result of the check transmitted in response to the update check request, checking whether or not map data registered in said map DB and a support area included in said support area management table are the same as those in the latest version which are stored in the map server, and if it is judged that the map data registered in said map DB and the support area included in said support area management table are not the same as those in the latest version which are stored in the map server, acquiring data used for the update to the latest-version map data so as to update the map data, said support area management table, and the update-date management table which are stored in the car information system in question.

3. The car information system according to claim 1, further comprising:
   an area update-date management table in which each of the areas into which the map data is sectioned is associated with the update date on which data in the area in question has been updated;
   storage means for storing a vehicle ID for identifying the vehicle which is equipped with the car information system;
   communication means for communicating with a map server which stores the latest-version map data and, on a vehicle ID basis, information which is associated with attribute data, the attribute data being used for the driving control by the vehicle identified by the vehicle ID; and
   update check means for accessing the map server through the communication means, then issuing an update check request to perform update check of the estimated area, the update check request including the update date stored in the update-date management table and the vehicle ID, on the basis of the result of the check transmitted in response to the update check request, checking whether or not, among pieces of map data stored in said map DB, attribute data corresponding to the vehicle ID, and the support area and road shape of the attribute data, are the same as those in the latest version which are stored in the map server; and
   if it is judged that the attribute data corresponding to the vehicle ID, and the support area and road shape of the attribute data, are not the same as those in the latest version which are stored in the map server, acquiring data used for the update to the latest-version map data so as to update the map data, said support area management table, and the update-date management table which are stored in the car information system in question.

4. The car information system according to claim 1, further comprising:
   an update-date management table in which, for each of areas into which the map data is sectioned, each unit ID for identifying a driving control unit located in the vehicle is associated with the update date of data used for the driving control;
   communication means for communicating with a map server which stores the latest-version map data and, on an unit ID basis, information which is associated with attribute data, the attribute data being used for the driving control by the driving control unit identified by the unit ID,
   update check means for accessing the map server through the communication means, then issuing an update check request to perform update check of the estimated area, the update check request including the update date stored in the update-date management table and the unit ID, on the basis of the result of the check transmitted in response to the update check request, checking whether or not, among pieces of map data registered in said map DB, attribute data corresponding to the unit ID, and the support area and road shape of the attribute data, are the same as those in the latest version which are stored in the map server, and if it is judged that the attribute data corresponding to the unit ID, and the support area and road shape of the attribute data, are not the same as those in the latest version which are stored in the map server, acquiring data used for the update to the latest-version map data so as to update the map data, said support area management table, and the update-date management table which are stored in the car information system in question.

5. A map server for storing map data including a link constituting a road, a road shape of the link, and attribute data of the link at each of a plurality of meshes into which a map area is divided, kept in the latest version, and for providing information about the map data to an on-board system for performing the driving control of a vehicle, wherein the map area is divided into meshes of a support area that is judged by field research whether attribute data is present or absent for each kind of attribute data in said map data, and meshes of a non-support area that is not judged by field research;
   the map server comprising:
   a support area management table in which the meshes of the support area are registered;
   an update-date management table for storing the update date of attribute data of a link, the update date of a road shape of the link, which are included in map data, and the update date of data of said support area management table;
   communication means for communicating with the on-board system; and
   update check means for, from the on-board system through said communication means, acquiring: a check area of map data, whose update check is requested; the update date of attribute data of the link, and the update date of the road shape of the link, which are included in the check area of the map data stored in the on-board system; and the update date of the support area of the attribute data of the link included in the check area; by use of the information acquired from the on-board system, said update-date management table, and said support area management table, judging whether or not to update the attribute data and road shape of the check area of the map data, and the support area of the attribute data, which are stored in the on-board system; and transmitting the result of the judgment to the on-board system, and if it is judged that they should be updated, transmitting data required for the update.

6. The map server according to claim 5, further comprising an attribute data management table in which at least either on a vehicle ID basis or on an unit ID basis, the vehicle or the driving control unit, which is identified by the ID in question, is associated with attribute data used for the driving control, the vehicle ID identifying each vehicle, and the unit ID identifying each driving control unit located in the vehicle, and wherein, said update check means, through said communication means, acquire a check area of map data, for which the on-board system requests update check, the ID, and the update date of data relating to the check area, the data being used by the driving control unit identified by the ID, by use of the information acquired from the on-board system, said update-date management table, said support area management table, and the attribute data management table, judge whether or not the driving control unit identified by the acquired ID is required to update attribute data used for the driving control, the road shape, and the support area of the attribute data, corresponding to the area for which update check of the map data stored in the on-board system is requested, and transmit the result of the judgment to the on-board system, and if it is judged that they should be updated, transmit data required for the update.

7. An on-board system comprising a driving control unit for performing the driving control of a vehicle and a car information system for communicating with the driving control unit to control the driving control unit,
the car information system comprising:
a map database (DB) in which map data is registered at each of a plurality of meshes into which a map area is divided, wherein the map area is divided into meshes of a support area that is judged by field research whether attribute data is present or absent for each kind of attribute data in said map data, and meshes of a non-support area that is not judged by field research;
a support area management table in which the meshes of the support area are registered;
communication means for communicating with a map server which stores the latest-version map data;
check means for accessing the map server through said communication means, and checking whether or not, among pieces of map data stored in said map DB, and among the support areas, the map data and the support area, relating to the area through which the vehicle has been estimated to travel, are the same as those kept in the latest version;
warning/control switching means for setting the mode of the on-board system to one of modes of a control mode in which the driving control is executed, a warning mode in which warning processing is executed, or an uncontrolled mode in which neither the driving control nor the warning processing is executed;
control means for, when the mode of the on-board system is set to the control mode, controlling the driving control unit so that the driving control of the vehicle is performed by use of the map data of said map DB; and
warning means for, when the mode of the on-board system is set to the warning mode, issuing a warning to a user by use of the map data of said map DB,
wherein said warning/control switching means sets the mode of the on-board system to the control mode if said check means succeeds in judging that among the pieces of map data stored in said map DB, and among the support areas, the data and the support area relating to the area through which the vehicle has been estimated to travel, are the same as those of the latest-version map data, and at the same time, judging whether or not the meshes of the estimated area correspond to the support area of the attribute data, if the estimated area corresponds to the support area of the attribute data,
said warning/control switching means sets the mode of the on-board system to the warning mode, if said check means fails to judge that the data relating to the area through which the vehicle has been estimated to travel are the same as those of the latest-version map data, and at the same time, judging whether or not the meshes of the estimated area correspond to the support area of the attribute data, if the estimated area corresponds to the support area of the attribute data, and
said warning/control switching means sets the mode of the on-board system to the uncontrolled mode, judging whether or not the meshes of the estimated area correspond to the support area of the attribute data, if the estimated area does not correspond to the support area of the attributed data.

8. The on-board system according to claim 7, further comprising:
acquisition means for, if said check means succeeds in judging that among the pieces of map data stored in said map DB, and among the support areas, the data and the support area, relating to the area through which the vehicle has been estimated to travel, are not the same as those of the latest-version map data, accessing the map server through said communication means to acquire update data used to update the map data and the support area, which relate to the estimated area, to those of the latest-version map data, and then temporarily storing the acquired update data;
means for accepting a map-data update request from a user; and
update means for, on the acceptance of the update request, updating said map DB and said support area management table by use of the temporarily stored update data;
wherein:
if the update means has updated said map DB and said support area management table, and at the same time, if the estimated area is a support area registered in said support area management table, said warning/control switching means sets the mode of the on-board system to the control mode.

9. The on-board system according to claim 7, further comprising:
communication monitoring means for monitoring a communication state in which said communication means communicates with the map serve,
wherein:
if the communication monitoring means judges that a communication failure has occurred, and if the estimated area is a support area registered in said support area management table, said warning/control switching means sets the mode of the on-board system to the warning mode.

10. The on-board system according to claim 7, wherein:
the car information system includes an update-date management table in which, for each of areas into which map data is sectioned, the update date of the map data included in the each area is stored; and
said warning/control switching means refers to the update-date management table, and if it is judged that a specified period of time has passed since the map data relating to the estimated area has been updated, said warning/control switching means sets the mode of the on-board system to the uncontrolled mode.

11. The on-board system according to claim 7, wherein:
the map data includes speed limit information about a speed limit of each road;
the driving control unit is capable of controlling the engine power, a brake, and a transmission;
when the mode of the on-board system is set to the control mode, said control means use the map data, a current position of the vehicle, and the vehicle speed received from the speed sensor, to monitor whether or not the vehicle speed exceeds a speed limit, and if it is judged that the vehicle speed exceeds the speed limit, said control means notify a user that the vehicle is overspeeding, and instructs the driving control unit to execute the engine power control, the brake control, or the transmission control so that the vehicle speed becomes equivalent to, or lower than, the speed limit; and
when the mode of the on-board system is set to the warning mode, said warning means use the map data, a current position of the vehicle, and the vehicle speed received from the speed sensor, to monitor whether or not the vehicle speed exceeds the speed limit, and if it is judged that the vehicle speed exceeds the speed limit, said warning means perform warning processing to notify the user that the vehicle is overspeeding.

12. The on-board system according to claim 7, wherein:
the map data includes school zone information as to whether or not each road belongs to a school zone;
the driving control unit is capable of controlling the engine power, a brake, and a transmission;
when the mode of the on-board system is set to the control mode, said control means use the map data, and a current position of the vehicle, to monitor whether or not the vehicle is approaching, or travelling through, a school zone, and if it is judged that the vehicle is approaching, or travelling through, the school zone, said control unit notify the user of this situation, and instructs the driving control unit to execute the engine power control, the brake control, or the transmission control so that the vehicle speed is reduced; and
when the mode of the on-board system is set to the warning mode, said warning means use the map data, and a current position of the vehicle, to monitor whether or not the vehicle is approaching, or travelling through, a school zone, and if it is judged that the vehicle is approaching, or travelling through, the school zone, said warning means perform the warning processing to notify the user of this situation.

13. The on-board system according to claim 7, wherein:
the map data includes information about a position of a temporary stop line, or that of a railroad crossing, on each road;
the driving control unit is capable of controlling the engine power, a brake, and a transmission;
when the mode of the on-board system is set to the control mode, said control means use the map data, and a current position of the vehicle, to monitor whether or not the vehicle is approaching a temporary stop line or a railroad crossing, if it is judged that the vehicle is approaching the temporary stop line or the railroad crossing, said control means notify the user of this situation, and instructs the driving control unit to execute the engine power control, the brake control, or the transmission control so that the vehicle speed is reduced; and
when the mode of the on-board system is set to the warning mode, said warning means use the map data, and a current position of the vehicle, to monitor whether or not the vehicle is approaching a temporary stop line or a railroad crossing, and if it is judged that the vehicle is approaching the temporary stop line or the railroad crossing, said warning means perform the warning processing to notify the user of this situation.

14. The on-board system according to claim 7, wherein:
the map data includes information about a road shape of each road, and the curvature of the each road;
the driving control unit is capable of controlling the engine power, a brake, and a transmission;
when the mode of the on-board system is set to the control mode, said control means use the map data, a current position of the vehicle, and the vehicle speed received from the speed sensor, to monitor whether or not the vehicle is passing through a curve, and if it is judged that the approach speed before the curve is higher than or equal to a specified value, said control means notify the user of the overspeeding, and instructs the driving control unit to execute the engine power control, the brake control, or the transmission control so that the vehicle speed is reduced; and
when the mode of the on-board system is set to the warning mode, said warning means use the map data, a current position of the vehicle, and the vehicle speed received from the speed sensor, to monitor whether or not the vehicle is passing through a curve, and if it is judged that the approach speed before the curve is higher than or equal to a specified value, said warning means perform the warning processing to notify the user of the overspeeding.

15. The on-board system according to claim 7, wherein:
the map data includes information about a road shape of each road, and the curvature and grade of the each road,
the driving control unit is capable of performing the irradiation angle control of headlights of the vehicle;
when the mode of the on-board system is set to the control mode, said control means use the map data, and a current position of the vehicle, to monitor whether or not the vehicle comes into a curve, and to monitor whether or not the vehicle arrives at a change point of a slope such as an upward slope and a downward slope, and when the vehicle passes through the curve, said control means instruct the driving control unit to control the right and left directions of the headlights by use of the information about the road shape, the curvature, and the grade, and when the vehicle passes through the change point of the slope, said control means instruct the driving control unit to control the right and left directions of the headlights by use of the information about the road shape, the curvature, and the grade; and
when the mode of the on-board system is set to a mode other than the control mode, the irradiation angle control of the headlights is not performed.

16. The on-board system according to claim 7, wherein:
the map data includes information about a road shape of each road, the curvature and width of the each road, and the distance between traffic lanes on the each road;

the driving control unit performs the steering angle control of the vehicle;

when the mode of the on-board system is set to the control mode, said control means use the map data and a current position of the vehicle, to monitor whether or not the vehicle deviates from a traffic lane, and if it is judged that the vehicle deviates from the traffic lane, said control means instruct the driving control unit to perform the steering angle control so that the vehicle does not deviate from the traffic lane; and when the mode of the on-board system is set to the warning mode, said warning means use the map data, and a current position of the vehicle, to monitor whether or not the vehicle deviates from a traffic lane, and if it is judged that the vehicle deviates from the traffic lane, said warning means perform the warning processing to notify of the deviation.

17. The on-board system according to claim 7, wherein:

the map data includes information about a road shape of each road, and the curvature and grade of the each road, the driving control unit is capable of performing the shift change control of the vehicle;

when the mode of the on-board system is set to the control mode, said control means use the map data and a current position of the vehicle, to monitor whether or not the vehicle comes into a curve, and to monitor whether or not the vehicle arrived at a change point of a slope such as an upward slope and a downward slope, and if it is judged that there is a curve or a slope ahead of the vehicle, said control means instruct the driving control unit to perform the shift up/down control in response to the slope or the curve by use of the information about the road shape, the curvature, and the slope; and when the mode of the on-board system is set to a mode other than the control mode, the shift change control is not performed.

18. The on-board system according to claim 7, wherein:

the map data includes information about a road shape of each road, and the curvature and grade of the each road, the driving control unit is capable of performing the regenerative brake control of the vehicle;

when the mode of the on-board system is set to the control mode, said control unit transmit the map data and a current position of the vehicle to the driving control unit, and thereby instructs the driving control unit to perform the regenerative brake control by use of road shape data, and information about the curvature and the grade, which are included in the map data, so that the electric power can be efficiently regenerated; and when the mode of the on-board system is set to a mode other than the control mode, the regenerative brake control is not performed.

\* \* \* \* \*